(12) United States Patent
Ratti et al.

(10) Patent No.: US 9,290,268 B2
(45) Date of Patent: Mar. 22, 2016

(54) HOVERING AND GLIDING MULTI-WING FLAPPING MICRO AERIAL VEHICLE

(75) Inventors: Jayant Ratti, Atlanta, GA (US);
Emanuel Jones, Atlanta, GA (US);
George Vachtsevanos, Marietta, GA (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 79 days.

(21) Appl. No.: 14/000,191

(22) PCT Filed: Feb. 17, 2012

(86) PCT No.: PCT/US2012/025718
§ 371 (c)(1),
(2), (4) Date: Aug. 16, 2013

(87) PCT Pub. No.: WO2012/112939
PCT Pub. Date: Aug. 23, 2012

(65) Prior Publication Data
US 2013/0320133 A1 Dec. 5, 2013

Related U.S. Application Data

(60) Provisional application No. 61/443,914, filed on Feb. 17, 2011, provisional application No. 61/466,204, filed on Mar. 22, 2011, provisional application No. 61/481,500, filed on May 2, 2011, provisional application No. 61/481,484, filed on May 2, 2011.

(51) Int. Cl.
*B64C 33/00* (2006.01)
*B64C 33/02* (2006.01)

(52) U.S. Cl.
CPC ............... *B64C 33/025* (2013.01); *B64C 33/02* (2013.01)

(58) Field of Classification Search
CPC .... B64C 33/02; B64C 33/025; B64C 39/003; B64C 39/005; B64C 39/006; B64C 39/028
See application file for complete search history.

(56) References Cited

U.S. PATENT DOCUMENTS 5,163,861 A * 11/1992 Van Ruymbeke ............... 446/35
6,082,671 A * 7/2000 Michelson ....................... 244/72
(Continued)

FOREIGN PATENT DOCUMENTS

CN 101049858 A 10/2007
FR 2936288 A1 3/2010
(Continued)

OTHER PUBLICATIONS

Yang, L.J. et al., "Light Flapping Micro Aerial Vehicle Using Electrical-Discharge Wire-Cutting Technique," Journal of Aircraft, AIAA; Nov. 1, 2009.
(Continued)

*Primary Examiner* — Philip J Bonzell
(74) *Attorney, Agent, or Firm* — Troutman Sanders LLP; Ryan A. Schneider; Benjamin C. Wiles

(57) ABSTRACT

Multi-wing hovering and gliding flapping Micro Air Vehicles ("MAV") are disclosed. The MAV can have independent wing control to provide enhance energy efficiency and high maneuverability. Power to each wing can be controlled separately by varying the amplitude of the wing flapping, the frequency of the wing flapping, or both. The flapping frequency can be controlled such that it is at or near the natural frequency of the wings for improved energy efficiency. The wings can be controlled by a gear train, coil-magnet arrangement or many other actuation systems that enable variable frequency flapping, variable amplitude flapping, or a combination of both. The gear train mechanism provides gyroscopic stability during flight. The wing flapping can include a rotation, or feathering motion, for improved efficiency. The wings can be transitioned between flapping flight and fixed wing flight to enable gliding and hovering in a single configuration.

3 Claims, 54 Drawing Sheets

(56) References Cited

U.S. PATENT DOCUMENTS

| | | | |
|---|---|---|---|
| 6,206,324 B1 * | 3/2001 | Smith | 244/72 |
| 6,565,039 B2 * | 5/2003 | Smith | 244/72 |
| 6,568,634 B2 | 5/2003 | Smith | |
| 6,783,097 B1 * | 8/2004 | Smith | 244/72 |
| 7,036,769 B2 * | 5/2006 | Wood | 244/11 |
| 7,204,455 B2 | 4/2007 | Sinclair | |
| 7,607,610 B1 * | 10/2009 | Sterchak | 244/72 |
| 7,651,051 B2 * | 1/2010 | Agrawal et al. | 244/22 |
| 8,181,907 B2 * | 5/2012 | Smith | 244/72 |
| 8,333,342 B2 * | 12/2012 | Martinelli et al. | 244/22 |
| 2005/0269447 A1 * | 12/2005 | Chronister | 244/72 |
| 2005/0274847 A1 | 12/2005 | Charron | |
| 2006/0060698 A1 | 3/2006 | Ohta et al. | |
| 2007/0205322 A1 * | 9/2007 | Liao | 244/22 |
| 2007/0210207 A1 * | 9/2007 | Liao | 244/22 |
| 2011/0278391 A1 * | 11/2011 | Kotler | 244/22 |

FOREIGN PATENT DOCUMENTS

| | | |
|---|---|---|
| JP | 2005119658 A | 5/2005 |
| JP | 2007237946 A | 9/2007 |

OTHER PUBLICATIONS

Supplemental European Search Report for related Application No. EP12747355.

International Search Report and Written Opinion dated May 25, 2012 for a related PCT Patent Application No. PCT/US2012/025718.

Office Action in related Chinese Patent Application No. CN2012800179631, mailed Feb. 3, 2015.

* cited by examiner

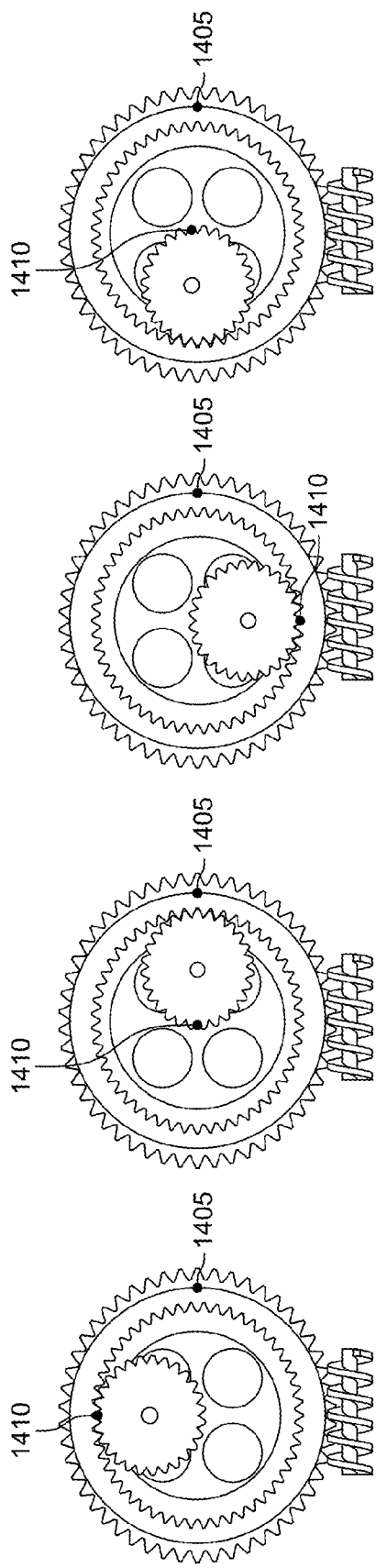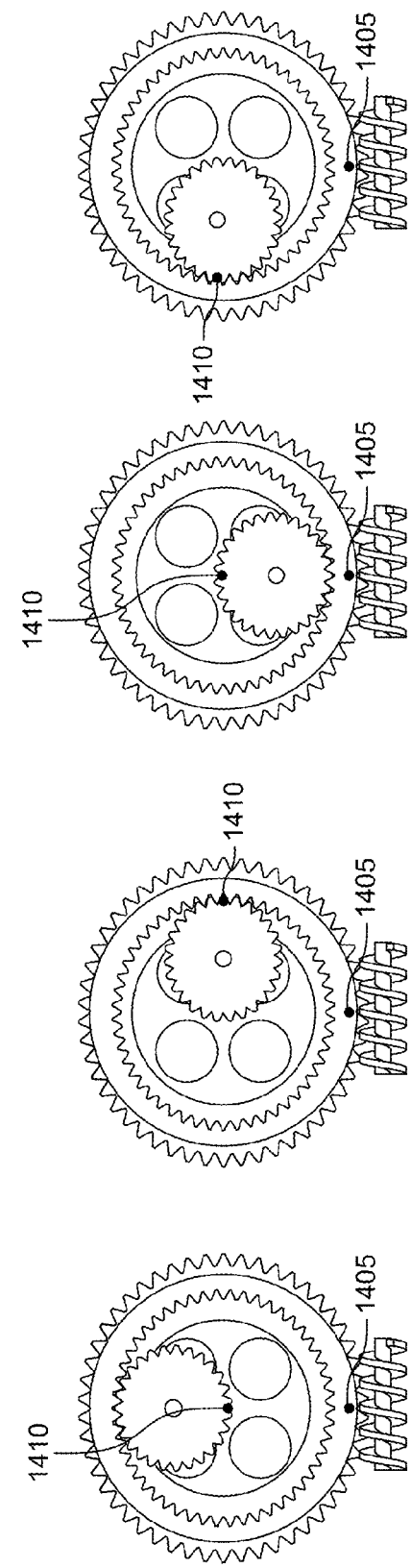

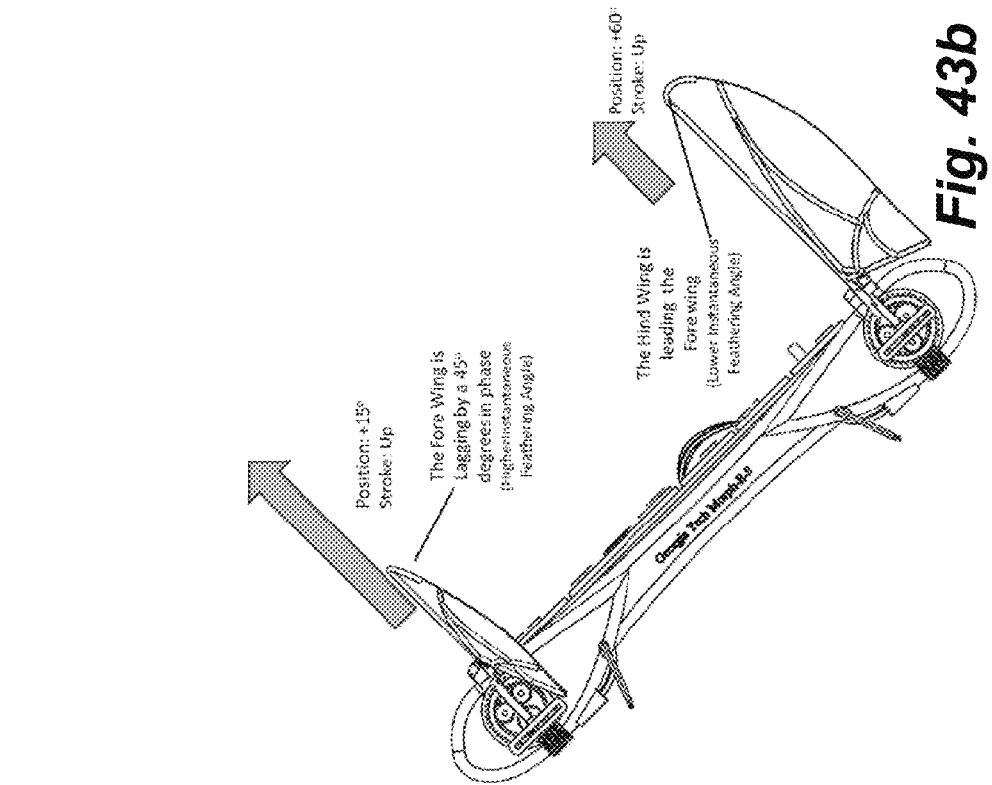
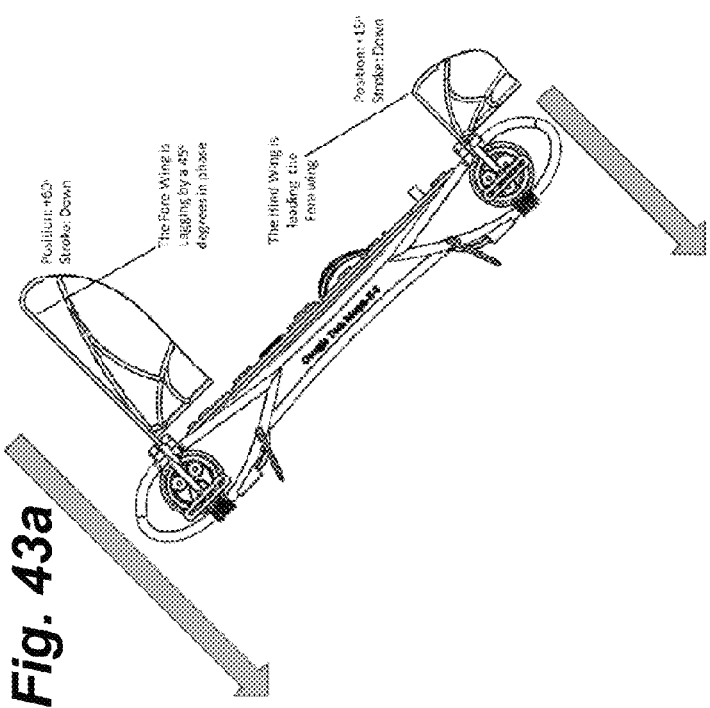
Fig. 43a
Fig. 43b

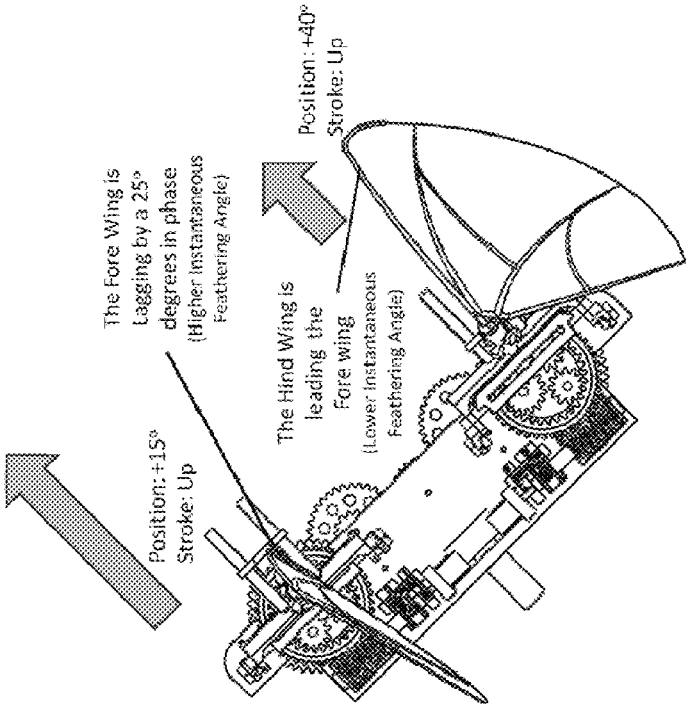
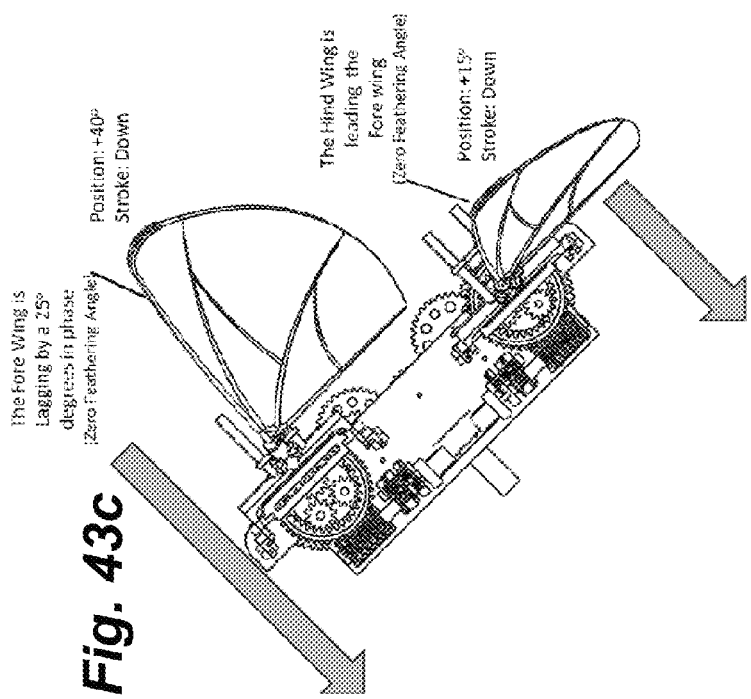

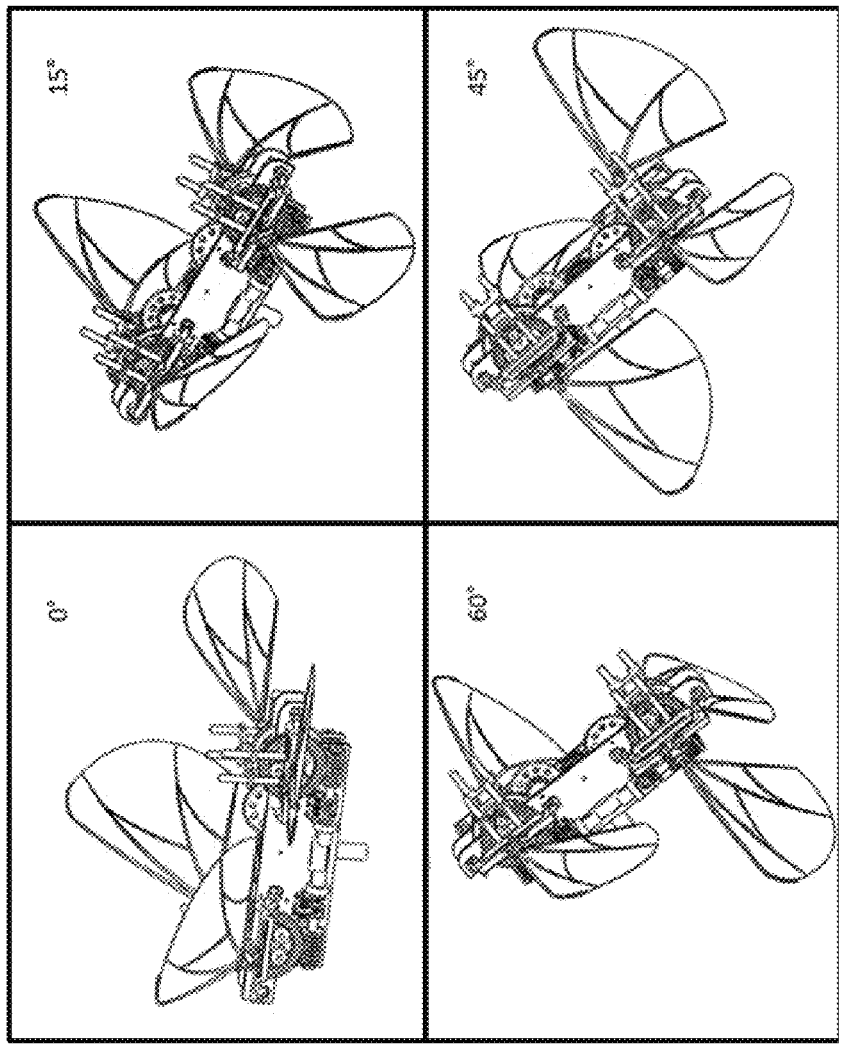

HOVERING AND GLIDING MULTI-WING FLAPPING MICRO AERIAL VEHICLE

CROSS-REFERENCE TO RELATED APPLICATIONS

This application claims the benefit of International Patent Application Serial No. PCT/US2012/025718, filed 17 Feb. 2012, and entitled "Hovering and Gliding Multi-Wing Flapping Micro Aerial Vehicle," which claims the benefit of U.S. Provisional Patent Application Ser. Nos. 61/443,914, filed 17 Feb. 2011; 61/466,204, filed 22 Mar. 2011; 61/481,500, filed 2 May 2011; and 61/481,484, filed 2 May 2011. All of the above-referenced applications are incorporated herein by reference in their entireties as if fully set forth below.

STATEMENT REGARDING FEDERALLY SPONSORED RESEARCH

This invention was made with Government support under contract number FA9550-10-C-0036, awarded by the U.S. Air Force. The Government has certain rights in the invention.

BACKGROUND OF THE INVENTION

1. Field of the Invention

The invention relates to the field of aerial vehicles, and in particular, to micro aerial vehicles with flapping wings.

2. Description of the Related Art

Micro aerial vehicles (MAVs) are small, unmanned aerial vehicles that are typically flown by remote control. MAVs can be, for example and not limitation, small airplanes, helicopters, or ornithopters. Although there is no definite list of qualifications that a vehicle must meet to be considered an MAV, the Defense Advanced Research Projects Agency (DARPA) requires that a particular aerial vehicle-must be smaller than 6 inches in any direction or must not have a gross take off weight (GTOW) greater than 100 grams. DARPA also places limits on, among other things, the range, endurance, operational altitude, maximum speed, maximum payload, and cost of manufacture. Under these tight constraints, the size, weight and power available to on-board avionics and actuators is drastically reduced compared to larger, conventional aerial vehicles.

MAVs are useful in several applications because their small size and maneuverability yields several advantages. For example, MAVs can fly in enclosed or partially enclosed areas, such as in buildings and alleyways. MAVs can also fly through and around obstacles that are too large or too close together to be avoided by conventional aerial vehicles. For at least these reasons, MAVs can perform tasks that other, larger aerial vehicles cannot.

Like larger aircraft, MAVs can carry cameras and other payloads. Unlike conventional aerial vehicles, however, an MAV's small size and maneuverability can make it difficult to detect. For this reason, MAVs are particularly useful to the military, as they can carry out various military operations without being detected. In fact, the U.S. military commonly uses small, mid, and large sized unmanned aerial vehicles (UAV) for search and rescue operations and remote intelligence, surveillance, and reconnaissance (ISR) missions.

A typical MAV mission involves flight through or in close proximity to buildings, tunnels, foliage, rubble, and other hazardous areas. These missions require MAVs to maneuver using sharp dives and climbs along with tight-radius turns. The small size of an MAV generally allows such dynamic flight operations within confined spaces. In addition, in some scenarios, MAVs must also fly for extended periods of time. For these reasons, an MAV's control and power systems must provide capability for both dynamic maneuvers and extended flight times.

Many types of micro aerial vehicles exist, including airplane-like fixed-wing models and helicopter-like rotary-wing models. Each of these types has different advantages and disadvantages. Fixed-wing MAVs can currently achieve higher efficiency and longer flight times, for example, and are therefore well suited to tasks that require extended flying time, higher payloads, and larger ground coverage. Fixed-wing MAVs cannot hover or fly backwards, however, and have a limited ability to fly at slow speeds. Rotary-wing MAVS, on the other hand, can hover, fly at slow-speeds, and move in any direction. Rotary-wing MAVs are generally inefficient, however, and so their maneuverability comes at the cost of shorter flight time and lower payload capacities.

The inefficiencies of presently known MAVs are due, at least in part, to aerodynamics. From an aerodynamic standpoint, MAVs operate in a very sensitive Reynolds number regime. This sensitivity is due in large part to the small size of the wings, rotors, and/or other lifting surfaces on an MAV. The small wings or rotors cause the aerodynamic flow over the lifting surfaces to exhibit strong variances from conventional aerodynamic effects seen over the wings of larger, conventional vehicles. These variances can cause inefficiencies if larger vehicles are simply scaled down to MAV size, or smaller. For this reason, designing MAVs that can efficiently fly in this regime represents a unique and difficult challenge to design engineers. In many applications, for example, it is desirable for an MAV to hover and/or have vertical take off and landing (VTOL) capability. In general, however, conventional VTOL capable vehicles do not efficiently scale down to the small sizes of MAVs. This means that large VTOL capable vehicles cannot simply be reduced to MAV size and maintain high flight efficiencies.

In order to design efficient MAVs, engineers have attempted to model MAVs after small flying animals, such as birds and insects. Birds and insects are notoriously efficient flyers, as their body structure and aerodynamic characteristics are very finely tuned. Birds and insects therefore have unmatched maneuverability, speed, and agility.

In addition, to overcome the aerodynamic difficulties described above, some small birds and insects utilize vortex formation and harnessing to keep themselves aloft, especially when hovering. To reduce the amount of energy needed to flap their wings, many birds and insects also flap at or near their wings' resonant frequency. Flapping at or near the resonant frequency harnesses the vibrational energy of the wings, thereby reducing the amount of energy that the bird or insect must use.

Because certain birds and insects flap their wings at or near resonant frequency, they do not increase or decrease the frequency of the flapping motion in order to vary the amount of thrust produced. Instead, these birds and insects increase the amplitude of the flapping motion to increase thrust, and decrease the amplitude of the flapping motion to decrease thrust. Increasing the amplitude of the flapping motion increases the amount of air displaced by each flap of the wing, thereby increasing the amount of thrust produced by each flap. Decreasing the amplitude of the flapping motion decreases the amount of air displaced by each flap of the wing, thereby decreasing the amount of thrust produced by each flap.

Birds and insects also use elastically stored energy to reduce the amount of energy that must be put into each flap of their wings. When a bird flaps its wings in an upward motion, for example, muscles on the bottom of the bird's body elastically expand and store energy. When the flapping motion reaches it upper peak, these muscles tend to contract like a rubber band, and this elastic energy is used to help pull the wing in a downward flapping motion. Similarly, the downward flapping motion causes muscles on the top of the bird's body to expand and store energy, like a rubber band. When the flapping motion reaches its downward peak, this stored energy is used to help pull the wing in an upward flapping motion. The process is repeated, and the elastically stored energy enables the bird or insect reduce the amount of additional energy that is expended on each flap of its wings.

Engineers have recognized some of the advantages of modeling MAVs after birds and insects. Thus, some biologically inspired MAV designs have been attempted. Some of these designs include the MicroBat, Mentor, and Delfly models. However, all of these models lack appreciable flight time, appreciable payload capacity, the ability to fly in six degrees of freedom (i.e., hovering and VTOL capabilities).

In order to mimic birds and insects, engineers have attempted to design MAVs with flapping wings (ornithopters). The great majority of these designs, however, have been modeled after birds and insects with only two wings. The use of two wings limits the lifting power that can be generated while staying within the MAV sizing parameters. In addition, in prior designs, the wings were not independently controlled. Because the wings were not independently controlled, modifying the flapping amplitude and/or frequency of each individual wing was not possible. These designs also required a tail rudder, elevator, or other flight control mechanisms to perform various flight maneuvers and movement in six degrees of freedom.

Unlike many birds and insects, current designs do not utilize resonance to reduce the amount of energy needed to flap the wings. When an increase or decrease in thrust is needed, these designs simply flap the wings faster or slower, thereby increasing or decreasing the frequency of the flapping motion. This can be an inefficient way to produce and/or modify thrust. For these reasons, known MAVs with flapping wings are inefficient, have low lifting power, and are overly complex. Moreover, the inefficiencies and low lifting power associated with these MAVs require that they either have small power supplies that exhaust quickly, or be tethered to an external power supply.

Accordingly, while engineers have modeled MAVs after some birds and insects, there are many designs that have not yet been attempted. Some of these designs can potentially offer the benefits of both fixed-wing and rotary-wing aerial vehicles, without many of the drawbacks. Specifically, some of these designs can offer an efficient MAV with relatively high payload capacity, the ability to hover, the ability to glide or fly like an airplane, VTOL capability, and maneuverability in six degrees of freedom.

What is needed, therefore, is a more efficient MAV with improved payload capacity that has the capabilities of both fixed-wing and rotary-wing aerial vehicles. It is to such a system and design that embodiments of the present invention are primarily directed.

SUMMARY OF THE INVENTION

Embodiments of the present invention relate to a Micro Aerial Vehicle (MAV), and more specifically to a multi-winged, flapping MAV with independent wing control. The device can comprise four or more wings pivotally coupled to a central chassis. The MAV can further comprise a control system capable of providing independent amplitude control and/or independent frequency control for each wing. The overall lift of the MAV can be controlled by varying the amplitude of the wings, the frequency of the wings, or both. The wings can be stopped in flight to provide fixed wing flight.

Embodiments of the present invention can comprise a flying machine comprising a central chassis section with four or more independently controlled wings pivotally coupled to the central chassis section. The flying machine can further comprise an actuation system for flapping the four or more wings. In some embodiments, the actuation system can change the lift provided by each of the four or more wings by varying the amplitude of the flapping of each wing, the frequency of the flapping of each wing, or both. In some embodiments, the actuation system can flap the four or more wings at, or near, zero amplitude to provide fixed-wing, or fixed-wing like, flight.

In some embodiments, the actuation system can flap the four or more wings at a fixed amplitude and vary overall lift by varying frequency. In other embodiments, the actuation system can flap the four or more wings at a fixed frequency and vary overall lift by varying amplitude. In some embodiments, the fixed frequency can be approximately the resonant frequency of the four or more of the wings. In other embodiments, the actuation system can vary overall lift by varying amplitude and frequency concurrently. In some embodiments, the flapping motion of each wing can further comprise a feathering motion.

In some embodiments, pair of wings can be offset by a phase angle. In some embodiments, for example, the four or more wings can comprise a front pair of wings and a rear pair of wings and the flapping motion of the front pair of wings and the rear pair of wings can offset by a phase angle. In a preferred embodiment, the phase angle is positive when the rear wings lead the front wings and negative when the front wings lead the rear wings. In some embodiments, the phase angle can be between approximately 15 and 60 degrees. In some preferred embodiments, the phase angle is approximately 45 degrees. In other preferred embodiments, the phase angle is approximately 25 degrees.

Embodiments of the present invention can further comprise a variety of actuation systems. In some embodiments, the actuation system can comprise a hypocycloidal gear drive system. In other embodiments, the actuation system can comprise one or more four bar linkages. In still other embodiments, the actuation system can comprise one or more cam and follower actuators. In yet other embodiments, the actuation system can comprise one or more magnet and coil actuators. In some embodiments, the actuation system can further comprise a spring moving near resonance to reduce actuation system power consumption.

The flying machine can also comprise a control system capable of transitioning between hovering flight and fixed-wing flight and between fixed wing flight and hovering flight. In some embodiments, the control system can perform this transition while maintaining the frequency of the four or more wings at around a fixed frequency. In some embodiments, the fixed frequency can be approximately the resonant frequency of one of the four or more of the wings. In other embodiments, the fixed frequency is approximately the resonant frequency of a pair of the four or more of the wings. In still other embodiments, fixed frequency can be approximately the resonant frequency of all of the four or more of the wings.

Embodiments of the present invention can also comprise a flying machine comprising a central chassis section and four or more independently controlled wings pivotally coupled to the central chassis section. The flying machine can also comprise a drive system comprising one or more gear train systems for flapping the four or more wings and one or more drive motors for driving the one or more gear train systems. In a preferred embodiment, the gear train systems can flap each of the four or more wings with variable amplitude, while the speed of the one or more drive motors can be varied to flap the four or more wing with variable frequency.

In some embodiments, the four or more wings can be driven by a single drive motor enabling the drive motor to flap the four or more wings at variable frequency based on the speed of the drive motor. In other embodiments, each pair of the four or more wings can be driven by a separate drive motor enabling each separate drive motor to flap each pair of the four or more wings at variable frequency based on the speed of the drive motor. In still other embodiments, each of the four or more wings can be driven by a separate drive motor enabling each separate drive motor to flap each of the four or more wings at variable frequency based on the speed of each drive motor.

In some embodiments, the drive system can flap each of the four or more wings at approximately the resonant frequency of one of the four or more of the wings. In other embodiments, the drive system can flap each of the four or more wings at approximately the resonant frequency of a pair of the four or more of the wings. In still other embodiments, the drive system can flap each of the four or more wings at approximately the resonant frequency of the four or more of the wings.

Embodiments of the present invention can further comprise a control gear set located at each of the four or more wings. Each of the control gear sets can comprise, for example, a ring gear movable between a first position and a second position and one or more spider gears located inside the ring gear and in geared engagement with the ring gear. In some embodiments, a first spider gear of the one or more spider gears can comprise a drive pin for converting rotary motion to reciprocating motion. In this configuration, when the ring gear is in the first position, the reciprocating motion of the drive pin can be substantially vertical, while when the ring gear is in the second position, the reciprocating motion of the drive pin can be substantially horizontal. In other words, rotating the ring gear from the first position to the second position enables the reciprocating motion of the drive pin to transition from substantially vertical motion to substantially horizontal motion (and combinations thereof between the first position and the second position).

In some embodiments, each control gear set can further comprise a flapping actuator pivotally coupled to the central chassis section and in slideable engagement with the drive pin. In this configuration, rotating the ring gear in a first direction can move the reciprocation motion of the drive pin on the first spider gear in the horizontal direction, reducing the amplitude of the motion of the flapping actuator, while rotating the ring gear in a second direction can move the reciprocation motion of the drive pin on the first spider gear in the vertical direction, increasing the amplitude of the motion of the flapping actuator. In some embodiments, when the ring gear is in the second position, the motion of the flapping actuator can be reduced to approximately zero amplitude to provide fixed-wing, or fixed-wing like flight. In some embodiments, each control gear set can further comprising a phase gear, which can be in geared engagement with the ring gear, and can rotate the ring gear from the first position to the second position.

In other embodiments, the drive system can further comprise one or more transfer gears for transferring power from the one or more drive motors to each of the control gear sets.

In a preferred embodiment, the axis of rotation of the transfer gears, the ring gears, and the spider gears is about a first axis to provide gyroscopic stability about the first axis and a second axis and the axis of rotation of the motor is about a third axis to provide gyroscopic stability about the second axis and the third axis. In this manner, the drive system can provide gyroscopic stability in all three axes.

Embodiments of the present invention can further comprise a method of providing flight control for a flying machine. The method can comprise, for example, providing a flying machine with four or more flapping wings, each of the wings comprising independently controllable amplitude, independently controllable frequency, or both, and varying the amplitude or frequency of the flapping of each of the four or more wings to vary the lift provided by each of the wings. In some embodiments, the method can also comprise reducing the amplitude of the flapping of all of the four or more wings to zero, which can provide fixed wing flight. During fixed wing flight, it may be desirable to intermittently flap one or more of the wings to increasing the lift of one or more of the wings during fixed wing flight to provide energy savings and/or flight control.

In some embodiments, the four or more wings can be flapped at substantially the same amplitude, substantially the same frequency, or a combination thereof such that total lift, total thrust, or both produced is same for each wing to provide hovering flight. Varying the amplitude, the frequency, or both between a first set of wings, located proximate a rear portion of the flying machine, and a second set of wings located proximate a front portion of the flying machine, can be used to control pitch. Similarly, varying the amplitude, the frequency, or both between a first set of wings, located proximate a right portion of the flying machine, and a second set of wings located proximate a left portion of the flying machine, can provide roll control. Finally, varying the amplitude, the frequency, or both between a first set of wings, comprising a first wing located proximate a right, rear portion of the flying machine and a second wing proximate a left, front portion of the flying machine and a second set of wings, comprising a first wing located proximate a right, front portion of the flying machine and a second wing proximate a left, rear portion of the flying machine, can provide yaw control. In some embodiments, the amplitude and/or the frequency of the four or more wings can be varied to vary the overall lift provided by the four or more wings.

Embodiments of the present invention can further comprise a modular flying machine. In some embodiments, the modular flying machine can comprise two or more flying machines that can be coupled to provide, for example, variable payload capacity. The modular flying machine can comprise, for example, a first flying machine comprising a first central chassis section, a first set of two, four or more independently controlled wings, pivotally coupled to the first central chassis section, a first gear train system for flapping the first set of two, four or more wings, and a first set of one or more drive motors for driving the first gear train system. The second flying machine can comprise a second central chassis section, a second set of two, four or more independently controlled wings, pivotally coupled to the second central chassis section, a second gear train system for flapping the second set of two, four or more wings, and a second set of one or more drive motors for driving the second gear train system.

In this configuration, the first and second central chassis sections can be coupleable (i.e., by bolting, welding, gluing, or other suitable means) to form the modular flying machine. As before, the first and second gear train systems can flap the first and second sets of wings with variable amplitude, and the speed of the first and second sets of one or more drive motors can be varied to flap the first and second sets of wings with variable frequency.

These and other objects, features and advantages of the present invention will become more apparent upon reading the following specification in conjunction with the accompanying drawing figures.

BRIEF DESCRIPTION OF THE FIGURES

FIG. 14a depicts a hypocycloidal gear train with a drive pin in a first position, in accordance with some embodiments of the present invention.

FIG. 14b depicts a hypocycloidal gear train with the drive pin in a second position, in accordance with some embodiments of the present invention.

FIG. 14c depicts a hypocycloidal gear train with the drive pin in a third position, in accordance with some embodiments of the present invention.

FIG. 14d depicts a hypocycloidal gear train with the drive pin in a fourth position, in accordance with some embodiments of the present invention.

FIG. 14e depicts a hypocycloidal gear train with the drive pin in a fifth position, in accordance with some embodiments of the present invention.

FIG. 14f depicts a hypocycloidal gear train with the drive pin in a sixth position, in accordance with some embodiments of the present invention.

FIG. 14g depicts a hypocycloidal gear train with the drive pin in a seventh position, in accordance with some embodiments of the present invention.

FIG. 14h depicts a hypocycloidal gear train with the drive pin in an eighth position, in accordance with some embodiments of the present invention.

FIGS. 43a-43d depict front and rear wing phasing for improved efficiency, in accordance with some embodiments of the present invention.

FIGS. 48a-d depict a MAV transitioning between hovering and gliding flight at different pitch angles, in accordance with some embodiments of the present invention.

DETAILED DESCRIPTION OF THE INVENTION

Figure 1:
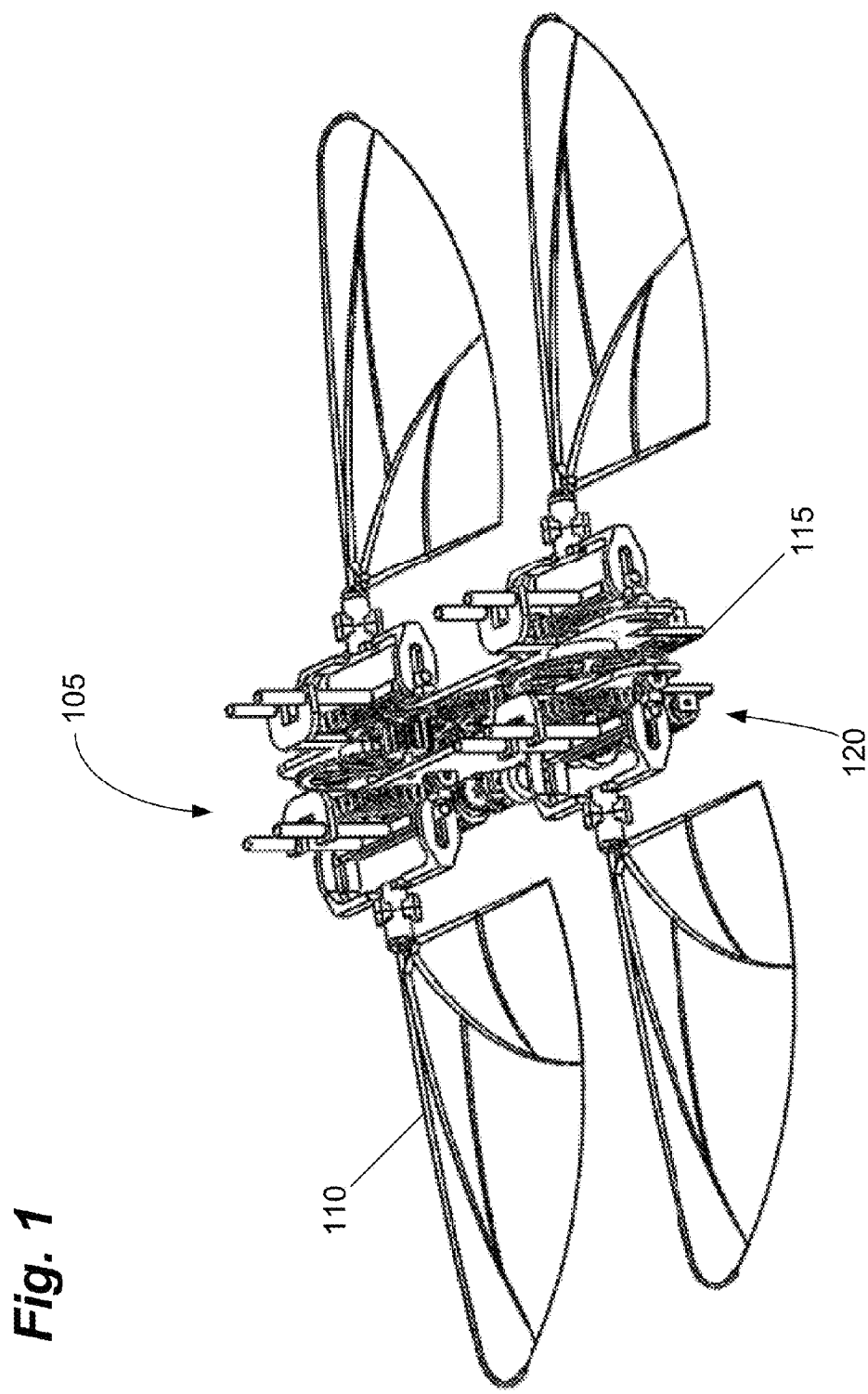
FIG. 1 depicts a perspective view of an MAV, in accordance with some embodiments of the present invention.

Embodiments of the present invention relate to a Micro Aerial Vehicle (MAV) inspired by a dragonfly. The MAV can fly in six degrees of freedom. The MAV can have a plurality of wings, and each wing can flap independently. The wings can also flap at various frequencies and amplitudes. In some embodiments, the wings can flap at a constant frequency, while the amplitude of the flapping motion is varied to increase or decrease the thrust produced. In other embodiments, the wings can flap at a constant amplitude, while the frequency of the flapping motion is varied to adjust thrust. In some embodiments, both the frequency and the amplitude of the flapping motion can be varied to adjust thrust.

The wings can be connected to the body of the MAV through various mechanical linkages and systems. There can also be various control systems on, or in communication with, the MAV. These control systems can direct the wings to flap at different frequencies, different amplitudes, or even in different motions. The control systems can control the stability of the MAV. The control systems can also direct the MAV to fly to certain locations and/or perform certain tasks.

To facilitate an understanding of the principles and features of the various embodiments of the invention, various illustrative embodiments are explained below. Although preferred embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the preferred embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a system containing "a" component is intended to include other components in addition to the one named.

Also, in describing the preferred embodiments, terminology will be resorted to for the sake of clarity. It is intended that each term contemplates its broadest meaning as understood by those skilled in the art and includes all technical equivalents, which operate in a similar manner to accomplish a similar purpose.

Ranges may be expressed herein as from "about" or "approximately" one particular value and/or to "about" or "approximately" another particular value. When such a range is expressed, other exemplary embodiments include from the one particular value and/or to the other particular value.

The words "comprising," "containing," or "including" conveys that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described hereinafter as making up the various elements of the present invention are intended to be illustrative and not restrictive. Many suitable materials that would perform the same or a similar function as the materials described herein are intended to be embraced within the scope of the invention. Such other materials not described herein can include, but are not limited to, materials that are developed after the time of the development of the invention.

As described above, fixed-wing MAVs are among the most efficient of current deigns, and can therefore fly for relatively long periods of time with heavier payloads. However, fixed-wing MAVs have certain limitations. For example, they cannot hover or fly backwards, and have difficulty flying at low speeds. Rotary-wing MAVS can generally hover, fly at slow-speeds, and move in any direction. Unfortunately, rotary-wing MAVS are generally not as efficient as fixed-wing models, and therefore they have shorter maximum flight times and smaller payload capacities.

Embodiments of the present invention, therefore, provide an efficient MAV that can hover and take off and land vertically (VTOL capable). The MAV can fly in six degrees of freedom, and does not require a tail rudder, elevator, or similar mechanisms. In some embodiments, the MAV can be generally modeled after a dragonfly. Therefore, like a dragonfly, the MAV can have a body and four wings. If desired, however, the MAV can have more than four wings or less than four wings. The MAV can also have actuation systems that cause the wings to flap and lock in a gliding position. The MAV can also have various control systems that allow a user, or users, to control the MAV from a remote location.

Exemplary general designs, actuation systems, and control systems of the present invention are described below, along with descriptions of the hovering and gliding capabilities of the MAV and the wing phasing capabilities.

General Designs

The MAV of the present invention can generally be inspired by, and/or modeled after, a dragonfly. Like a dragonfly, the MAV can have a body and four-wings. The four-winged design improves energy reserve utilization for both electronics and actuators and generates a large amount of propulsion, thereby improving the payload capability of the MAV. The four-winged design also utilizes phasing between and hind wings, thereby improving the aerodynamic efficiency of the MAV. In addition, the four winged design improves energy efficiency compared to a two-winged design. The 4-wing design is complete it its ability to perform maneuvers in six degrees of freedom without additional actuation, control actuators, or other mechanisms.

As mentioned above, MAVs operate in a different aerodynamic regime than larger, conventional aircraft. This is due, at least in part, to the Reynolds number of the flow over the wings of the MAV. Specifically, compared to conventional aircraft, the Reynolds number over an MAV's wings is generally much smaller due to the MAV's small size. The smaller Reynolds number means that larger aerial vehicles cannot simply be shrunk to MAV size, as significant losses in efficiency result.

To overcome some of the difficulties presented by small-scale aerodynamics, engineers have attempted to model MAVs after small flying animals, such as birds and insects. Birds and insects are notoriously efficient flyers, as their body structure and aerodynamic characteristics are very finely tuned. A dragonfly, for example, flies in a very similar aerodynamic regime to an MAV, and is very efficient. This efficiency is due to several factors, including, but not limited to, the number of wings (four), resonant wing flapping, and forewing-hindwing aerodynamic interaction due to phasing.

Figure 2:
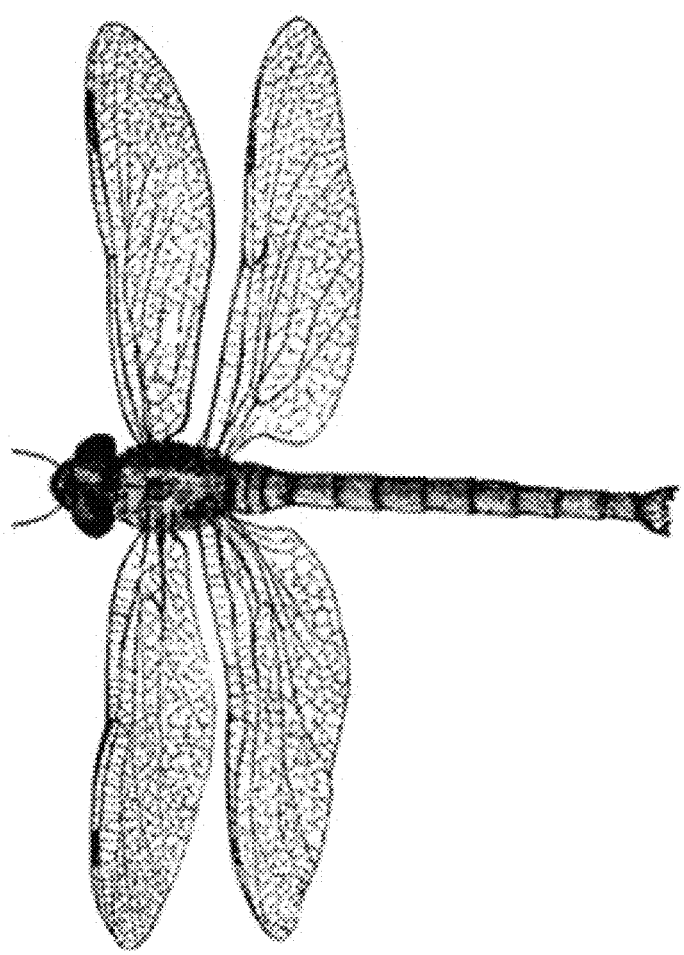
FIG. 2 depicts a top view of a dragonfly.

Referring now in detail to the drawing figures, FIG. 1 depicts an MAV in accordance with some embodiments of the present invention. FIG. 2 is an image of a dragonfly. As can be seen by comparing FIGS. 1 and 2, although the MAV is generally inspired by a dragonfly, there can be structural and mechanical differences between the MAV and a dragonfly. In some embodiments, for example, the wings of the MAV can be spaced further apart than the wings of the dragonfly. This spacing helps to simplify pitch and yaw control for the system by increasing the distance between the wings. This enables the wings to create a large moment about the center of mass of the MAV (and other important locations) without requiring additional thrust.

FIG. 1 shows an embodiment of the MAV of the present invention with a body 105 and four wings 110. As shown, the body 105 can be long and slender. Of course, the body 105 can be a variety of shapes. For example, the body 105 can be longer than it is wide, or wider than it is long. The body 105 can also take on a variety of geometric shapes. The body 105 can be, for example, generally shaped like a rectangular prism or a cylinder. The shape of the body 105 can also be modified based on the particular task that the individual MAV is designed to carry out, such as carrying a particular payload. If the MAV is designed to carry a camera of a certain size and shape, for example, the body 105 can be modified to accommodate the size and shape of the camera.

In addition, the body 105 can be shaped to aid in camouflaging the MAV, or to aid in avoiding visual detection, audible detection, radar detection, laser detection, infrared detection, and/or ultrasonic or other sensor detection. In embodiments where the MAV has more than four wings 110, the shape of the body 105 can be modified to accommodate the additional wings.

The body 105 of the MAV can be made from various materials. In some embodiments, the body 105 can be made from one or more thermoplastics, including, but not limited to, polyethylene, polypropylene, polystyrene, and polyvinyl chloride. The body 105 can also be made from metallic components, such as aluminum, titanium, or steel. In some embodiments, the body 105 can be constructed from a light weight wood, such as, for example, balsawood.

As shown in FIG. 1, the body 105 can comprise a chassis section 115 and the wings 110 can be disposed proximate the corners of the MAV. One wing 110 can be disposed proximate each of the front left, front right, back left, and back right corners of the MAV.

Figure 3:
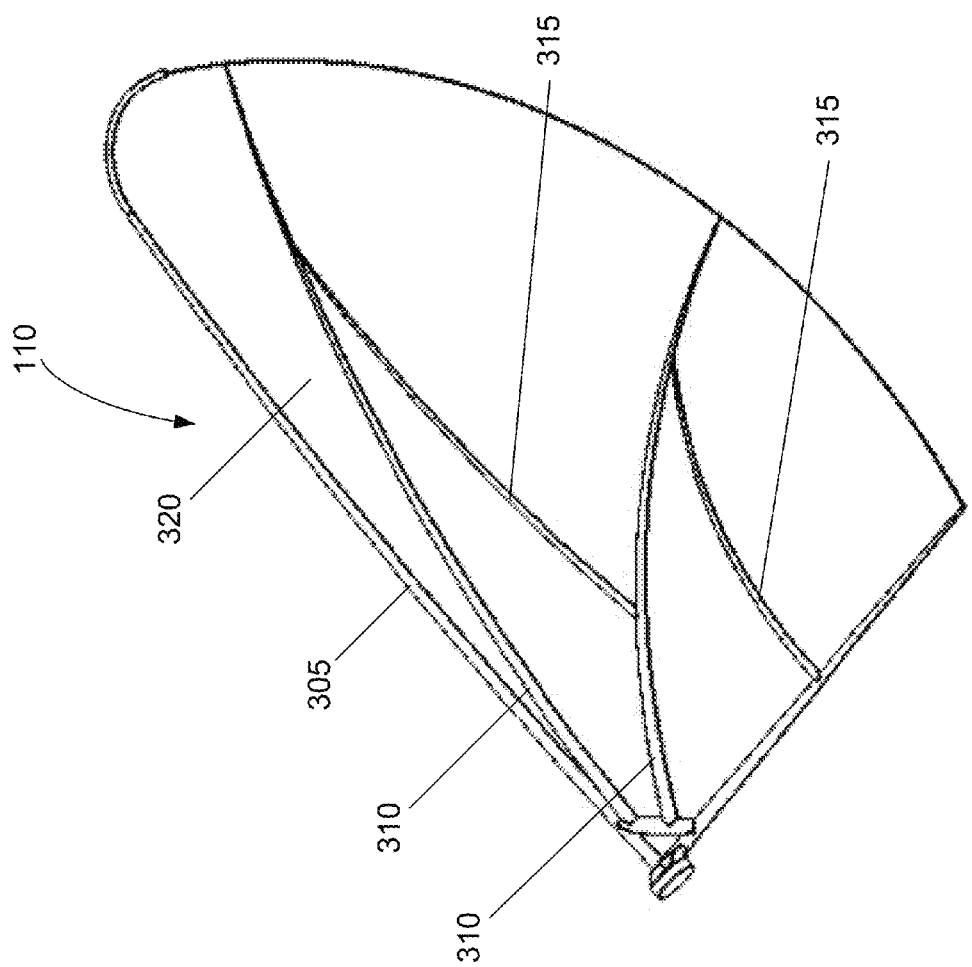
FIG. 3 depicts a perspective view of a wing of an MAV, in accordance with some embodiments of the present invention.

As shown in FIG. 3, the wings 110 can comprise a wing spar (or "wing beam") 305 near the leading edge of each wing 110. The wings 110 can also comprise one or more ribs 310 and stringers 315. The ribs 310 and stringers 315 can be attached to the wing spar 305 and/or to each other. In some embodiments, the spar 305, ribs 310, and stringers 315 can be the thickest elements on the wing 110 and can provide structural integrity to the wing 110. In some embodiments, the ribs 310 can generally extend from the leading edge of the wing 110 back toward the trailing edge of the wing 110. The stringers 315, on the other hand, can connect a plurality of ribs 310 together, and can therefore provide additional structural support.

The spars 305, ribs 310, and stringers 315 can also support the skin 320 of the wing 110. The skin 320 can be a thin layer disposed between the spars 305, ribs 310, and stringers 315. In some embodiments, the skin 320 can generate most of the wing's aerodynamic lift.

The spars 305, ribs 310, and stringers 315 can comprise rigid or semi-rigid material, including various polymers, such as, for example but not limitation, ABS or Nylon. In some embodiments, the spar 305, ribs 310, stringers 315, and skin 320 can be formed together as one polymer piece. In these embodiments, the spars 305, ribs 310, and stringers 315 can be thickened portions of the polymer piece.

In some embodiments, the skin 320 can comprise titanium mesh with a parylene coating. In other embodiments, the spars 305, ribs 310, and stringers 315 can comprise various plastics or metals, and the skin 320 can comprise a Mylar coating. The spars 305, ribs 310, stringers 315, and skin 320 can also comprise various thermoplastics, such as, for example and not limitation, polyethylene, polypropylene, polystyrene, and polyvinyl chloride, and combinations thereof. The spars 305, ribs 310, and stringers 315 can also comprise one or more of aluminum, steel, titanium, and light weight wood, such as balsa wood.

In some embodiments, the wing 110 can be cambered. A rigid, cambered wing 110 can catch more air than a wing 110 that flexes on the downstroke, or a wing 110 that is not cambered. The cambered wing 110 can generate more lift and operate more efficiently than a wing 110 without a camber. The camber can enable the wing 110 to flex during the upstroke, thereby minimizing drag. The camber can also increase the rigidity of the wing 110 on the downstroke.

Figure 4:
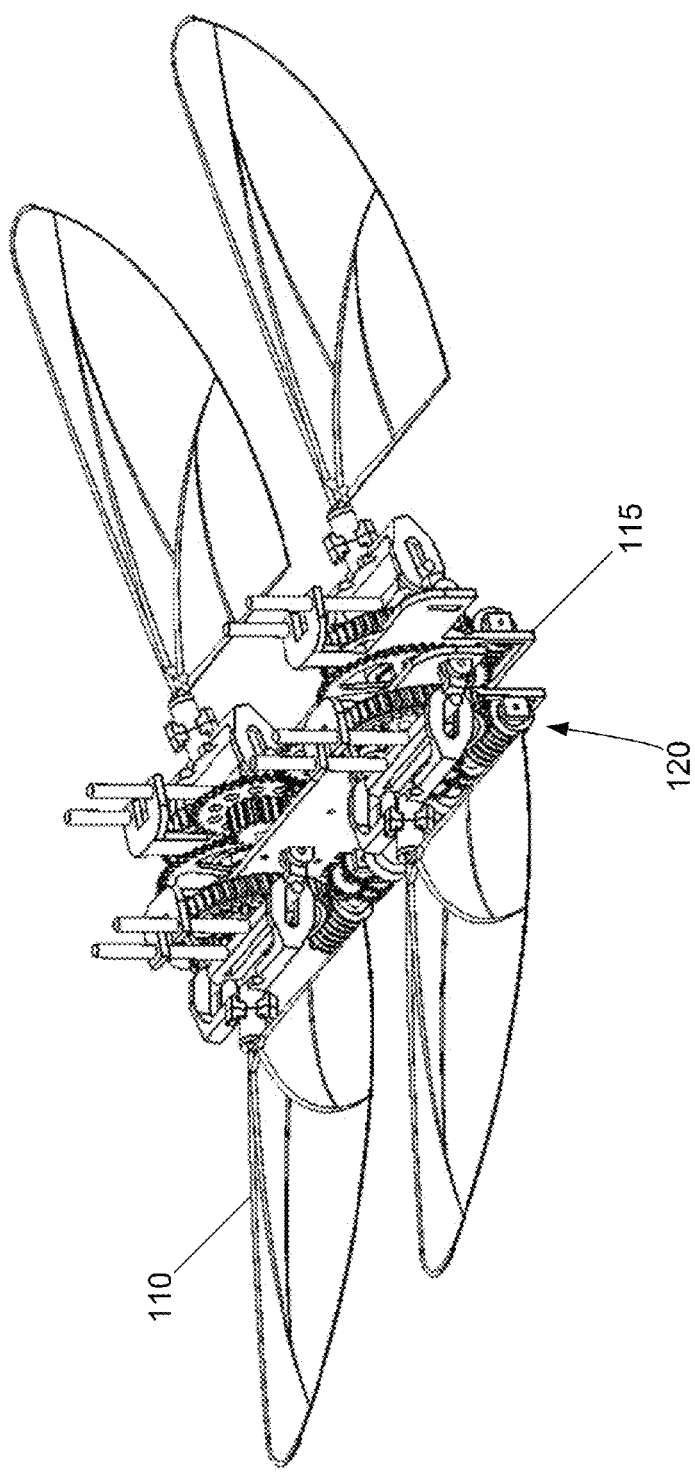
FIG. 4 depicts another perspective view of the MAV of FIG. 1, in accordance with some embodiments of the present invention.

As shown in FIGS. 1 and 4, the wings 110 can be pivotably attached to the chassis 115 of the body 105 so that the wings 110 can flap in a generally vertical direction. In preferred embodiments, the wing spars 305 are pivotably attached directly to the chassis 115, or are attached to struts or braces connected to the chassis 115. In some embodiments, the wings 110 can fold when the MAV is not in use, thereby reducing the size of the MAV for storage.

In some embodiments, the MAV's wings 110 have only one active degree of freedom—that is, they only flap in one direction because they are constrained. For example, the wings 110 can flap vertically, or at an angle offset from vertical. Each wing 110 of the MAV can also have a second, passive degree of freedom. The second, passive degree of freedom gives the wings 110 the ability to feather, or rotate, about their longitudinal axis while flapping. In some embodiments, the wings 110 of the MAV have multiple active degrees of freedom and can flap in several directions between vertical and horizontal. These embodiments can also have feathering capability.

The MAV can comprise at least one actuation system 120 that causes the wings 110 to flap. The actuation system 120 can comprise, for example and not limitation, at least one motor, actuator, electrical system, or magnet and coil system. In preferred embodiments, there can be a plurality of actuation systems 120. For example, there can be four independent actuation systems 120. In these embodiments, each wing 110 can be mechanically or electrically coupled to one of the actuation systems 120, allowing each wing 110 to be controlled independently. Each wing 110 can therefore flap at a different frequency, amplitude, or in a unique flapping pattern.

As a further example, there can be one actuation system 120 that controls the flapping frequency of all wings 110 and supplementary actuation systems 120 that control the flapping amplitude of each wing 110 individually. In addition, there can be one actuation system 120 that controls the flapping frequency of two wings 110 (the front wings or the back wings, for example), and supplementary actuation systems 120 that control the amplitude of each wing 110 individually.

In this manner certain sets of wings 110 (the front wings, back wings, or, if applicable, middle wings) can be phase-controlled with respect to other sets of wine 110. In some embodiments, the actuation systems 120 can also hold the wings 110 stationary, allowing the MAV to glide. The actuation systems 120 are discussed in greater detail below.

In some embodiments, like a dragonfly, each wing 110 of the MAV can be capable of elastic storage and re-use of propulsion energy, which helps reduce the power requirements to flap the wing 110. In some embodiments, the wings 110 are flapped at their resonant frequency, or a frequency close to their resonant frequency. In some embodiments, the wings 110 are flapped at the resonant frequency of the system comprising the wing's elastic restoring joint and the wing 110 itself. In some embodiments, the inclusion of a spring in the wing's joint can affect the resonant frequency of the flapping motion.

Flapping the wings 110 at or near resonant frequency can reduce the amount of power required to flap the wings 110. This is because systems vibrating, or flapping, at or near their resonant frequency have a tendency to continue to vibrate, or flap, due to the inherent vibrational energy at this frequency. Thus, less energy input is required to maintain a flapping motion at, or near, a resonant frequency than at other frequencies.

In some embodiments, therefore, the MAV of the present invention can employ Fixed Frequency, Variable Amplitude (FiFVA) wing flapping. This means that the frequency of the wings' flapping can be constant, while the amplitude of the flapping is modified to adjust the amount of thrust produced. To produce a larger amount of thrust, for example, the amplitude of a wing's flapping motion can be increased. To produce a lesser amount of thrust, the amplitude of a wing's flapping motion can be decreased. Increasing the amplitude of the flapping motion increases the amount of air displaced by each flap of the wing 110, thereby increasing the amount of thrust produced by each flap. Decreasing the amplitude of the flapping motion decreases the amount of air displaced by each flap of the wing 110, thereby decreasing the amount of thrust produced by each flap.

In some embodiments, the use of an elastic mechanism, such as one or more springs, in the actuation system 120 can also aid in the elastic storage and re-use of energy. In birds and insects, for example, elastic energy stored in the animal's muscles helps to reduce the amount of energy that is required to flap the wings. In some embodiments, therefore, a spring 405 can serve a similar function. A torsion spring, for example, can engage the wing spar 305 and a strut or brace on the chassis 115 of the MAV. In some embodiments, the torsion spring can be in an equilibrium position when the wing 110 is substantially horizontal. When the wing 110 flaps up or down, therefore, the spring can be displaced. The force applied to the wing 110 by the displaced torsion spring can bias the wing 110 to return to horizontal, thereby introducing an elastic element into the flapping motion and reducing the amount of energy required to change the direction of the flapping motion. This, in turn, can reduce the amount of energy required to flap the wing 110 at certain frequencies.

In some embodiments, the MAV can be modular. The MAV can comprise a first MAV with a body and four or more independently controlled wings. The first MAV can have an actuation system for enabling the wings to flap. The MAV can also comprise a second MAV with a body and four or more independently controlled wings. The second MAV can also have an actuation system for enabling the wings to flap. The bodies and the actuation systems of the two MAVs can be coupled together so that they are in mechanical communication. In embodiments where actuators and gear trains flap the wings of the MAVs, the speed of the actuators can be varied to flap the wings of the first MAV and the wings of the second MAV with variable frequency.

An MAV with four independent, flapping wings 110 can have several advantages over conventional fixed-wing or rotary-wing MAVs. Four wings 110, for example, can provide increased lifting power. As a result, in some embodiments, the MAV can carry, for example and not limitation, excess payload, sensors, and processors. In addition, the wings 110 can flap at a resonant frequency, making it possible to sustain longer flight times with reduced energy requirements. An MAV with four wings 110 can also provide increased agility and maneuverability, while maintaining robust and stable flight performance through environmental disturbances like wind and air gusts.

Figure 5:
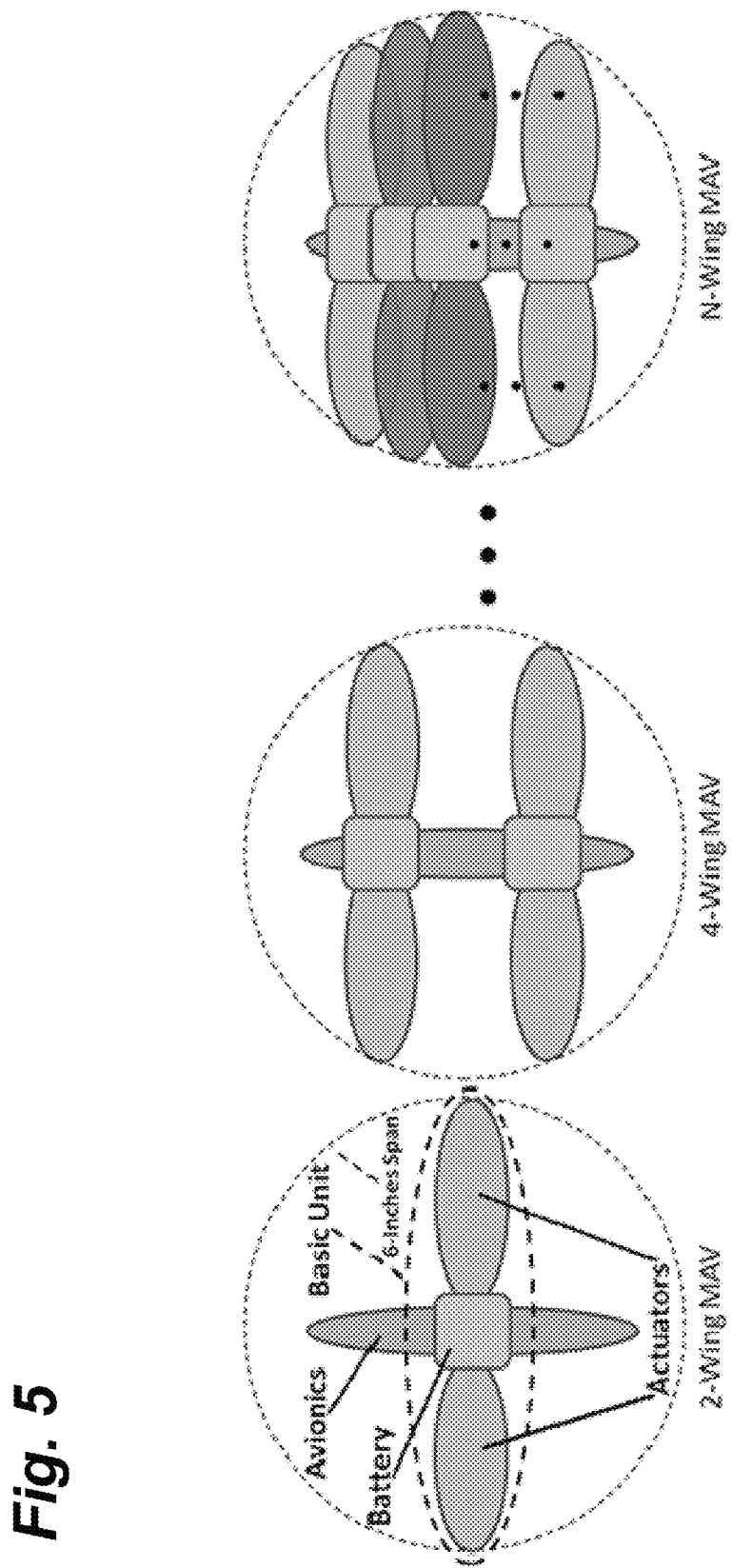
FIG. 5 depicts MAVs with different wing and power arrangements, in accordance with some embodiments of the present invention.

As shown in FIG. 5, the MAV can have two, four, or more wings 110 (an "N" number of wings). As discussed above, one of the advantages of a four-winged MAV is a possible increase in payload capability and onboard-energy reserves versus two-winged designs. This increase can be explained through the mathematical equations below. As certain assumptions must be made to derive the equations, all equations provide approximations. Nomenclature used below is explained in Table 1.

TABLE 1

| | |
|---|---|
| $W_{N\text{-}MAV}$ | Weight of N-Wing MAV |
| $W_{Actuator}$ | Weight of Actuator (Including wing-mechanism) |
| $W_{Battery}$ | Weight of the on-board Battery |
| $W_{Avionics}$ | Weight of the on-board Autopilot |
| $W_{Non\text{-}Avionics}$ | Weight of Battery, Ac|tuators, wings etc |
| $R_A$ | Ratio of $W_{Avionics}$ to $W_{Non\text{-}Avionics}$ |
| $E_{A_N}$ | Available Energy/Actuator in N-Wing Configuration |
| $E_{Battery}$ | Energy Reserve of each Battery |
| $E_{Avionics}$ | Energy Available to the Avionics |

For a two-winged MAV with one actuator, the weight and energy configurations can be:

$$2 \times W_{Actuator} + W_{Avionics} + W_{Battery} = W_{2\text{-}MAV}$$

$$2 \times E_{A1} + E_{Avionics} = E_{Battery}$$

Using these formulas, the available energy per actuator can be:

$$E_{A1} = \tfrac{1}{2}(E_{Battery} - E_{Avionics})$$

For an n-winged MAV (i.e., an MAV with an "n" number of wings), the weight and energy configurations can be:

$$\tfrac{n}{2} \times (2 \times W_{Actuator} + W_{Battery}) + W_{Avionics} = W_{n\text{-}MAV}$$

$$2 \times D_n \times E_{A_n} + E_{Avionics} = \tfrac{n}{2} \times E_{Battery}$$

In the above energy formula, $D_n$ is dependent on the weight of the MAV:

$$D_n = \frac{W_{n\text{-}MAV}}{W_{2\text{-}MAV}} = \frac{\tfrac{n}{2} \times W_{Non\text{-}Avionics} + W_{Avionics}}{W_{Non\text{-}Avionics} + W_{Avionics}}$$

Figure 6:
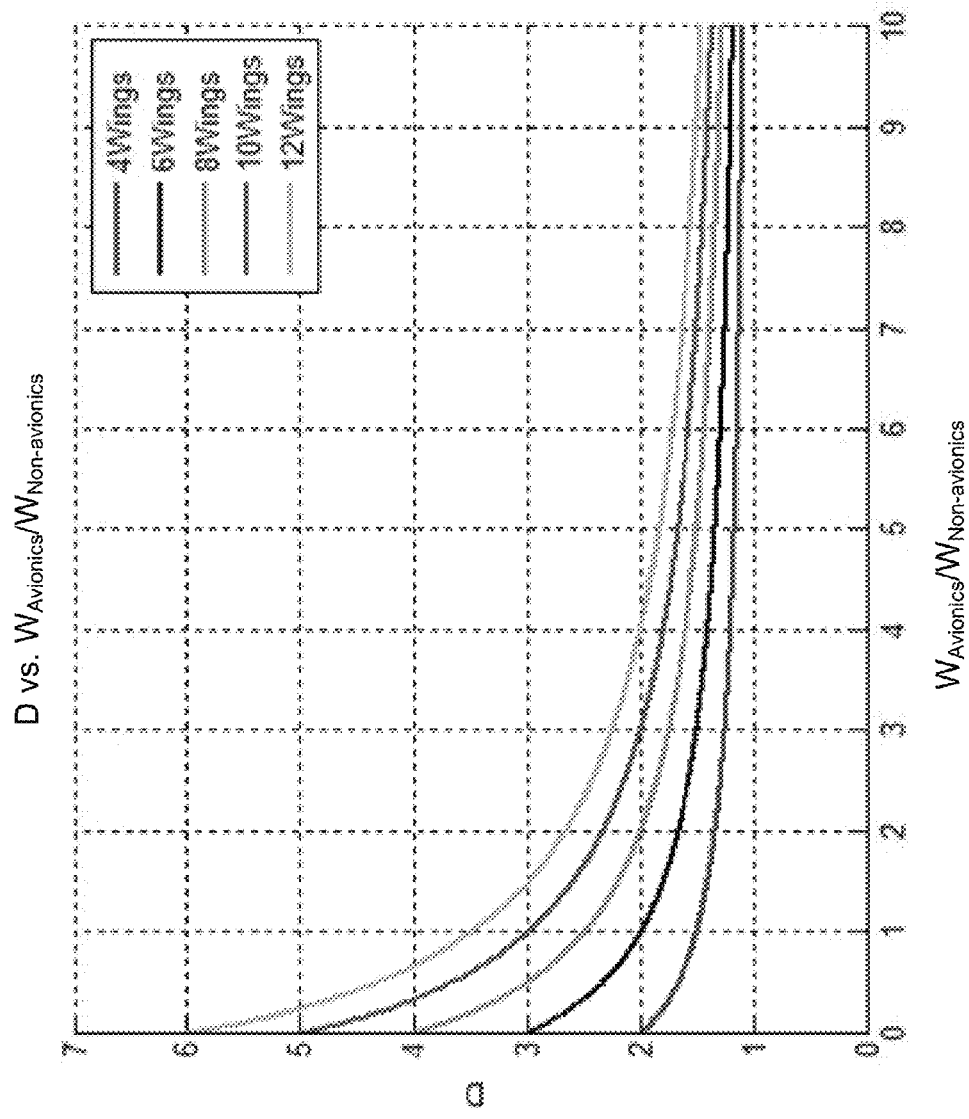
FIG. 6 is a graph of D versus the weight of the avionics divided by the weight of the non-avionics for several embodiments of the present invention.

As shown in FIG. 6, a four-winged configuration having $W_{Avionics} = 0$ has $D_4 = 2$. $D_n$ then falls in value towards $D_4 = 1$ as $W_{Avionics}$ increases. For this reason, doubling the number of wings on the MAV (from two to four, for example) does not double the weight of the MAV. More generally, this implies that the amount of energy available per actuator can increase as the number of wings increases on the MAV.

The energy reserves per actuator, in general, for a multi-winged MAV can therefore be given by:

$$E_{A_n} = \frac{1}{2 \times D_n}\left(\tfrac{n}{2} \times E_{Battery} - E_{Avionics}\right)$$

Thus, it can be determined that:

$$E_{Actuator}|_{n\text{-}MAV} \geq E_{Actuator}|_{(n-1)\text{-}MAV} \geq \dots$$

$$\dots \geq E_{Actuator}|_{4\text{-}MAV} \geq E_{Actuator}|_{2\text{-}MAV}$$

where equality is held if $W_{Avionics} = 0$. Practically, however, since every MAV needs some electronics to drive the actuators and for remote control operations, this situation is unlikely or impossible.

Finally, we can determine that for an n-winged MAV:

$$\frac{E_{A_n}}{E_{A_1}} = \frac{1}{D_n}\left(\frac{\tfrac{n}{2} - E_{Avionics}E_{Battery}}{1 - E_{Avionics}E_{Battery}}\right)$$

Figure 7:
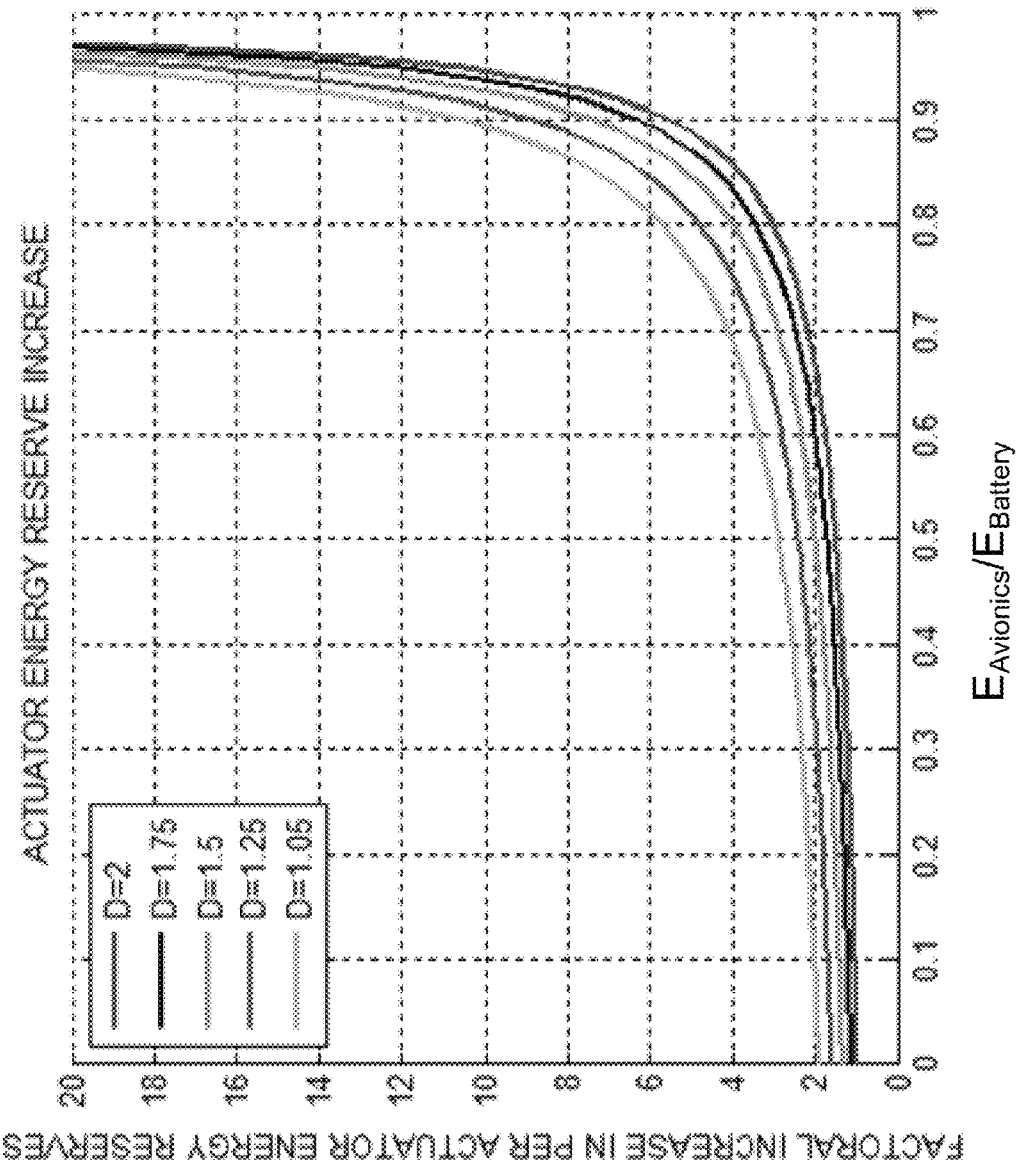
FIG. 7 is a graph of actuator energy reserve increase for several embodiments of the present invention.

As shown by the factorial increase in per actuator energy reserves in FIG. 7, the energy available to each actuator in a MAV with more than two wings can be greater than the energy available to each actuator in a two-winged MAV design. This is because the power consumption and weight of avionics can be about the same in all cases, but there can be more batteries, and hence more power storage, in a MAV with more than two wings.

Example 1

The above formulas show that, in some embodiments, an MAV with four wings 110 is more efficient that an MAV with two wings 110. For example, if the weight of the avionics is one-fourth the weight of the MAV i.e., ($W_{Avionics} = \tfrac{1}{4}W_{2\text{-}MAV}$) and the avionics consume one-half of the onboard energy i.e., ($E_{Avionics} = \tfrac{1}{2}E_{Battery}$), then increasing the number of wings 110 from two to four can result in an increase in reserve energy per actuator by 75% or more. This means that, in some embodiments, the flight time of the MAV can increase by 75% or more, or the payload capacity can increase by 75% or more.

Example 2

As a further example, assume that the weight of the avionics is one-half the weight of the MAV i.e., ($W_{Avionics} = \tfrac{1}{2}W_{2\text{-}MAV}$) and the avionics consume one-half of the on-board energy (in case of long range communication, video processing, Wi-Fi networking, among others) i.e., ($E_{Avionics} = \tfrac{1}{2}E_{Battery}$). In this case, increasing the number of wings 110 from two to four results in an increase in reserve energy per actuator of 100% or more. This means that, in some embodiments, the flight time of the MAV can increase by 100% or more, or the payload capacity can increase by 100% or more.

Figure 45:
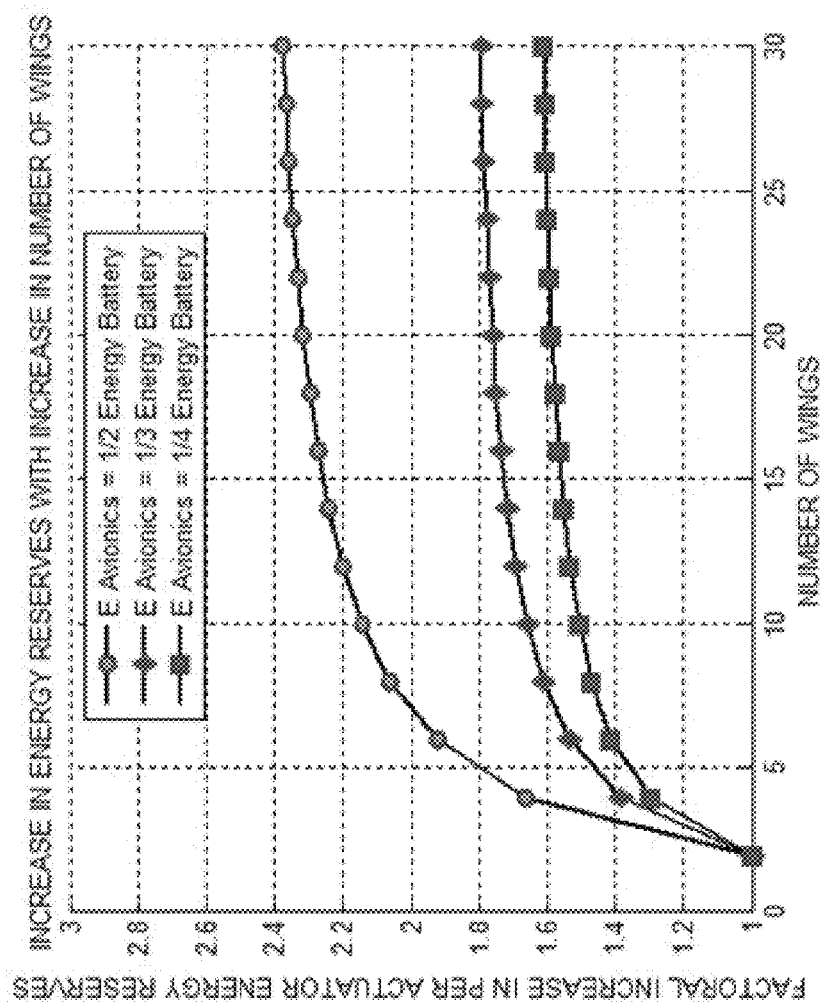
FIG. 45 is a graph depicting factorial increase in per actuator energy reserves vs. the number of wings on an MAV, in accordance with some embodiments of the present invention.

In addition, as shown in FIG. 45, the energy improvement (and the increase in efficiency) falls gradually with an increasing number of wings. Thus, the maximum percent gain can be obtained, in some embodiments, with a four-winged MAV.

Actuation Systems

In some embodiments, at least one actuation system 120 can flap the wings 110 of the MAV. The flapping motion, in turn, can cause the wings 110 to produce lift, which can enable the MAV to fly, hover, and perform various maneuvers. In some embodiments, the actuation systems 120 can also hold the wings 110 stationary, during certain flight regimes, allowing the MAV to glide.

In preferred embodiments, there can be an independent actuation system 120 coupled to each wing 110. In other embodiments, some components of the actuation system 120 can be coupled to all of the wings 110, and can control the flapping frequency of all the wings 110. In these embodiments, other components of the actuation system 120 can be coupled to each wing 110, and can control the flapping amplitude of individual wings 110. In these embodiments, the wings 110 can flap at a constant frequency, but each wing 110 can flap at varying amplitudes.

In addition, in some embodiments, there can be one actuation system 120 that controls the flapping frequency of two wings 110 (the front wings, back wings, or middle wings, for example), and supplementary actuation systems 120 that can control the flapping amplitude of each wing 110 individually. In this manner, certain sets of wings 110 (the front wings, back wings, or, if applicable, middle wings) can be phase-controlled with respect to other sets of wings 110. In addition, certain sets of wings 110 can flap at different frequencies than other sets of wings 110.

In a preferred embodiment, the wings 110 flap at a constant frequency. The constant frequency can be at, or near, the resonant frequency of the wings 110. Flapping the wings 110 at resonant frequency, or a frequency near the resonant frequency, improves the efficiency of the system because, at these frequencies, the wings 110 have a tendency to flap with little outside influence. For this reason, less energy is used to make the wings 110 continuously flap.

In fixed-frequency embodiments, varying the amplitude of each wing's flapping motion can vary the amount of thrust produced by the wing 110. In some embodiments, the actuation mechanisms 120 of the MAV can therefore flap the wings 110 at or near their resonant frequency, while having the ability to vary the amplitude of the flapping motion to increase or decrease thrust. This type of actuation mimics the flight dynamics of insects and birds.

Figure 8:
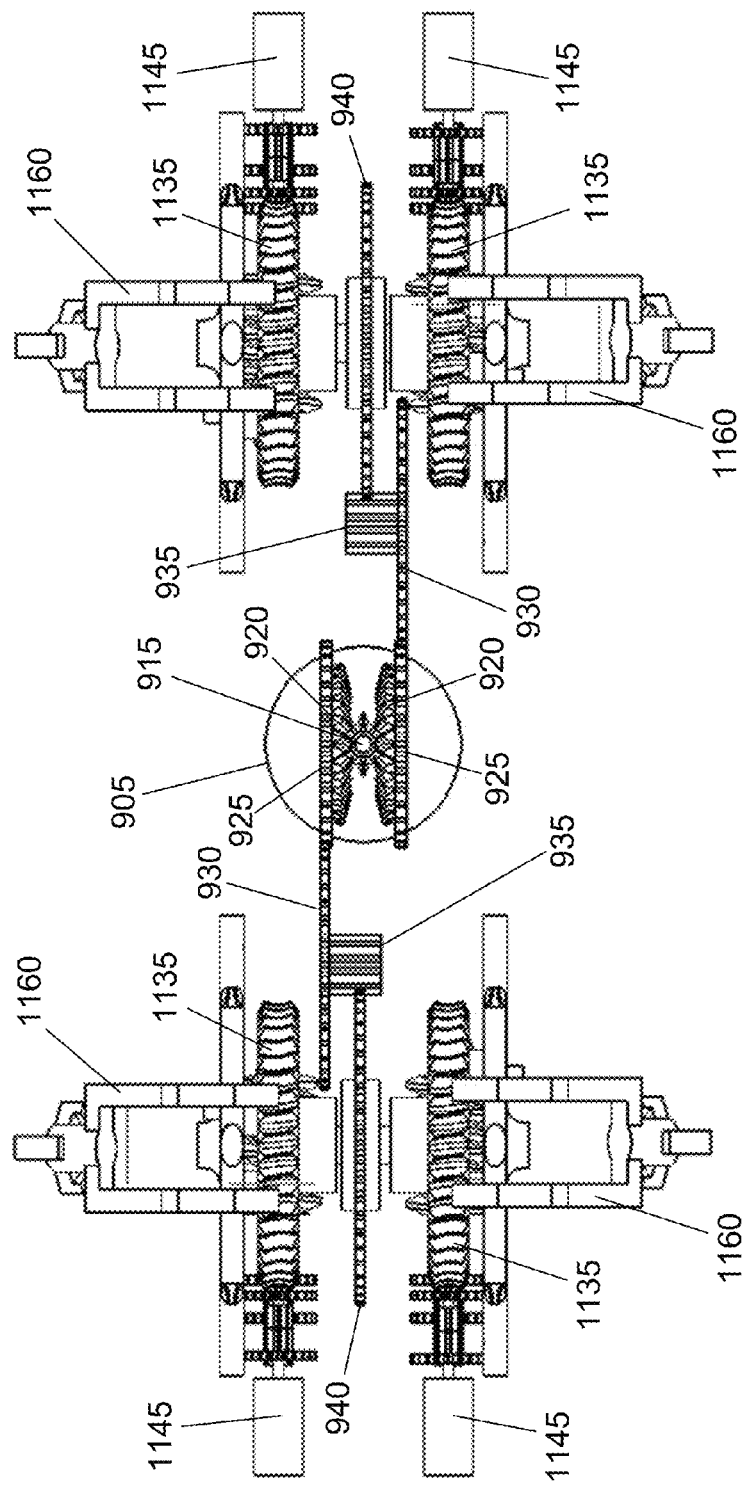
FIG. 8 depicts a top view of a geared actuation system for an MAV, in accordance with some embodiments of the present invention.
Figure 9:
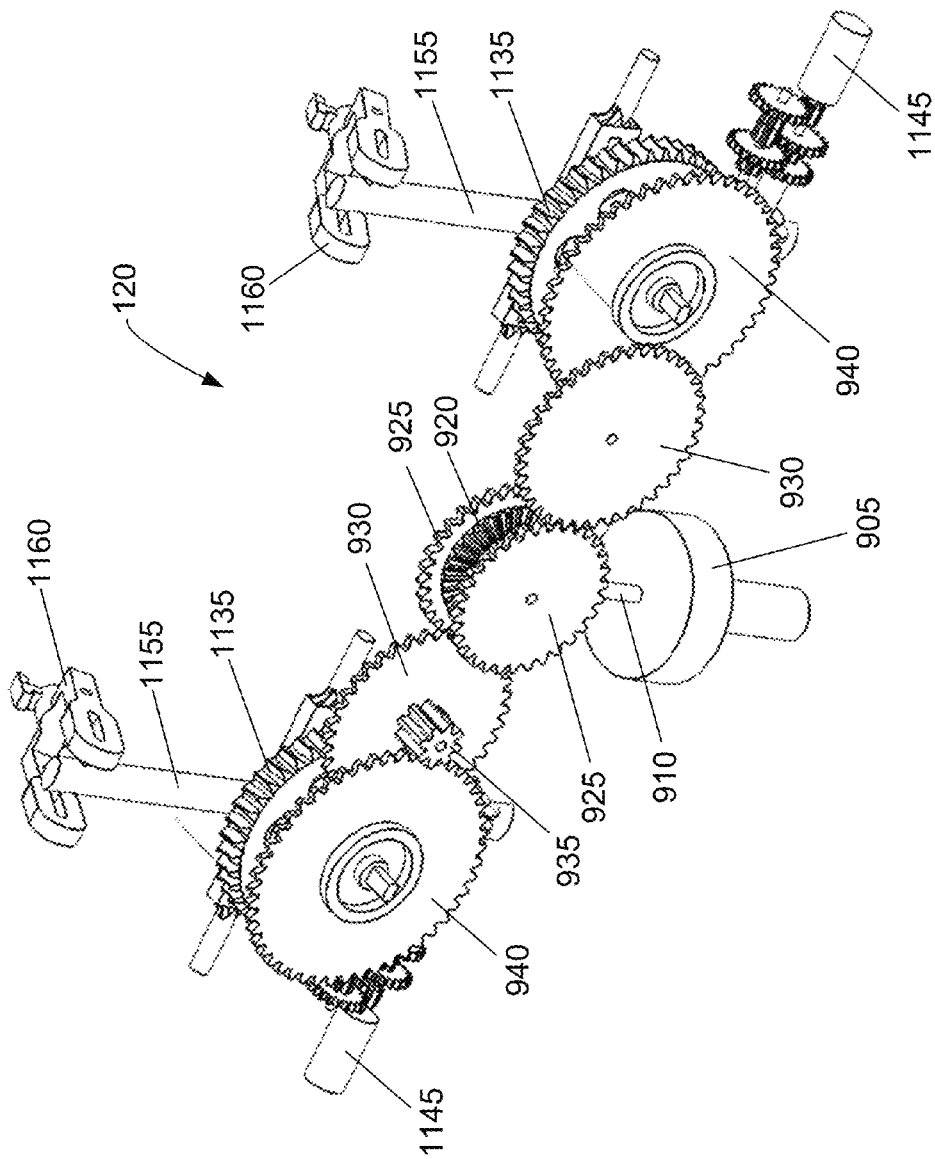
FIG. 9 depicts a perspective, detailed view of the geared actuation system of FIG. 8, in accordance with some embodiments of the present invention.

In some embodiments, shown in FIGS. 1 and 8-9, the actuation system can include a frequency-controlling drive motor (or "frequency controlling motor") 905 that causes a rotating driveshaft 910 to spin. The rotating driveshaft 910 can be mechanically connected through a gear train to a hypocycloidal gear train 1105, as shown in FIGS. 10-13. The hypocycloidal gear train 1105 can have a spider gear 1110 with a drive pin 1115 extending outwardly from the spider gear 1110. The drive pin 1115 can move vertically when the rotating driveshaft 910 spins, causing a yoke 1150 to move vertically. The vertical motion of the yoke 1150 can cause a wing 110 of the MAV to flap. In addition, the orientation of the hypocycloidal gear train 1105 can affect the amplitude of the flapping motion of the wing 110. This embodiment is described in greater detail below.

In some embodiments, as shown in FIG. 9, an actuation system 120 can include a frequency-controlling drive motor 905 that causes a rotating driveshaft 910 to spin. A first bevel gear 915 (see FIG. 8) can be disposed on the distal end of the driveshaft 910, and the first bevel gear 915 can rotate in unison with the driveshaft 910. The first bevel gear 915 can be engaged with a second bevel 920 gear such that the second bevel gear 920 rotates when the driveshaft 910 rotates.

The second bevel gear 920 can rotate in a plane that is perpendicular to the plane in which the first bevel gear 915 rotates. The second bevel gear 920 can be in geared engagement with a first spur gear 925 such that the second bevel gear 920 and the first spur gear 925 rotate in unison. The second bevel gear 920 can be disposed on the face of the first spur gear 925 or can be connected to the first spur gear 925 by a shaft. The first spur gear 925 can be in geared engagement with a second spur gear 930. The second spur gear 930 can be in geared engagement with a third spur gear 935 such that the second spur gear 930 and the third spur gear 935 rotate in unison. The third spur gear 935 can be disposed on the face of the second spur gear 930 or can be connected to the second spur gear 930 by a shaft. The third spur gear 935 can then be in geared engagement with a fourth spur gear 940.

In this manner, when the frequency-controlling motor 905 causes the rotating driveshaft to spin, the first bevel gear 915, the second bevel gear 920, the first spur gear 925, the second spur gear 930, the third spur gear 935, and the fourth spur gear 940 can all rotate. Moreover, the second bevel gear 920, the first spur gear 925, the second spur gear 930, the third spur gear 935, and the fourth spur gear 940 can all rotate in parallel planes. The gear train serves many purposes and has many advantages. Among the purposes and advantages are the ability to improve torque at the wings by gearing down the speed on the motor, the ability to distribute power to all four wings from one common actuator, and the ability to provide gyroscopic stability to the MAV during flight, among others.

Figure 11:
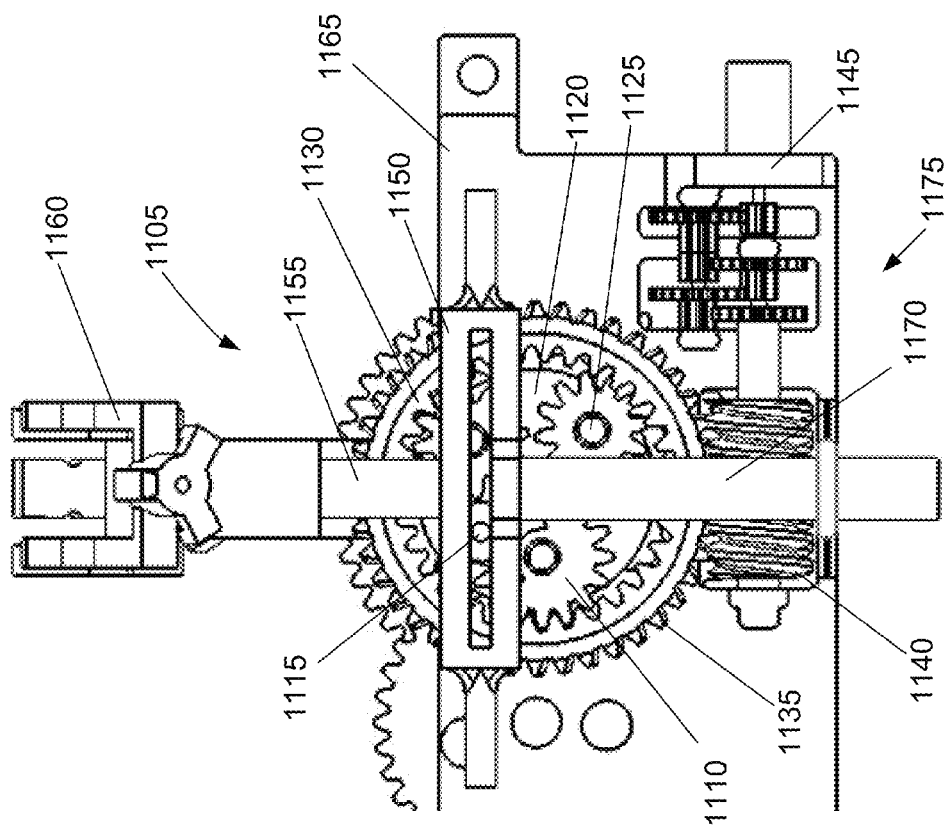
FIG. 11 depicts a side view of the geared actuation system of FIG. 8, in accordance with some embodiments of the present invention.

As shown in FIG. 11, in some embodiments, the fourth spur gear 940 can be connected to a backplate 1120 so that the fourth spur gear 940 and the backplate 1120 rotate in unison. The backplate 1120 can be substantially round, and can have at least one gearshaft 1125 extending out from a front face of the backplate 1120 away from the fourth spur gear 940. Each of the gearshafts 1125 of the backplate 1120 can have a spider gear 1110, or spur gear, disposed on the gearshaft 1125. The spider gears 1110 can rotate about each gearshaft 1125.

The spider gears 1110 can be engaged with an inner ring gear 1130. In this manner, when the inner ring gear 1130 rotates, the spider gears also 1110 rotate. The inner ring gear 1130 can be rotatably connected to a fifth gear 1135, which can be a worm-gear, a helical gear, a non-helical spur gear, or other type of appropriate gear. The fifth gear 1135 can be disposed on the outside of the inner ring gear 1130. In this manner, the inner ring gear 1130 and the fifth gear 1135 can rotate in unison.

Figure 10:
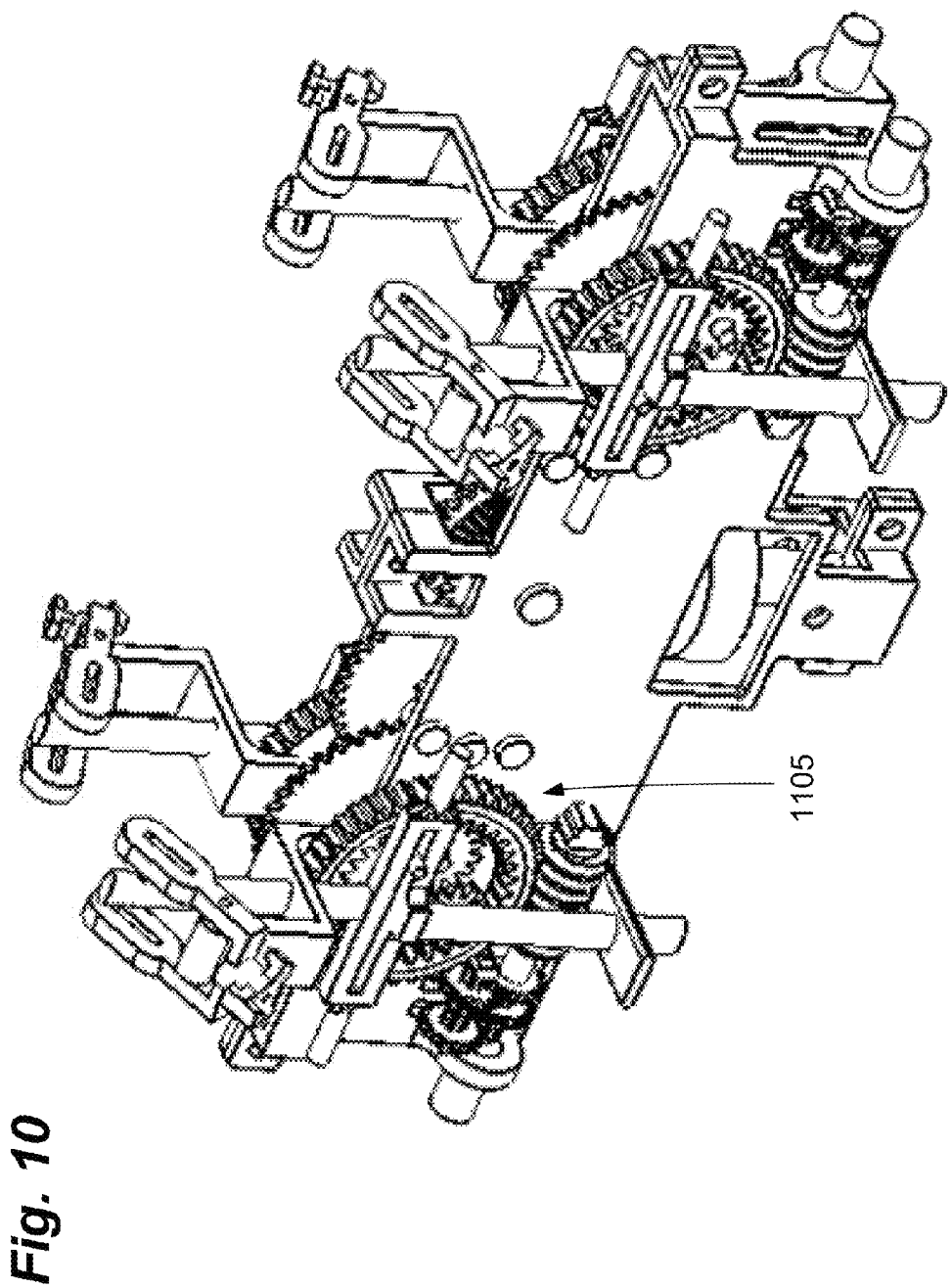
FIG. 10 depicts another perspective view of the geared actuation system of FIG. 8, in accordance with some embodiments of the present invention.
Figure 13:
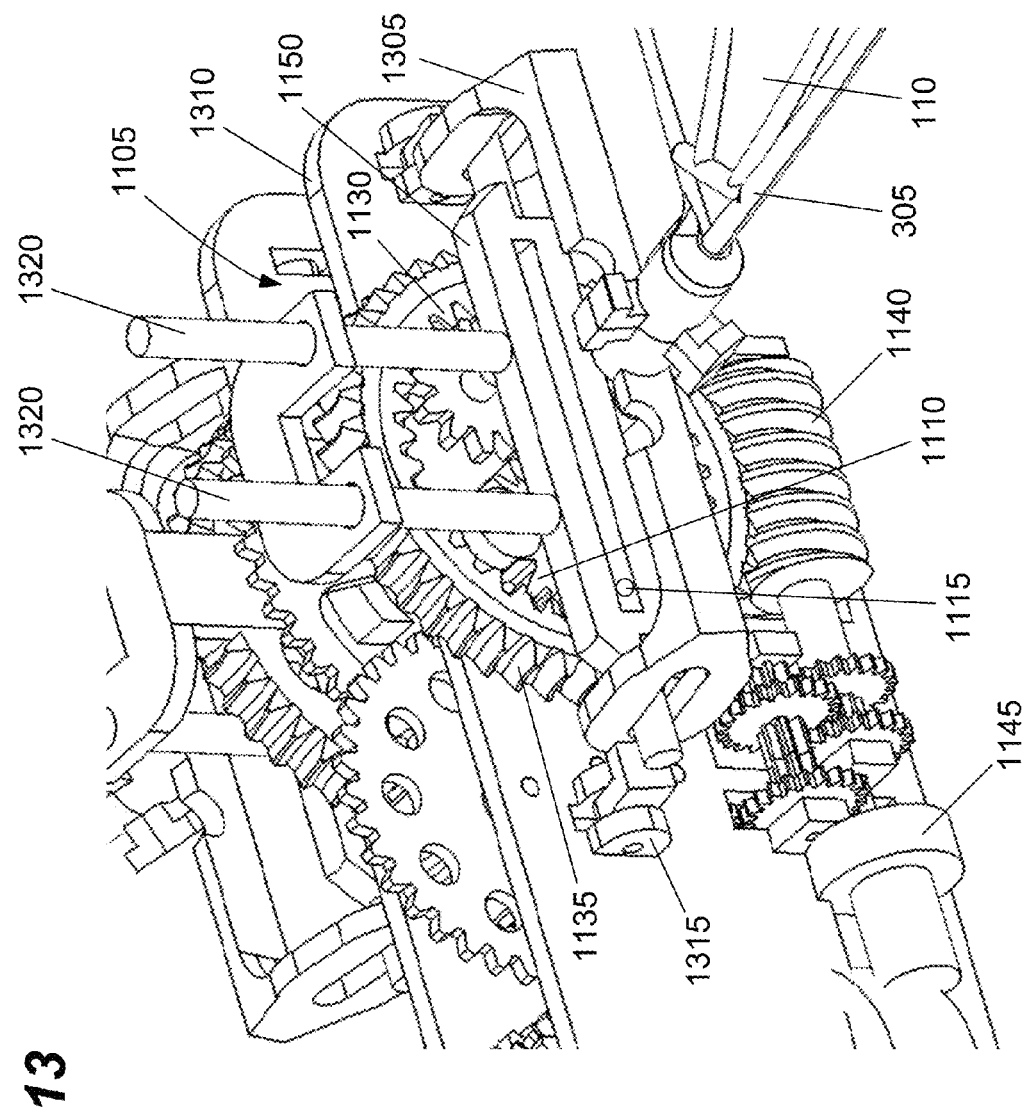
FIG. 13 depicts another perspective-view of the geared actuation system, in accordance with some embodiments of the present invention.

As shown in FIGS. 10, 11, and 13, the fifth gear 1135 can also be in geared engagement with a cylindrical worm 1140. The cylindrical worm 1140, in turn, can be engaged with an amplitude-controlling drive motor (or "amplitude-controlling motor") 1145. Optionally, there can be a gear train that mechanically connects the cylindrical worm 1140 and the amplitude-controlling motor 1145, or the cylindrical worm 1140 can be directly connected (or connect by a shaft) to the amplitude-controlling motor 1145. In this manner, the amplitude-controlling motor 1145 can cause the fifth gear 1135 and the inner ring gear 1130 to rotate, which changes the orientation of the spider gears 1110 in the inner ring gear 1130. In some embodiments, the cylindrical worm 1140 can lock the fifth gear 1135 in place, thereby preventing the fifth gear 1135 from rotating when the amplitude-controlling motor 1145 is not rotating. In some embodiments, the backplate 1120, spider gears 1110, inner ring gear 1130, fifth gear 1135, and cylindrical worm 1140 can be part of a control gear set or a hypocycloidal gear train 1105 that can control the amplitude of the flapping of a wing 110 of the MAV.

In some embodiments, at least one of the spider gears 1110 can have a 2:1 gear ratio with the inner ring gear 1130. This spider gear 1110 can also have a drive pin 1115 disposed on an outer surface of a spider gear 1110. The drive pin 1115 can be located proximate to the teeth of the spider gear 1110, or anywhere on the pitch-diameter of the spider gear 1110. The drive pin 1115 can extend out from the face of the spider gear 1110 in a direction away from the backplate 1120. Other gears can be used in place of spider gears 1110 and may have shapes that are not from circular. For example and not limitation, square gears, triangular gears, and elliptical gears can be used, among others.

As shown in FIGS. 14*a-d*, in embodiments where the spider gear 1110 has a 2:1 gear ratio with the inner ring gear 1130, the drive pin 1115 can move in a substantially vertical line when the backplate 1120 rotates and the inner ring gear 1130 is held still. In FIGS. 14*a-h*, a dark dot 1405 is shown on the inner ring gear 1130 to illustrate the relative position of the inner ring gear 1130, and a light dot 1410 is shown on the spider gear 1110 to illustrate the relative position of the spider gear 1110. The light dot 1410 can represent the drive pin 1115. In order to cause the drive pin 1115 to move up and down in a substantially vertical line, the inner ring gear 1130 can be rotated by the amplitude-controlling motor 1145 to a first position where the drive pin 1115 is at the top of the spider gear 1110 and the inner ring gear 1130, as shown in FIG. 14*a*.

Alternatively, the drive pin 1115 can be at the bottom of the spider gear 1110 and the inner ring gear 1130 when the inner ring gear 1130 is in the first position, as shown in FIG. 14*c*. The inner ring gear 1130 can then be held in the first position. The frequency-controlling motor 905 can then rotate the driveshaft 910, causing the backplate 1120 to rotate. As the backplate 1120 rotates, the spider gears 1110 can rotate, and, as shown in FIGS. 14*a-d*, the 2:1 gear ratio can cause the drive pin 1115 to undergo substantially vertical displacement.

In some embodiments, as shown in FIGS. 14*e-h*, the drive pin 1115 can move in a substantially horizontal line when the backplate 1120 rotates and the inner ring gear 1130 is held still. In order to cause the drive pin 1115 to move in a substantially horizontal line, the inner ring gear 1130 can be rotated to a second position where the drive pin 1115 is at the left or right side of the spider gear 1110 and the inner ring gear 1130, as shown in FIGS. 14*f* and 14*h*. The second position can be a 90 degree rotation compared to the first position. Of course, this can vary depending on the gear ratio of the inner ring gear 1130 to the spider gear 1110. The inner ring gear 1130 can then be held in the second position, and the frequency-controlling motor 905 can rotate the driveshaft 910, causing the backplate 1120 to rotate. As the backplate 1120 rotates, the spider gears 1110 can rotate, and, as shown in FIGS. 14*e-h*, the 2:1 gear ratio can cause the drive pin 1115 to undergo a substantially horizontal displacement.

If the inner ring gear 1130 is rotated to a position other than the first position or the second position, the drive pin 1115 can undergo both horizontal and vertical displacement. In these orientations, the vertical displacement can be less than the vertical displacement when the inner ring gear 1130 is in the first position.

In some embodiments, as shown in FIG. 11, a yoke 1150 can be disposed around the drive pin 1115. The yoke 1150 can constrain the drive pin 1115 vertically, while allowing the drive pin 1115 to move horizontally inside the yoke 1150. In this manner, when the drive pin 1115 moves, the yoke 1150 moves vertically with the drive pin 1115, but does not move horizontally with the drive pin 1115. As a result, only vertical displacement of the drive pin is transmitted to the wings.

Figure 12:
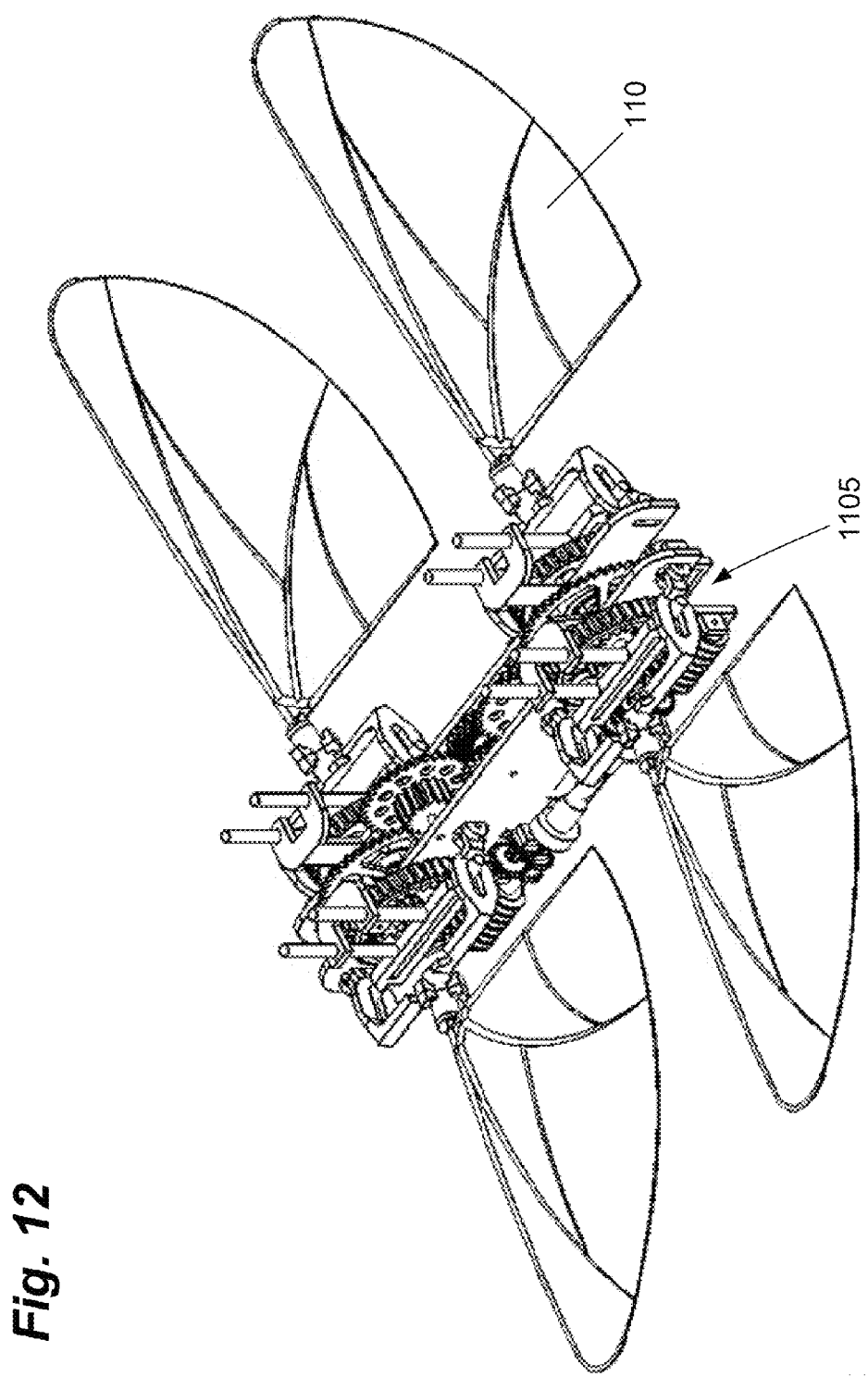
FIG. 12 depicts a perspective view of the geared actuation system with wings attached, in accordance with some embodiments of the present invention.

In some embodiments, as shown in FIGS. 12 and 13, the yoke 1150 can engage a rocker arm 1305. The rocker arm 1305 can be coupled to the chassis 1310 of the MAV by a hinge 1315. In this manner, when the yoke 1150 moves up and down, the rocker arm 1305 can flap up and down. The yoke 1150 can have one or more yoke shafts 1320 that engage the chassis 1310 of the MAV, or a strut of the chassis 1310 of the MAV, to add stability to the movement of the yoke 1150.

In some embodiments, the yoke shafts 1320 can have one or more springs disposed thereon. The springs can engage the yoke 1150 and at least one portion of the chassis 1310. The springs introduce elasticity into the system, which, in turn, can harness and release the inertial momentum of the system. This can reduce the amount of energy that must be provided to the wings 110 by the actuators.

In some embodiments, as shown in FIGS. 10 and 11, the yoke 1150 can have an upper yoke shaft 1155 extending upward from portion of the yoke 1150 that engages the drive pin 1115. The upper yoke shaft 1155 can engage a rocker arm 1160. The rocker arm 1160 can be coupled to a chassis 1165 of the MAV, or a strut of the chassis 1165 of the MAV, by a hinge. In this manner, when the yoke 1150 and the upper yoke shaft 1155 move up and down, the upper yoke shaft 1155 can cause the rocker arm 1160 to flap up and down.

The yoke 1150 can also have a lower yoke shaft 1170 extending downward from the portion of the yoke 1150 that engages the drive pin 1115. The lower yoke shaft 1170 can engage a strut on the body of the MAV to help improve stability of the yoke 1150. The lower yoke shaft 1170 can also be constrained so that lower yoke shaft 1170, the yoke 1150, and the upper yoke shaft 1155 can only move in a substantially vertical, linear motion. The lower yoke shaft 1170, the yoke 1150, the upper yoke shaft 1155, and the rocker arm 1160 can be part of a flapping actuator 1175.

Figure 15:
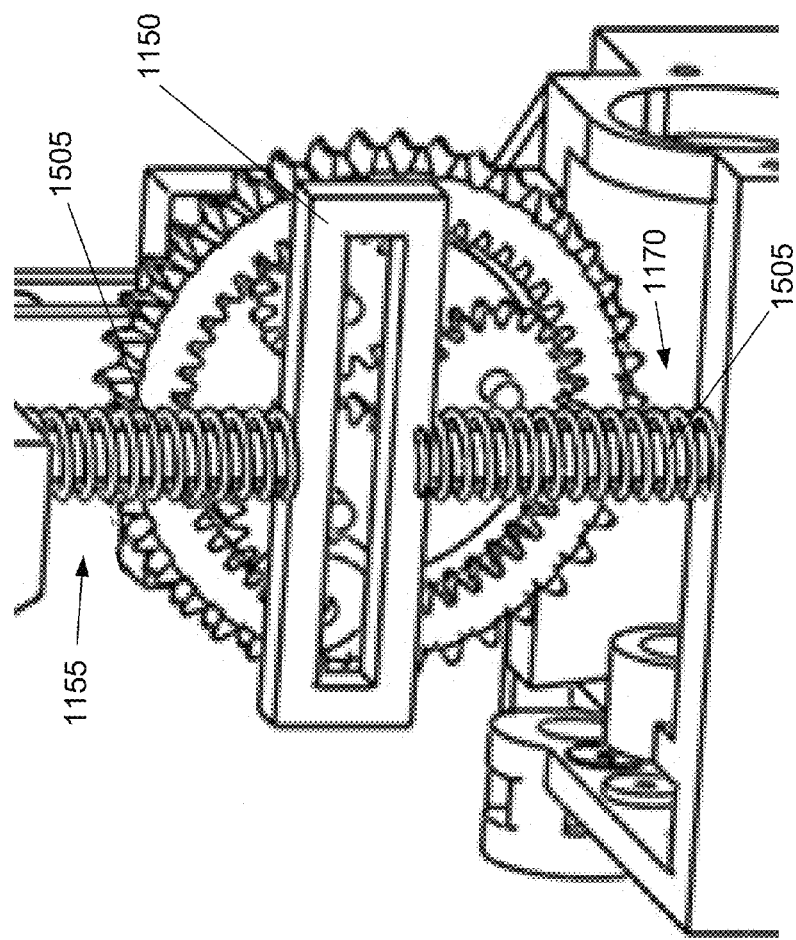
FIG. 15 depicts a perspective view of springs coupled with a geared actuation system for an MAV, in accordance with some embodiments of the present invention.

In some embodiments, as shown in FIG. 15, the upper and lower yoke shafts 1155, 1170 can have one or more springs 1505 disposed thereon. The springs 1505 can engage the yoke 1150 and at least one portion of the body 105 of the MAV, or a strut of the body of the MAV. The springs 1505 introduce elasticity into the system, which, in turn, can harness and release the inertial momentum of the system. This can reduce the amount of energy that must be provided to the wings by the actuators.

In some embodiments, as shown in FIGS. 12 and 13, the rocker arm 1160, 1305 can be connected to a wing spar 305 of a wing 110 of the MAV. In these configurations, when the rocker arm 1160, 1305 rocks up and down, the wing 110 flaps. Also, the amplitude of the flapping motion of the wing 110 can be controlled by the amplitude of the rocker arm's 1160, 1305 rocking motion. The rocker arm's 1160, 1305 motion, in turn, is controlled by the vertical displacement of the drive pin 1115 as the backplate 1120 rotates. The greater the vertical displacement of the drive pin 1115, the greater the amplitude of the flapping motion of the wing 110.

The amplitude of the flapping motion of the wing 110 can therefore be controlled by the position of the inner ring gear 1130, while the frequency of the flapping motion stays constant. If the inner ring gear 1130 is in the first position, on the other hand, the drive pin 1115 can have maximum vertical displacement and the amplitude of the flapping motion can be at a maximum. If the inner ring gear 1130 is in the second position, the drive pin 1115 can have very little, if any, vertical displacement, and the amplitude of the flapping motion can be at a minimum. If the inner ring gear 1130 is in some position other than the first position or the second position, the drive pin 1115 will have some vertical displacement, and some horizontal displacement, and the amplitude of the flapping motion can be some value between the maximum and minimum amplitudes. As mentioned above, only the vertical motion of the drive pin is transmitted to the wings.

When the inner ring gear 1130 is in the second position, the frequency-controlling motor 905 can operate without causing the wings 110 to flap. This allows the MAV to glide without turning off the frequency-controlling motor 905. Moreover, since the frequency-controlling motor 905 is in a "neutral" state (i.e., it is not flapping the wings 110), the frequency-controlling motor 905 can use less energy than it otherwise would. This configuration can therefore save energy while the MAV is in the air. Moreover, the ability of the amplitude-controlling motor 1145 to rotate the inner ring gear 1130 while the MAV is in flight allows the MAV to smoothly transition between wing-flapping flight and gliding flight. Since the frequency-controlling motor 905 is always running, the MAV can transition from a gliding state to a flapping state by rotation of the inner ring gear 1130. This provides a smoother transition (as described below) than powering off and powering on the frequency-controlling motor 905. In addition, because the gear train is running, gyroscopic stability is maintained.

In preferred embodiments, as shown in FIG. 8, the fourth spur gear 940 can be connected to two backplates 1120—one on each side of the fourth spur gear 940. In this manner, two backplates 1120, one on each side of the MAV, can rotate with the fourth spur gear 940. The rest of the actuating system described above can then be engaged with the second backplate 1120. In this manner, the system can cause at least two wings 110 to flap.

In preferred embodiments, the first bevel gear 915 can engage a plurality of second bevel gears 920. The additional bevel gear or gears 920 can then be connected to a gear train similar to the gear train with the first spur gear 925, the second spur gear 930, the third spur gear 935, and the fourth spur gear 940, described above. The gear train can cause two backplates 1120 to rotate, and similar systems to the systems described above can therefore cause two additional wings 110 to flap, for a total of four flapping wings 110. Additional gear trains and flapping systems can be added if the MAV has more than four wings 110.

In the system described above, the frequency-controlling motor 905 and the elements attached to it can cause all of the wings 110 on the MAV to flap at one frequency. This frequency can be at or near the resonant frequency of the wings 110, a pair of wings 110, or a single wing 110. In addition, the MAV can smoothly transition between gliding and wing-flapping flight by simply rotating of the inner ring gear 1130.

In some embodiments, the amplitude-controlling motors 1145 can control the amplitude of the flapping motion of the wings 110. In these embodiments, each wing 110 can have its own amplitude-controlling motor 1145, enabling each wing 110 to flap at a different amplitude.

In some embodiments, the system described above can provide passive gyroscopic stability to the MAV. MAVs are much smaller and lighter than traditional aerial vehicles, and therefore have smaller actuators and decreased energy-storage capacity. An MAVs small size also makes it much more susceptible to disturbance from equilibrium by external factors, such as the environment (wind, rain) or human interaction. This makes stabilization and control of MAVs more difficult since controllers must be highly dynamic and responsive to influences on the system. Thus any and all forms of stability, whether aerodynamic, mechanic, or electronic can aid the vehicle's flight performance.

In general, a gyroscope can be composed of a rotor that can rotate about one axis. The angular momentum of the gyroscope causes the gyroscope to maintain its axis of rotation when acted upon by an outside source. The larger the angular momentum of the gyroscope, the greater the tendency of the gyroscope to maintain stability and resist outside disturbances. In the case of an individual gyroscope, the device will resist rotation about the two axes that are perpendicular to the axis of rotation. By affixing a second gyroscope with an axis of rotation perpendicular to the first gyroscope, rotation about all three axes can be limited.

Figure 16:
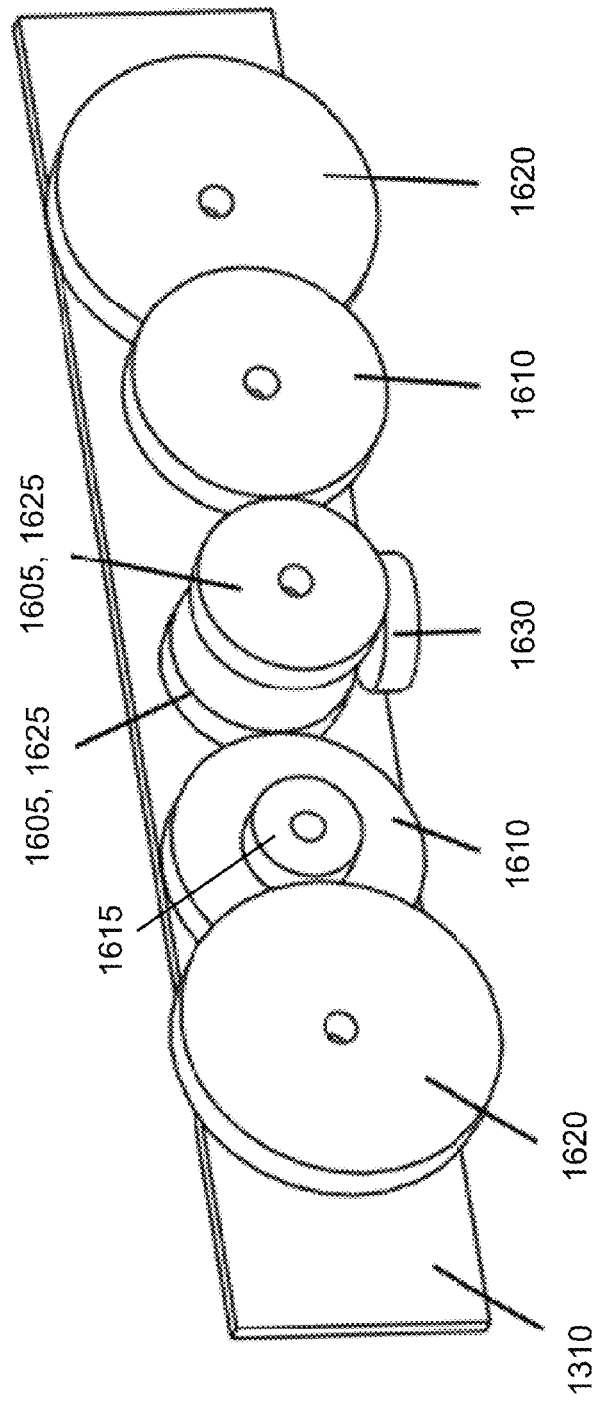
FIG. 16 depicts a perspective view of a geared actuation system for an MAV having gyroscopic properties, in accordance with some embodiments of the present invention.

In some embodiments of the present invention, therefore, as shown in FIG. 16, the gears in the actuation system can act as gyroscopes, improving stability of the MAV. Moreover, gyroscopic stability is achieved about all three axis because the first spur gear 1605, the second spur gear 1610, the third spur gear 1615, the fourth spur gear 1620, and the second bevel gears 1625, for example, rotate in a plane perpendicular to the first bevel gear 1630. The motor rotating in the horizontal plane provides gyroscopic stability in the two axes as well, completing a three degree of freedom gyroscopic angular stability system.

The actuation system described above can provide power to all wings 110 of the MAV in a fixed frequency, variable amplitude manner. The system also provides a means of gyroscopic stability. In addition, the system minimizes the number of components in the design, therefore reducing weight and complexity while improving manufacturability. The reduction in weight of the actuation system translates to a reduction in weight for the entire vehicle, thereby increasing flight endurance and maximum flying time.

Figure 17:
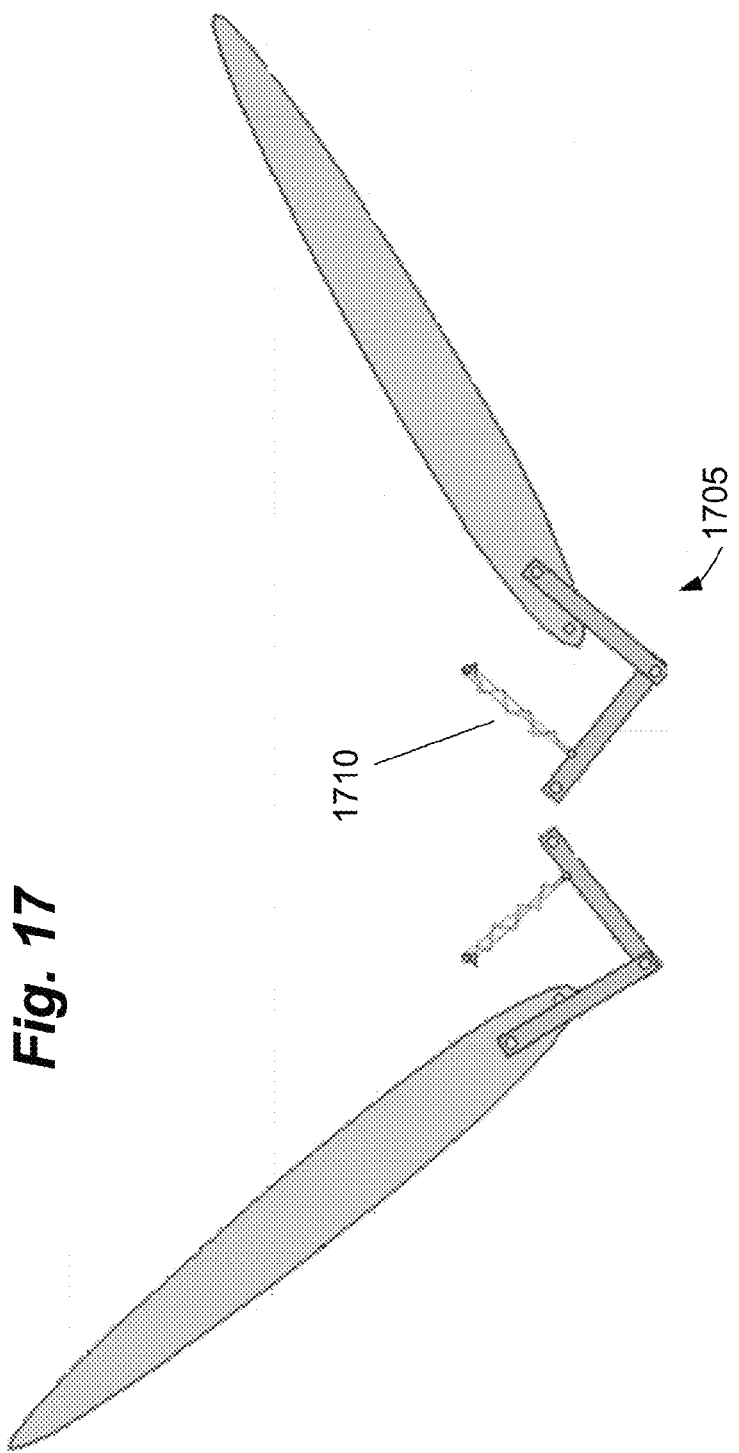
FIG. 17 depicts a four-bar linkage flapping and feathering system for an MAV, in accordance with some embodiments of the present invention.

There are other possible actuation systems for the wings of the present invention. For example, in some embodiments the wing can be directly connected to an actuator that reciprocates the wing by switching between a linear and/or rotary pushing and pulling motion. In some embodiments, as shown in FIG. 17, the actuation system can comprise a four-bar linkage mechanism 1705 coupled to an inverse crank-shaft mechanism 1710. The four-bar linkage is shown in greater detail in FIG. 18.

Figure 18:
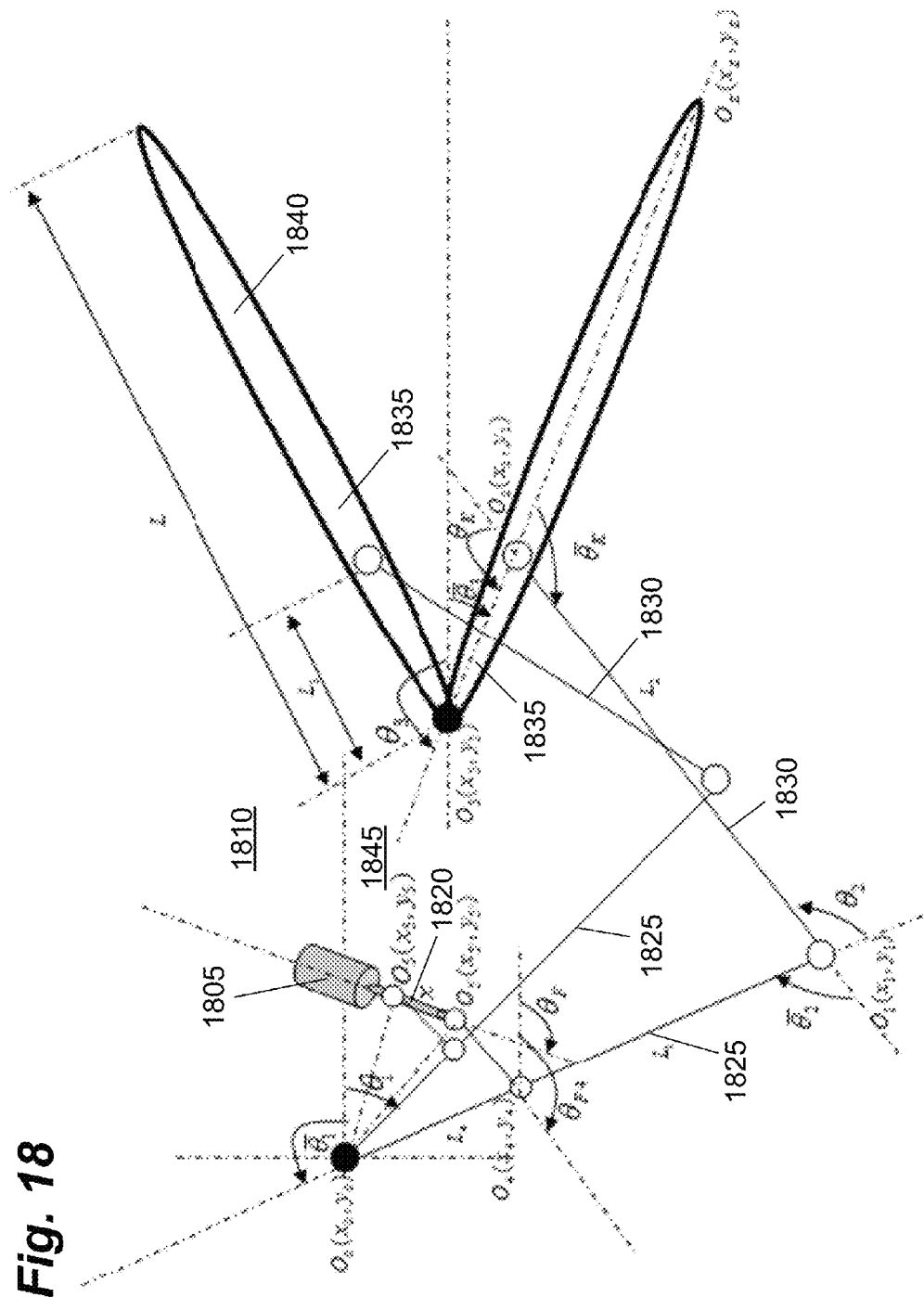
FIG. 18 depicts a force diagram for the four-bar linkage flapping and feathering system of FIG. 17, in accordance with some embodiments of the present invention.
Figure 19A:
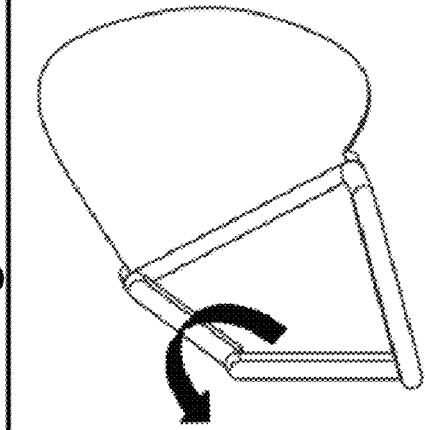
FIG. 19a depicts a perspective view of the four-bar flapping and feathering system for an MAV in a first position, in accordance with some embodiments of the present invention.
Figure 19B:
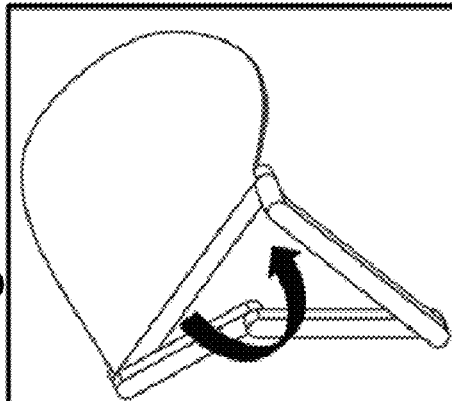
FIG. 19b depicts a perspective view of the four-bar flapping and feathering system for an MAV in a second position, in accordance with some embodiments of the present invention.
Figure 19C:
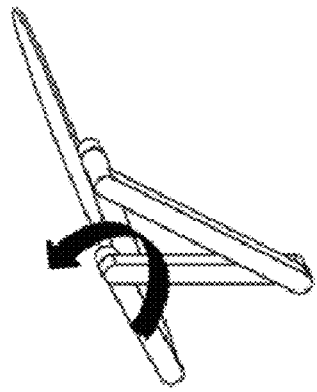
FIG. 19c depicts a perspective view of the four-bar flapping and feathering system for an MAV in a third position, in accordance with some embodiments of the present invention.
Figure 19D:
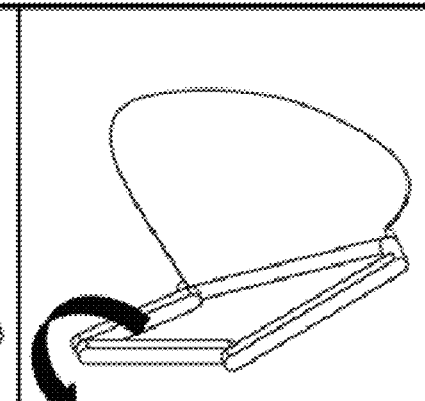
FIG. 19d depicts a perspective view of the four-bar flapping and feathering system for an MAV in a fourth position, in accordance with some embodiments of the present invention.
Figure 20:
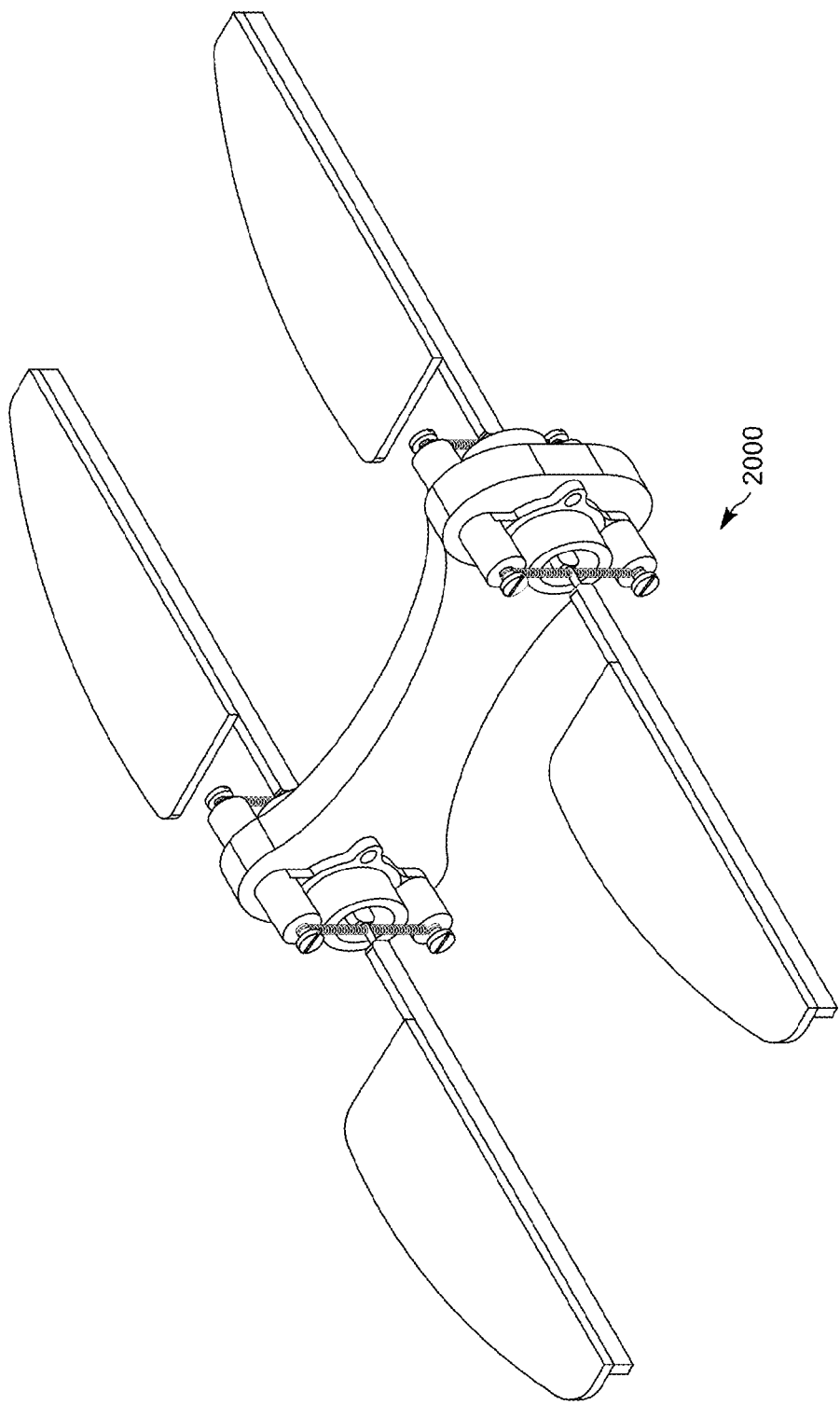
FIG. 20 depicts a perspective view of an MAV with magnet and coil actuation systems, in accordance with some embodiments of the present invention.

As can be seen in FIG. 18, a solenoid or linear actuator 1805 can connect the body 1810 and a first bar 1825. The actuator 1805 can have an actuation arm 1820 that reciprocates back and forth when the actuator 1805 is in use. The actuation arm 1820 can also be pivotably connected to the first bar 1825. In this manner, when the actuation arm moves back and forth, the first bar 1825 can be forced to rotate. The first bar 1825 can be pivotably connected to the second bar 1830, and the second bar 1830 can therefore be forced to rotate when the first bar 1825 rotates. The second bar 1830 can, in turn, be pivotably connected to the third bar 1835, which can be, for example, the wing 1840 of the MAV. Thus, the wing 1840 can be forced to flap when the second bar 1830 rotates. The fourth bar 1845 can be the portion of the MAV that connects the origin of the first bar 1825 with the origin of the third bar 1835.

As described and shown, the movement of the actuation arm 1820 can therefore cause the wing 1840 to flap through at least 110 degrees of motion (as a dragonfly's wings can do). The flapping motion can also produce minimal drag on the upstroke and significant lift on the down stroke. In some embodiments, a torsion spring can be mechanically coupled to the base of the wing. The torsion spring can make the system elastic. In other embodiments, a linear spring can be used instead of a torsion spring. Moreover, in some embodiments, one or more of the first bar 1825, second bar 1830, third bar 1835, or fourth bar 1845 can comprise a spring. FIGS. 19*a-d* illustrates one embodiment where the movement of the four bar linkage causes the wings of the MAV to flap.

In some embodiments, the four-bar linkage 1705 can be a "soft" four-bar linkage. In other words, the second bar 1830, which is pivotably connected to the first bar 1825 and the wing 1840, can comprise an extension spring. The spring can decouple the movement of the wing 1840 from the actuator 1805, which can provide a means to increase the amplitude of the flapping motion. The decoupling can also serve to minimize the effects of environmental disturbances on the wing 1840 and misactuation or functional-irregularity by the actuator 1805.

In some embodiments, the actuation system can comprise a geared motor drive system. In some embodiments of this system, only one motor is mechanically connected to each wing. The motor can be directly connected to the wing, or can be mechanically coupled to the wing by a gear train of one or more gears, strings, or belts, among other mechanical couplings. The gearing system can have a driving gear that is fixed to a rotating shaft of the motor. The system can also have a gear that is fixed to the wing beam. The driving gear can be in direct geared communication with the gear fixed to the wing beam, or there can be intermediate gears mechanically connecting the driving gear and the gear fixed to wing beam.

In order to make the wing flap, an alternating current can be fed into the motor, which can cause the rotating shaft of the motor to rotate in alternating directions. The alternating rotation of the motor can cause all of the gears in the gear chain to alternate rotating direction, which can cause the wing to flap. This system can also have a torsion spring mechanically coupled to the base of the wing to add elasticity to the system.

Figure 21A:
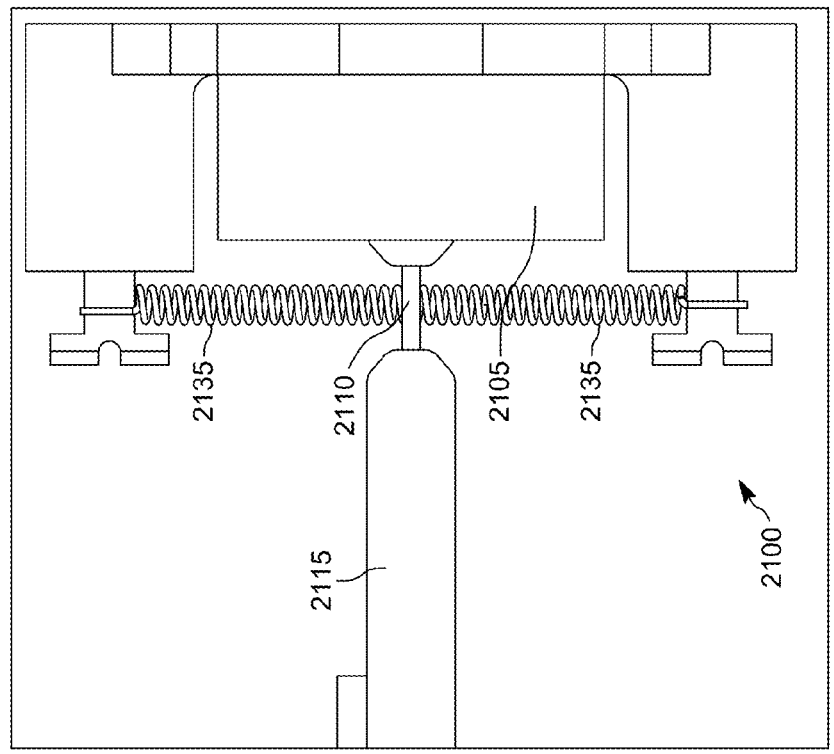
FIG. 21a depicts a perspective, detailed view of the magnet and coil actuation system, in accordance with some embodiments of the present invention.
Figure 21B:
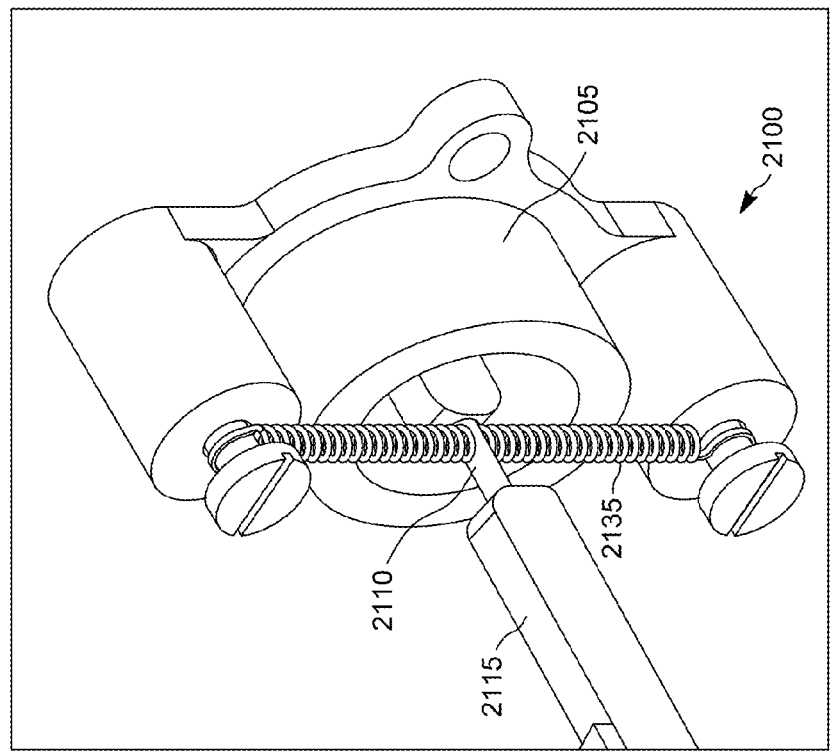
FIG. 21b depicts a side, detailed view of the magnet and coil actuation system, in accordance with some embodiments of the present invention.
Figure 22:
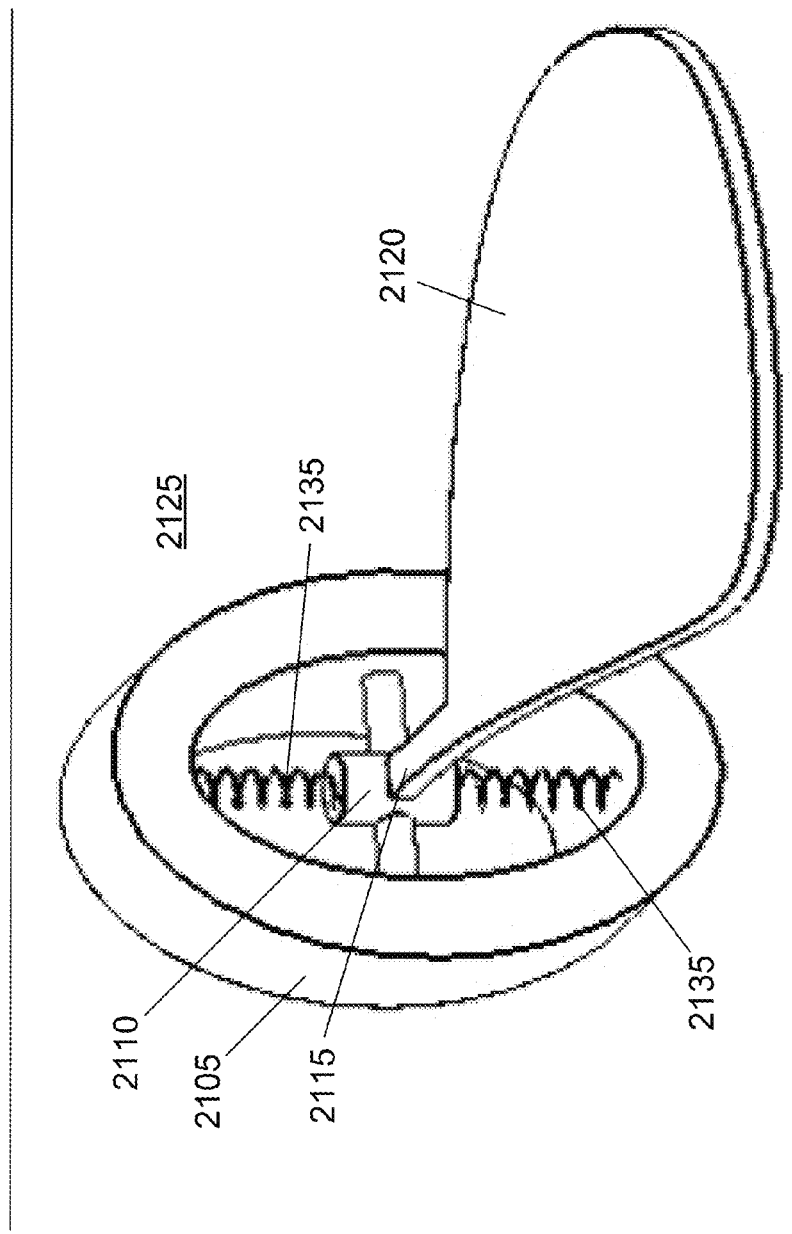
FIG. 22 depicts a perspective view of the magnet and coil actuation system, in accordance with some embodiments of the present invention.
Figure 23:
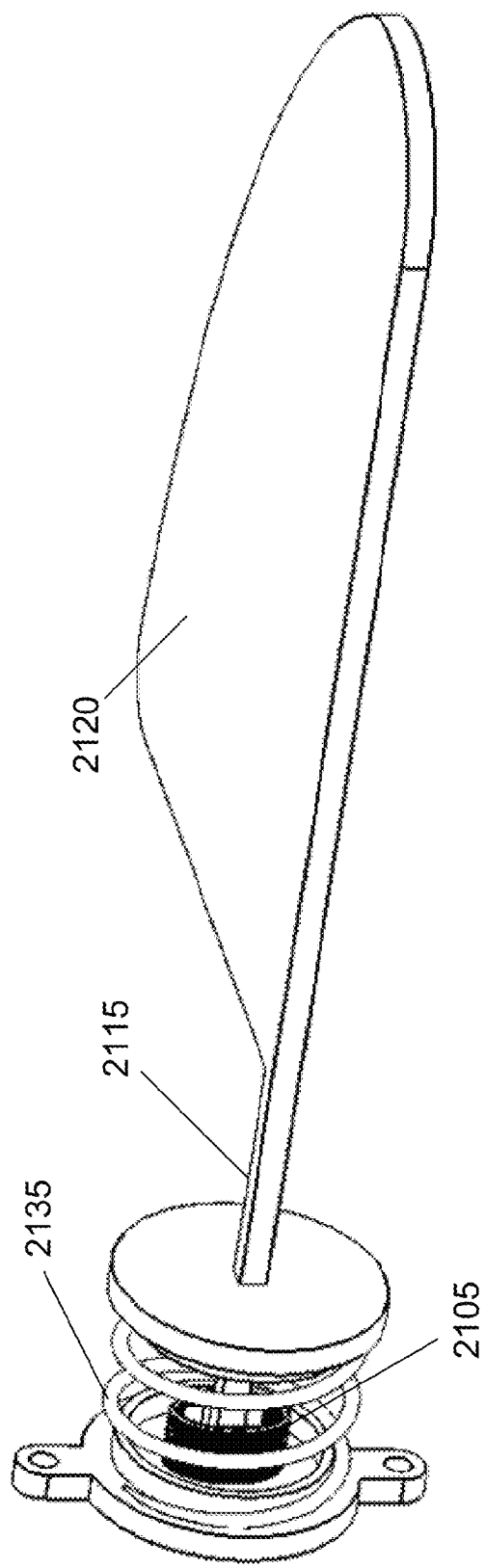
FIG. 23 depicts another perspective view of the magnet and coil actuation system, in accordance with some embodiments of the present invention.

In some embodiments, the actuation system can comprise a magnet and coil system 2000, as shown in FIGS. 20-24. As shown in FIGS. 21-23, this system can have various magnetic coils 2105 and magnets 2110. In some embodiments, a magnet or magnets 2110 can be fixed to a wing spar 2115 of a wing 2120 of the MAV. The wing can then be attached to the body 2125 of the MAV, or to a mounting bracket, by a hinge. The hinge can allow the wing spar 2115, and thus the wing 2120, to flap. Magnetic coils 2105 can be disposed around the magnet 2110. The magnet 2110 is repelled by or attracted to the coils 2105 by switching the direction the current flows through the coils 2105 (i.e., the polarity of the coils), which causes flapping of the wing 2120.

Figure 46A:
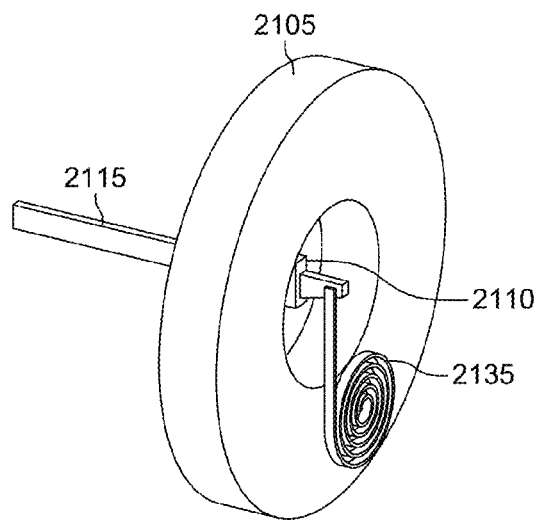
FIGS. 46a-46c depict perspective views of a magnet and coil actuation system for an MAV, in accordance with some embodiments of the present invention.
Figure 46B:
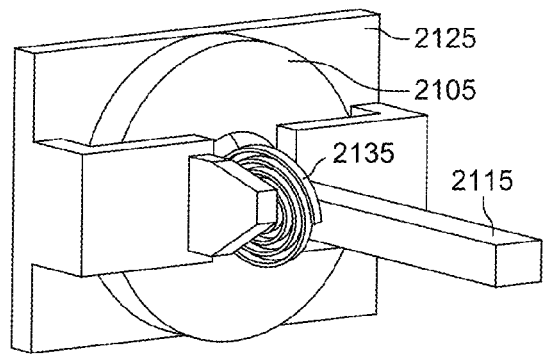
Figure 46C:
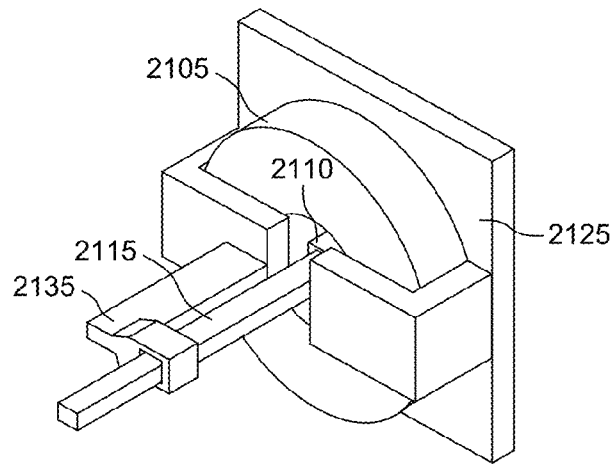

In some embodiments, as shown in FIG. 21, the magnet 2110 is located outside of the coil. In these embodiments, the alternating current through the coils 2105 causes the coils 1205 to reciprocate angularly, which can cause the wing 2120 to flap. In other embodiments, as shown in FIG. 22, the magnet 2110 is located inside of the coils 2105 proximate the hinge. In these embodiments, the alternating current through the coils 2105 causes the magnet 2110 to rock back and forth, which causes flapping of the wing 2120. In other embodiments, the coils 2105 can be located on the wing spar 2115, and the magnet 2110 can be fixed in a stationary manner to the body of the MAV. In some embodiments, the stationary magnet 2110 is located outside of the pivoted, rotating coil 2105. In these embodiments, the alternating current through the coils 2105 causes the magnet 2110 to displace angularly, which can cause the wing 2120 to flap, by connecting the wing to the coil 2105 instead of the magnet 2110. Other magnet, coil and spring arrangement are shown in FIGS. 46*a-c*.

One benefit of the magnet and coil system is that it is very compact, allowing for a reduced wingspan. In addition, the control system of the MAV can switch the polarity of the coils 2105 at the wings' resonant frequency without the need for feedback sensors. Because the coil system is electrical, the frequency and the amplitude of the flapping can also be modified electronically, without the need for geartrains, motors, etc. In some embodiments, all of the coils 2105 can be electronically connected to ensure that all wings 2120 flap at the same frequency. In other embodiments, the actuation systems of wings 2120 (the front wings, back wings, or middle wings, for example) can be electrically connected, while the actuation systems of wings 2120 are separately electrically connected. This can allow for some wings 2120 to flap at an offset phase from other wings 2120. For example, in some embodiments, the hind pair of wings 2120 can flap slightly before the front pair of wings 2120. In some embodiments, the magnet 2110 and coil 2105 system also provides a soft linkage to the wings 2120 (i.e., a non-mechanical connection between the coils 2105 and the magnets 2110), which can allow for larger flapping amplitudes than hard-linked systems (such as the gear train and four-bar linkage systems).

Figure 24:
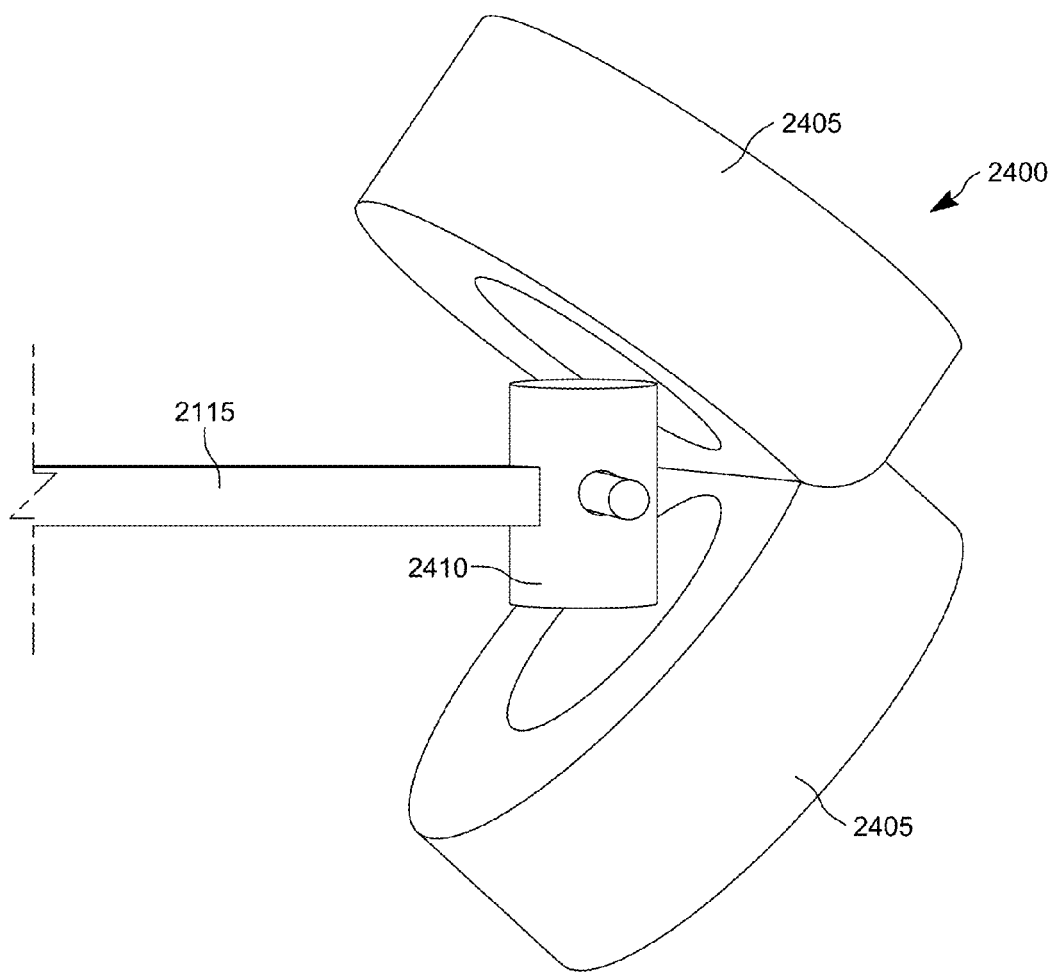
FIG. 24 depicts a perspective view of a magnet and two-coil actuation system for an MAV, in accordance with some embodiments of the present invention.

In some embodiments, a double coil arrangement 2400, as shown in FIG. 24, can also be used. This arrangement can have two coils 2405 offset from each other at an angle. The double coil arrangement 2400 focuses the magnetic field from the coils 2405 onto the magnet 2410, which can create higher attraction and repulsion forces than a single coil. The double coil arrangement 2400 also keeps the magnet 2410 aligned with the magnetic field lines of one of the two coils 2405 at all times.

As shown in FIGS. 20-23, in some embodiments, the magnet and coil system can comprise one or more springs 2135. The spring 2135 can be coupled, for example, to the wing spar 2130. The spring 2135 can add elasticity to the system. The spring 2135 can be, for example and not limitation, a spiral spring, cantilever spring, linear spring, or a torsion spring, as shown in FIGS. 46*a-c*. In some embodiments, the spring 2135 can contribute to the system's resonant frequency. In some embodiments, the spring 2135 can harness the inertial torque from the flapping wing to compensate for a magnet and coil system with insufficient power. In this manner, the magnet and coil system can deliver enough torque to flap the wings 2120.

As shown in FIGS. 21*a-b*, in some embodiments, an in-line spring arrangement 2100 can be used. In an in-line arrangement 2100, a portion of the wing spar 2115 can be secured in a spring 2135 that substantially vertically spans the opening of a coil. As the wing spar 2115 flaps up and down, the spring 2135 can provide elasticity to the system. In other in-line embodiments, multiple springs can be connected to the wing spar 2115.

As shown in FIG. 22, the in-line spring arrangement can also be used in embodiments where the magnet 2110 rocks back and forth inside of the coils 2105. As shown in FIG. 23, in some embodiments, the spring 2135 can also be disposed around the coils 2105. In these embodiments, one end of the spring 2135 is stationary, while the other end can flap with the wing 2120. Similar to the embodiments described above, in these embodiments, the spring 2135 provides elasticity to the system.

Figure 25:
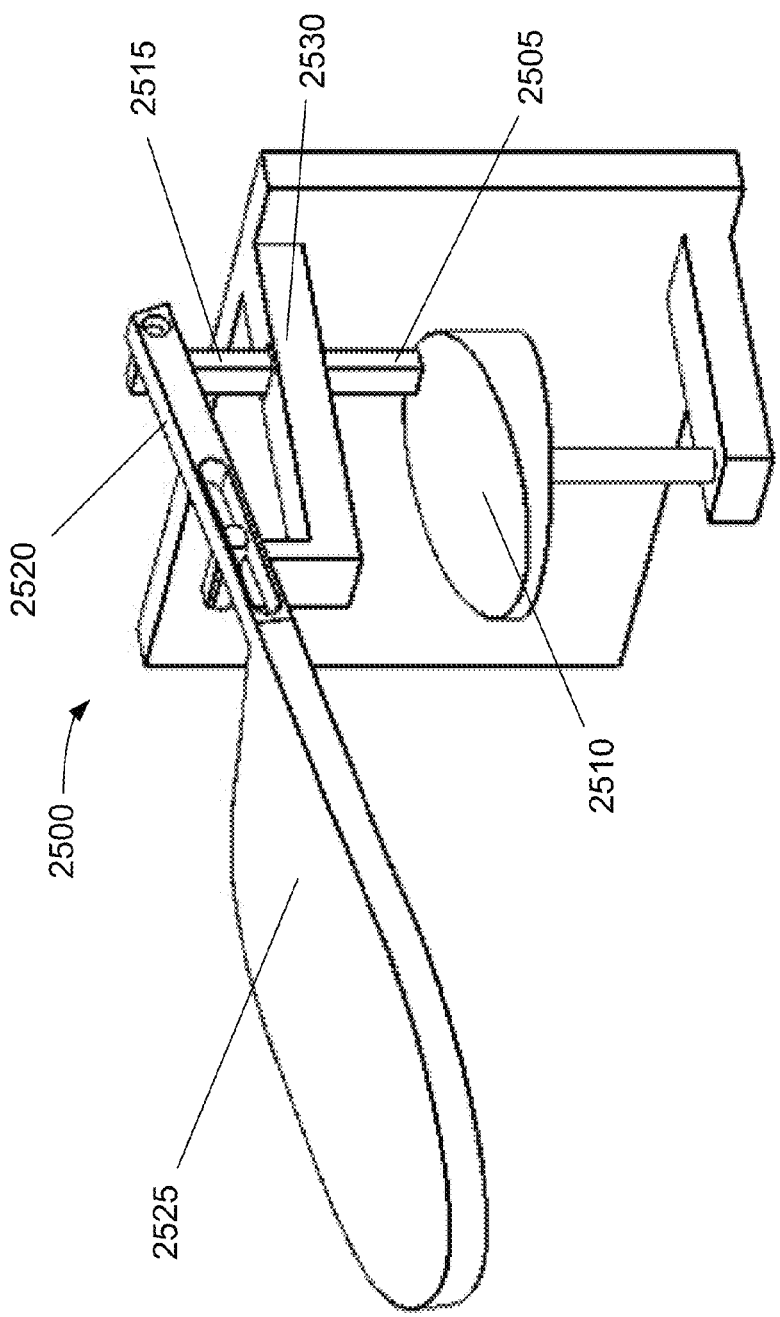
FIG. 25 depicts a perspective view of a horizontal cam and piston/follower actuation system for an MAV, in accordance with some embodiments of the present invention.

In some embodiments, cam-and-follower systems 2500 can be used as the actuation systems. As shown in FIG. 25, one cam design can be a horizontal cam 2510. This design can comprise a cylindrical cam 2510 that has been cut at an angle across its axial cross-section. The tip of the piston, or follower, 2505 can contact the lip of the cam 2510 and can be forced upwards and downwards as the cam 2510 rotates. When rotated, the cam 2510 can cause the piston/follower 2505 to move in a sinusoidal path. In some embodiments, the cam 2510 can be shaped such that the piston/follower 2505 achieves more than one oscillation per rotation of the cam 2510. In other embodiments, a shaft 2515 can attach the piston/follower to the spar 2520 of a wing 2525. The spar can be hingedly connected to the chassis 2530 of the MAV so that the spar 2520 and the wing 2525 can flap when the piston/follower 2505 moves upwards and downwards.

Figure 26:
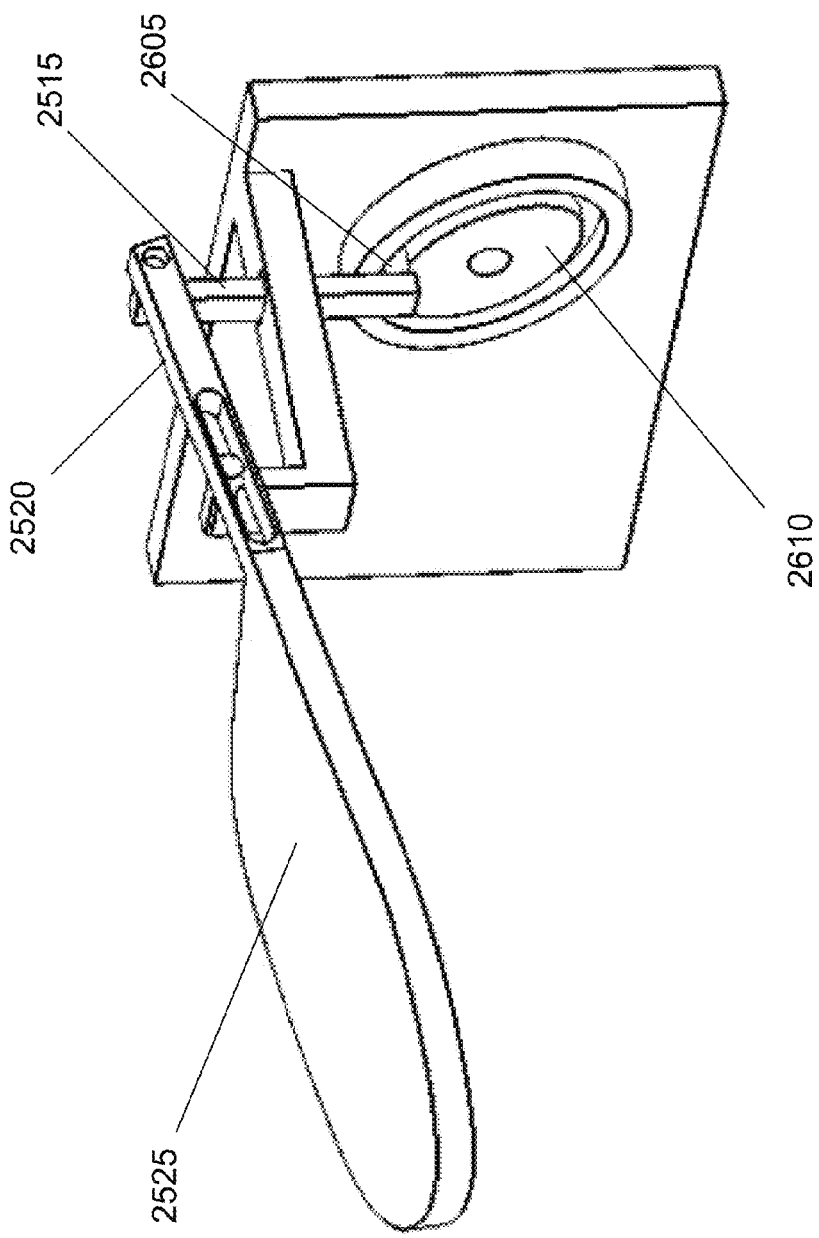
FIG. 26 depicts a perspective view of a vertical cam and piston/follower actuation system for an MAV, in accordance with some embodiments of the present invention.

As shown in FIG. 26, in some embodiments, the cam can be a vertical cam 2610 with a horizontal axis of rotation. The cam 2610 can be elliptical, which can allow a piston/follower 2605 to reciprocate twice per cam rotation. The instantaneous piston position from the cam pivot can be given by R= $\sqrt{(a.\cos\theta)^2+(b.\sin\theta)^2}$, where θ is the angular position of the point of contact of the piston with the cam. In some embodiments, such as where the elliptical cam 2610 has a major to minor axis ratio (a/b) of 1.333, for example, the piston/follower 2605 can move in near-sinusoidal motion, which can be desirable for flapping.

As discussed briefly above, the energy efficiency of the present invention can go beyond that provided by the four-wing configuration alone. In some embodiments, for example, a spring can be included in the actuation system. The spring can add elastic and/or restorative wing flapping that further improves the energy efficiency of the MAV by flapping near resonance.

In some embodiments, the spring can be in an equilibrium position when the wing is substantially horizontal. Thus, when the wing flaps up or down, the spring can be displaced. The force applied to the wing by the displaced spring can bias the wing to return to horizontal, thereby introducing an elastic element into the flapping motion and reducing the amount of energy required to continuously flap the wing near its natural, resonance frequency.

In general, the aim of the spring is to overcome the inertial forces applied to the wing so that that wing can vibrate at a frequency at or near its resonant frequency. In some embodiments, including a spring in the actuation system can enable the system to harness inertial energy for reuse in subsequent flapping cycles. The spring can also provide a dampening force for inertial motion, so that the rest of the actuation system does not have to overcome inertial forces to vary the flapping direction of the wing, for example. The restorative and elastic forces supplied by the spring, therefore, can be similar to the restorative and elastic forces supplied by the muscles of a bird or insect. In some embodiments, the springs work most efficiently when used to flap the wings at their resonant frequency.

Figure 27:
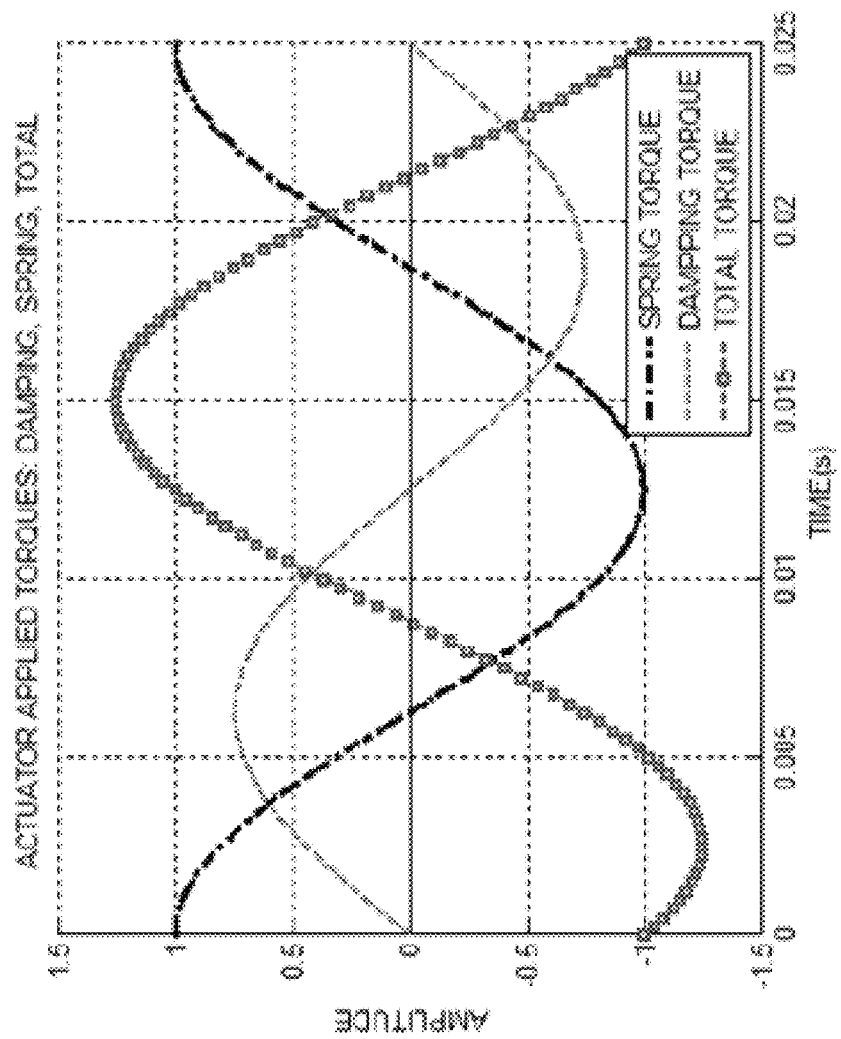
FIG. 27 is a graph of various torques at a wing joint of an MAV, in accordance with some embodiments of the present invention.
Figures 28A, 28B, 28C, 28D:
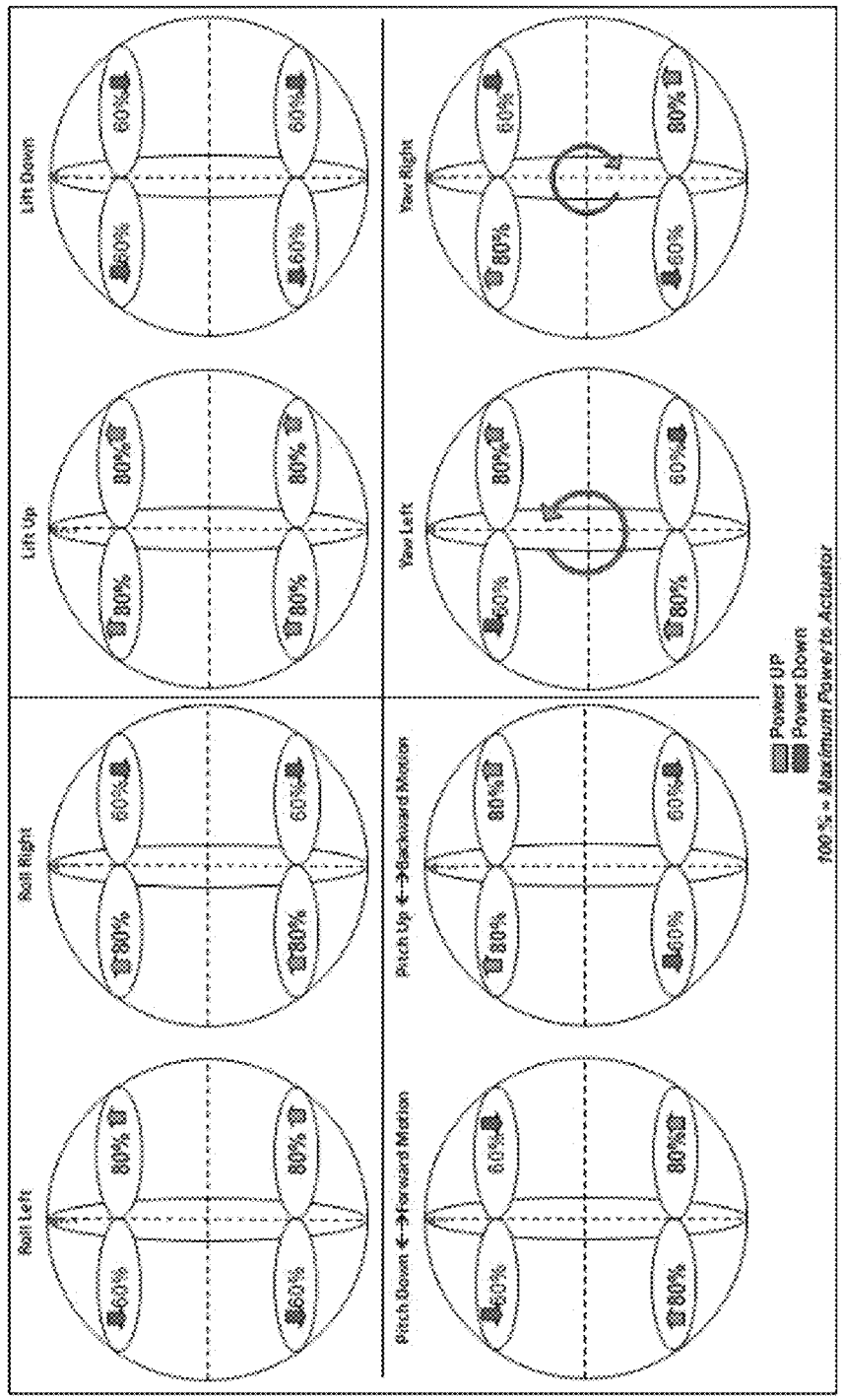
FIGS. 28a-28d depicts a control law for a multi-winged vehicle with independent wing control, in accordance with some embodiments of the present invention.

FIG. 27 shows various torques at the wing joint for some embodiments of the present invention. The darkest line (with amplitude=1) represents the spring torque. The spring torque is the torque required at the wing joint to flap the wing in a vacuum (a wing without any air damping). The spring torque can also represent the inertial torque required to decelerate and accelerate the wing to produce sinusoidal motion. The lightest line (with amplitude=0.75) represents the damping torque. The damping torque can be the torque required to sustain wing flapping when air resistance (air damping) is taken into account. The damping torque can compensate for the loss in energy of the wing caused by air damping. The line comprising boxes (with amplitude=1.25) represents the total torque. The total torque can be the "vector" summation of the spring and damping torques at the wing joint. Thus, total torque can be the torque that must be provided by the actuation system to cause the wing to flap continuously.

The advantages of including a spring in the actuation system can be shown through the equations below. As certain assumptions must be made to derive the formulas, all equations provide approximations.

The dynamics of the wing-spring combination can be stated as:

$$J(\theta)\ddot{\theta}+b\dot{\theta}+K\theta=\tau_{External}$$

where J (θ) is the inertia of the wing-limb system, b is the damping constant of the second order system, and K is the spring constant of the system. $\dot{\theta}$ is the angular velocity of the wing. To simplify dynamics, the non-linear dependence of damping on $\dot{\theta}^2$ has been reduced to a linear dependence $\dot{\theta}$.

In embodiments of the present invention with a spring, the average torque required can be:

$$\frac{1}{T}\int_0^T b\dot{\theta}_{max}\mathrm{Sin}(\omega t)\,dt = \frac{2b\dot{\theta}_{max}}{\pi}$$

where T and t are time and ω is the angular frequency of the sine wave (ω can also be the flapping frequency, ω=2π/T).

In a system without a spring, it can be determined that the torque required at the wing joint can be:

$$\tau_{2-Ext}\,|_{Avg} = \frac{2A_3}{\pi},$$

where:

$$A_3 = \sqrt{(K\theta_{max})^2 + (b\dot{\theta}_{max})^2},\; \phi_3 = \mathrm{atan}\left(-\frac{K\theta_{max}}{b\dot{\theta}_{max}}\right)$$

Thus, when:

$$b\dot{\theta} = 0,\; \tau_{2-Ext}\,|_{Avg} = \frac{2K\theta_{max}}{\pi},$$

and when:

$$b\dot{\theta} = K\theta_{max},\; \tau_{2-Ext}\,|_{Avg} = \frac{2\sqrt{2}\,K\theta_{max}}{\pi}.$$

In embodiments comprising a spring, the system can be, for example and not limitation, overdamped, underdamped, or critically damped. For an underdamped or critically damped system, $|b\dot{\theta}_{max}|$ is $\leq |K\theta_{max}|$. The average torque required at the wing joint to produce reciprocating wing flapping and generate the desired lift can therefore be:

$$\tau_{2-Ext}\,|_{Spring} = \frac{2b\dot{\theta}_{max}}{\pi} \leq \frac{2K\theta_{max}}{\pi}$$

$$\Rightarrow 0 \leq \tau_{2-Ext}\,|_{Spring} \leq \frac{1}{\sqrt{2}}\tau_{2-Ext}\,|_{NO-Spring}$$

These equations show that when the system is underdamped or critically-damped, a system without a spring requires about 41.4% more torque to sustain flapping than a system with a spring. A significant amount of energy therefore can be saved by using a spring to aid in the flapping motion, especially when flapping at a resonant frequency.

For an overdamped system with a spring, $|b\dot{\theta}_{max}|$ is $>|K\theta_{max}|$. The average torque required at the wing joint to produce reciprocating wing flapping and generate the desired lift can therefore be:

$$\tau_{2-Ext}\,|_{NO-Spring} > \tau_{2-Ext}\,|_{Spring} = \frac{2b\dot{\theta}_{max}}{\pi} > \frac{2K\theta_{max}}{\pi}$$

Figure 47:
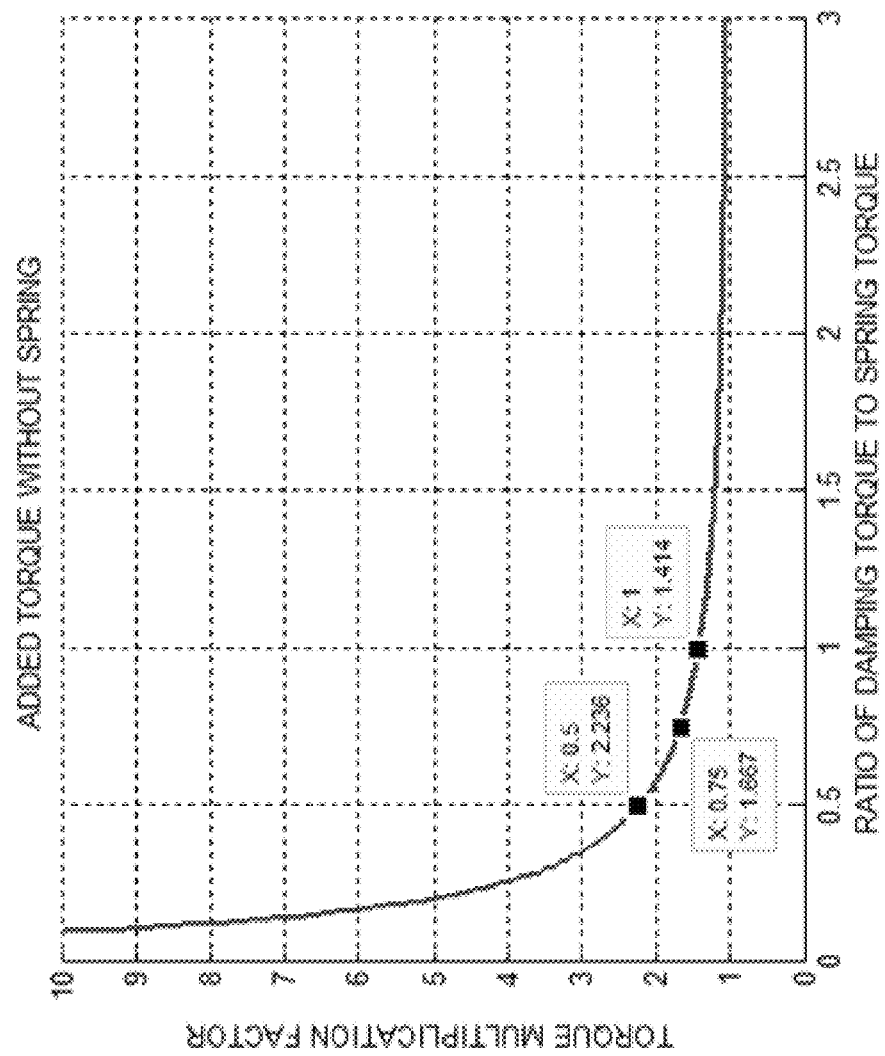
FIG. 47 is a graph depicting the relationship between the torque multiplication factor and the ratio of damping torque to spring torque, in accordance with some embodiments of the present invention.

Thus, as shown in FIG. 47, more torque is required to sustain flapping in an over-damped situation without a spring than is required with a spring, although the values become close as damping increases toward infinity.

The incorporation of a spring can therefore decrease the amount of torque that must be provided by the rest of the actuation system. This can greatly increase the efficiency of the MAV. The exact amount of energy saved by the spring can vary as the spring constant, shape of the wing, frequency of the flapping motion, amplitude of the flapping motion, and air density change.

Control Systems

Embodiments of the present invention can further comprise a system for controlling the MAV. The system can comprise both wing actuation and energy control at the wing level. The system can also comprise overall control of the MAV and can provide, for example, 6 DoF flight control. This can be especially useful for indoor MAVs, for example, which tend to fly in close quarters with sharp turns and maneuvers.

The three basic motions for flight are pitch, roll, and yaw, which provide flight control in three degrees of freedom. The translation produced as a result of these basic motions (i.e. right, left, forward, backward, up, down) provide the other three basic degree of motion, completing the six basic degree of freedom motions required for a hovering MAV. As shown in FIG. 28a-28d, in some embodiments of the present invention, flight control of these motions can be accomplished by coordinating the power distribution to individual wings. By powering up a given combination of wings, for example, the vehicle can be made to perform the required maneuvers for 6 DoF flight. As discussed below, these maneuvers, in turn, can be coupled to provide translational motion.

6 DoF flight can be created by inducing a power differential between various pairs of wings. Increasing power to the pair of wings on one side of the MAV, reducing power to the other side, or both, for example, can provide control along the roll axis. Similarly, increasing power to the pair of wings on one end of the MAV (i.e., the front or rear), reducing power to the other side, or both can provide control along the pitch axis. Cross-control, i.e., increasing power to the pair of wings on one diagonal of the MAV, reducing power to the other diagonal, or both can provide yaw control. This control is available in both hovering flight and fixed-wing flight, as discussed below.

In some embodiments, the flapping frequency of each wing 110 of the MAV can be constant, while the flapping amplitude of each wing 110 of the MAV can be individually controlled. In these embodiments, the amount of force produced by each wing 110 can be controlled by modifying the flapping amplitude of that wing 110.

The amount of thrust produced by each of the wings 110 can be varied in order to control the movement of the MAV through the air. Specifically, for example, the yaw, pitch, and roll of the MAV can be controlled, along with the vertical movement of the MAV. In FIGS. 28a-d, 70% thrust produced by each wing 110 can be hovering thrust, such that if each wing 110 is flapping to produce 70% of its maximum thrust, the MAV will hover. This percentage can vary, of course, based on the weight of the MAV, aerodynamic characteristics of the wings, etc. Moreover, to perform any of the following maneuvers, the MAV does not need to be in a hovering state.

In some embodiments, to make the MAV roll left, both wings 110 on the right side of the MAV can increase thrust (to 80%, for example), while both wings 110 on the left side of the MAV can decreased thrust (to 60%, for example). Alternatively, both wings 110 on the right side can increase thrust (to 80%, for example), while both wings 110 on the left side remain at hovering thrust. Additionally, both wings 110 on the right side can remain at hovering thrust, while both wings 110 on the left side can decreased thrust (to 60%, for example).

In some embodiments, to make the MAV roll right, both wings 110 on the left side of the MAV can increase thrust (to 80%, for example), while both wings 110 on the right side of the MAV can decrease thrust (to 60%, for example). Similarly, the both wings 110 on the right side can decrease thrust, or both wings 110 on the left side can increase thrust, while the other wings 110 remain at hovering thrust.

In some embodiments, to make the MAV pitch down, both front wings 110 of the MAV can decrease thrust (to 60%, for example), while both back wings 110 of the MAV can increase thrust (to 80%, for example). Similarly, both front wings 110 can decrease thrust, or both back wings 110 increase thrust, while the other wings 110 remain at hovering thrust.

In some embodiments, to make the MAV pitch up, both front wings 110 of the MAV can increase thrust (to 80%, for example), while both back wings 110 of the MAV can decrease thrust (to 60%, for example). Similarly, both front wings 110 can increase thrust, or both back wings 110 can decrease thrust, while the other wings 110 remain at hovering thrust.

In some embodiments, to make the MAV yaw left, the front-right wing 110 and the back-left wing 110 can increased thrust (to 80%, for example), while the front-left wing 110 and the back-right wing 110 can decreased thrust (to 60%, for example). Similarly, the front-right wing 110 and the back-left wing 110 can increase thrust, or the front-left wing 110 and the back-right wing 110 can decrease thrust, while the other wings 110 remain at hovering thrust.

In some embodiments, to make the MAV yaw right, the front-left wing 110 and the back-right wing 110 can increase thrust (to 80%, for example), while the front-right wing 110 and the back-left wing 110 can decrease thrust (to 60%, for example). Similarly, the front-left wing 110 and the back-right wing 110 can increase thrust, or the front-right wing 110 and the back-left wing 110 can decrease thrust, while the other wings 110 remain at hovering thrust.

In some embodiments, to make the MAV lift vertically upward, the thrust produced by all of the wings 110 can be increased (to 80%, for example). To make the MAV drop vertically, the thrust produced by all of the wings 110 can be decreased (to 60%, for example).

Figure 29:
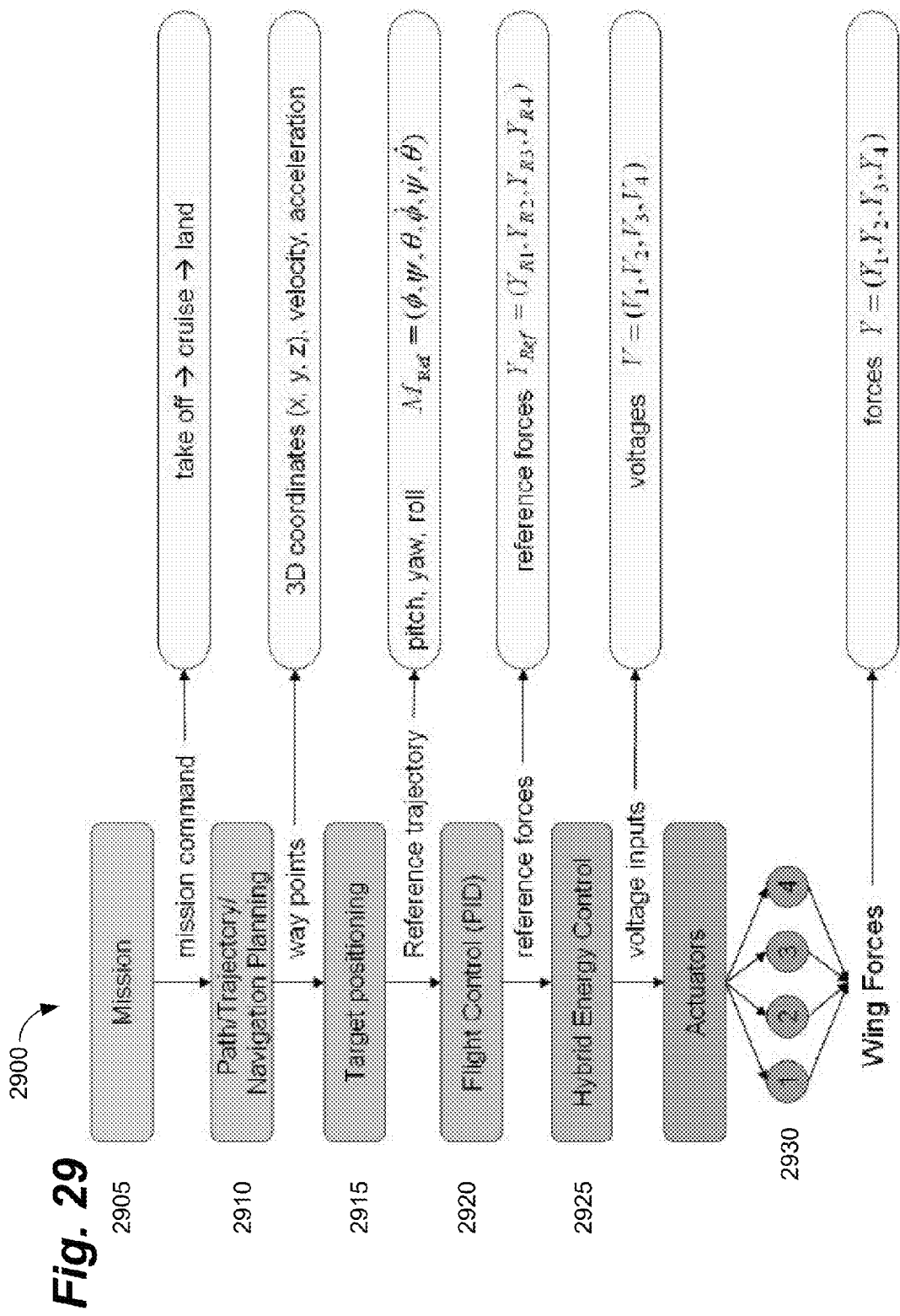
FIG. 29 depicts a control hierarchy for a multi-winged vehicle with independent wing control, in accordance with some embodiments of the present invention.

As shown in FIG. 29, in some embodiments, the control system can provide a hierarchical control scheme 2900. The system 2900 can include, for example and not limitation, overall mission control 2905, path/trajectory planning 2910, target positioning 2915, flight control 2920, and energy control 2925. In some embodiments, mission control 2905, or the mission module, can contain the global mission parameters to be met by the MAV. The mission module 2905 can include, but is not limited to, things such as flying from point A to point B, via point C, while avoiding point D.

Based at least in part on mission information, the path/trajectory planning module 2910 can incorporate the above mission goals to calculate and assign one or more trajectories to be followed to meet the mission goals. The target position layer can produce reference Euler angles and rates for the MAV to successfully follow the waypoints produced by the path/trajectory module 2910. This information can then be used in the flight control layer 2920 to produce the actual dynamic Euler angles and rates required to follow the desired path. In some embodiments, target positioning 2915 can interface with mission control 2905 to ensure that target positions are achieved within the larger mission.

In some embodiments, a hybrid energy control 2925 can be used to sustain the desired wing-beat frequency (i.e., at or near resonance). Thus, the energy controller 2925 can control the thrust produced by each wing (i.e., by modulating the power output to each wing), thereby independently controlling the amplitude of each wing beat. In a preferred embodiment, there is an actuator 2930 for each wing to enable the control of pitch (and forward/backward translation), yaw, and roll (and left/right translation).

Figure 30:
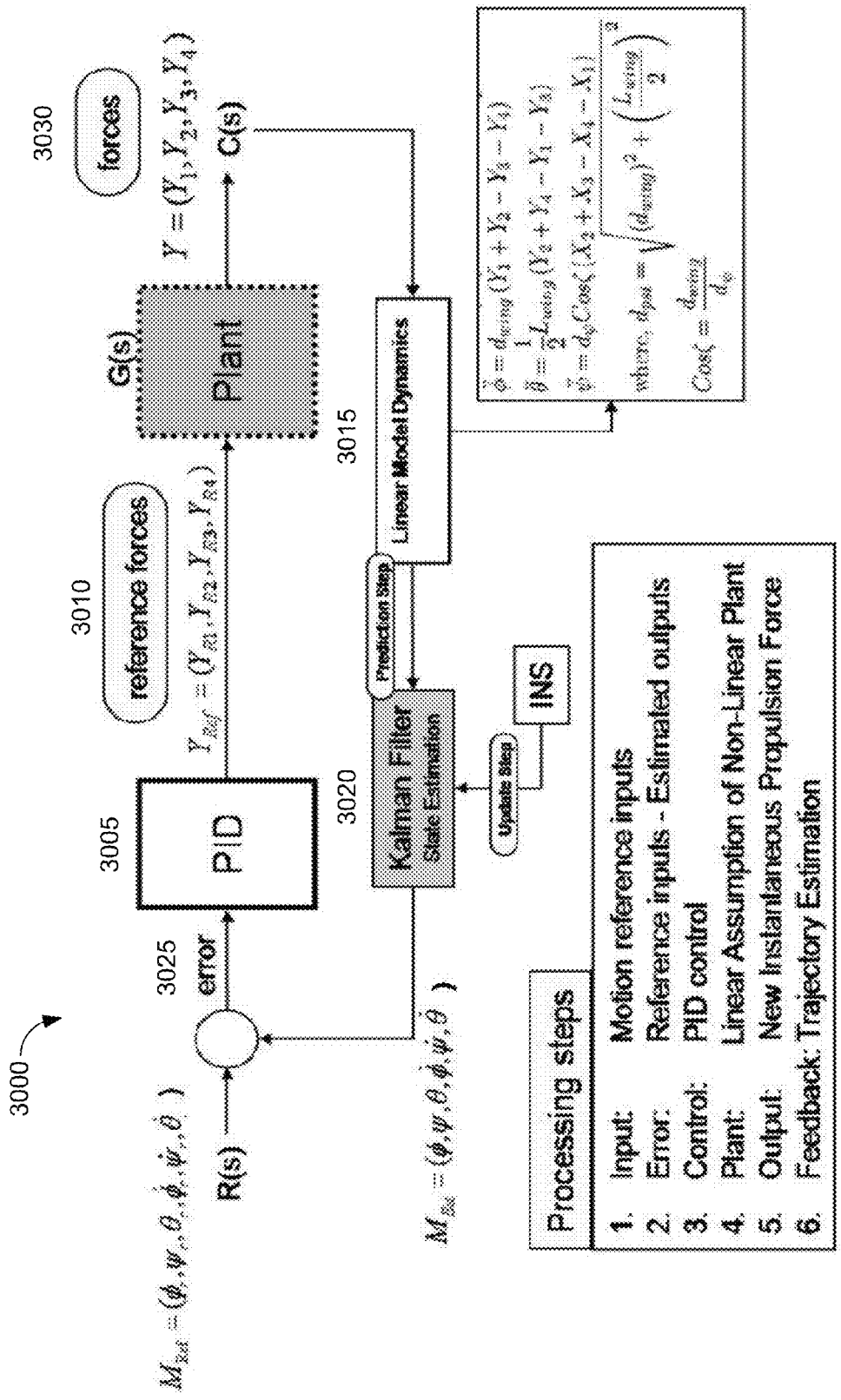
FIG. 30 depicts a Proportional-Integral-Derivative ("PID") control system for a multi-winged vehicle with independent wing control, in accordance with some embodiments of the present invention.

In some embodiments, the flight control system can comprise a dual loop control system 3000 as shown in FIG. 30. An outer layer linear controller 3005 can generate reference thrust values 3010 to be produced by the lower level hybrid energy controller 1625. In some embodiments, to simplify calculations, the fight control system 3000 can use linear model dynamics 3015 that assume a symmetrical MAV configuration. Using this assumption, the flight control system 3000 can predict the angular parameters of the system, which are then updated by an estimation block 3020.

In some embodiments, the estimation block 3020 can comprise an appropriate algorithm, such as, for example and not limitation, particle filters, Bayesian approximation, fuzzy logic, fuzzy-neuro algorithms, or behavior based models etc. In a preferred embodiment, a Kalman filter acts as the estimation block 3020. The fusion block 3020 can use sensor readings obtained from, for example and not limitation, GPS, gyroscopes, magnetometers, and accelerometers, to update the linear model predictions 3005. The system 3000 thus produces instantaneous values for angular position and rates. In some embodiments, an adder can be used to introduce an error 3025, or differential, between the reference values 3010 and the actual values 3030. The error 3025 can be fed into the linear controller 3005 for regulation.

Figure 31:
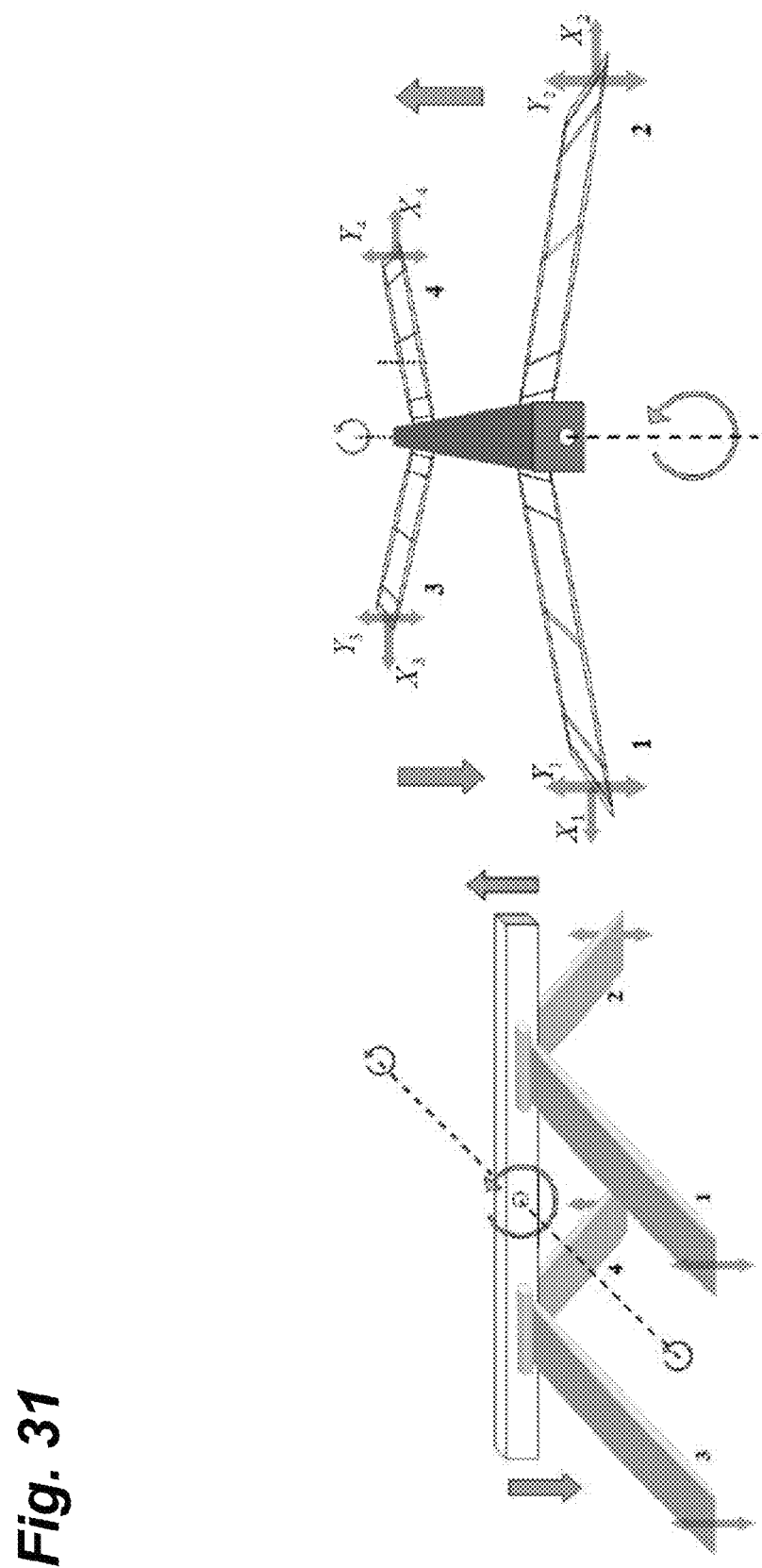
FIG. 31 depicts control moments and forces for a multi-winged vehicle with independent wing control, in accordance with some embodiments of the present invention.

In some embodiments, the modeling for each axis to determine the Euler rates for the system can be been done by calculating the moment couples between two opposite ended forces. As shown in FIG. 31, in the case of pitch control, the Euler rates can be represented by Y1-Y2 and Y3-Y4. Similarly, in case of roll control, the Euler rates can be represented by Y1-Y3 and Y2-Y4. Finally, in the case of yaw control, the Euler rates can be represented by X1-X4 and X2-X3

The equation below represents a basic, mid-level model formulation. In some embodiments, to provide more accurate modeling, the linear model can be further upgraded with air damping/drag, air disturbances, and other nonlinear external forces. The opposing forces form moment-couples providing the necessary dynamic relationships:

$$\ddot{\phi} = \frac{d_\phi}{J_\phi}(Y_1 + Y_2 - Y_3 - Y_4)$$

$$\ddot{\theta} = \frac{d_\theta}{J_\theta}(Y_2 + Y_4 - Y_1 - Y_3)$$

$$\ddot{\psi} = \frac{d_\psi}{J_\psi}(X_2 + X_3 - X_4 - X_1)$$

$$\ddot{z} = \frac{1}{M_{MAV}}(Y_1 + Y_2 + Y_3 + Y_4)$$

where, $J_\phi$; $J_\theta$ and $J_\psi$ are the moments of inertia of the MAV about the three axes, and $M_{MAV}$ is the mass of the MAV. In addition, $d_\theta$ represents the distance between the forces on the front and hind wings, $d_\phi$ represents the distance between the centers of the left and right wing pairs, and $d_\psi$ is the distance between the centers of the forces at the diagonal wing pairs. In addition, the X and Y components are the forces on the MAV from each wing (as shown in FIG. 30).

Figure 32:
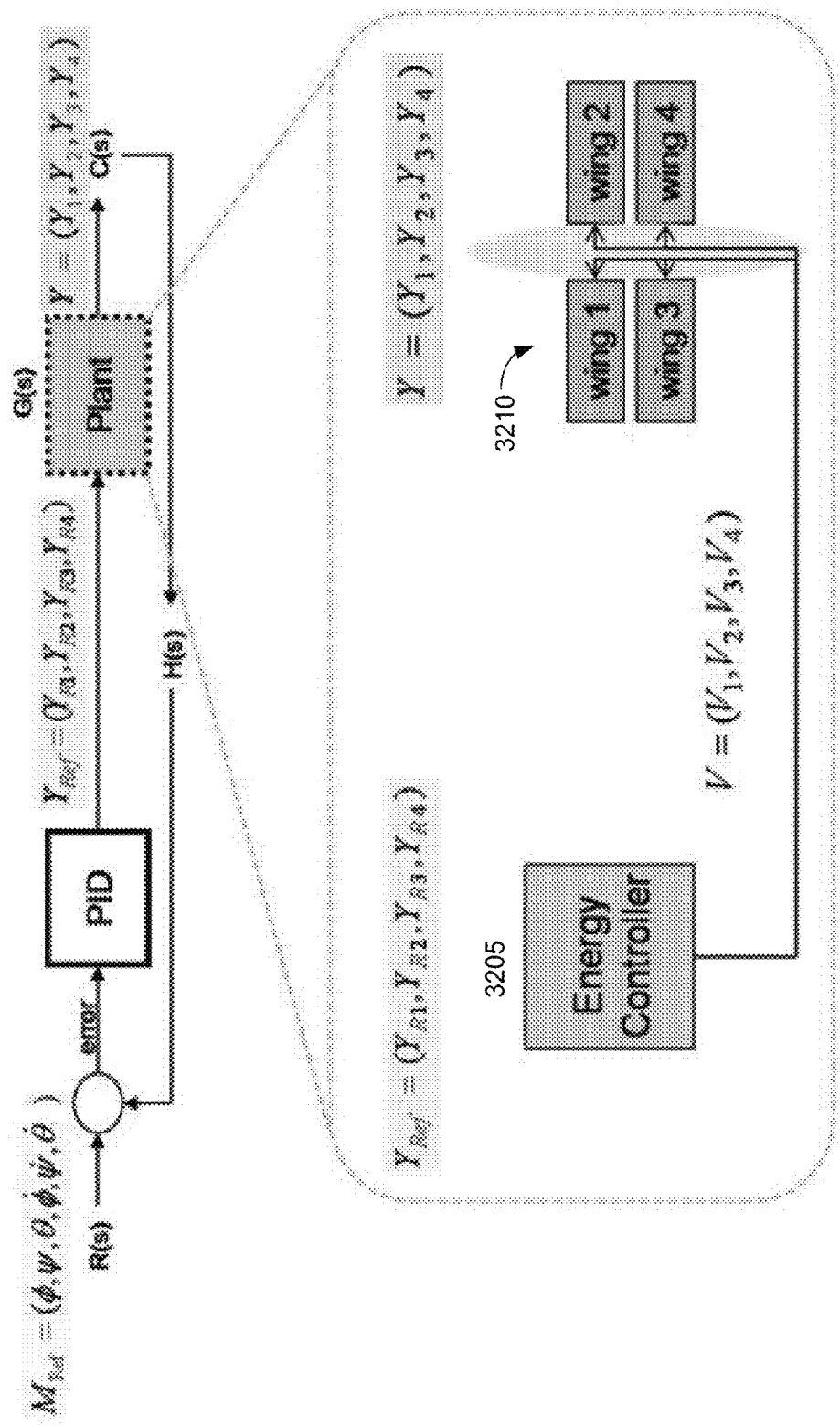
FIG. 32 depicts a PID control system with an energy controller for a multi-winged vehicle with independent wing control, in accordance with some embodiments of the present invention.

As shown in FIG. 32, embodiments of the present invention can further comprise hybrid energy controller 3205. The energy controller 3205 can control the actuators 3210 to produce the desired frequency and amplitude wing-beats. In some embodiments, the actuators 3210 can connect to the four wings directly. In other embodiments, the actuators 3210 can connect indirectly via an appropriate mechanical linkage.

The wing/actuator system energy can be calculated from a combination of output sensor feedback, internal sensor feedback, and various wing/actuator variables including, but not limited to, length, mass, angular position, spring extension, and angular velocity. Using this information, the energy controller 3205 can regulate the power delivered to the actuators 3210, and subsequently, the three body angular rates of the system.

The control law used for calculating the desired energy is shown below:

$$u = sat_{ng}(k(E-E_0)\text{sign}(\dot{\theta}_3 \cos \theta_3))$$

where, u is the control input (voltage) to the linear actuator, E is the normalized energy of the wing/spring combination, and $E_0$ is the desired energy of the wing/spring combination. $sat_{ng}$ puts a limit to the maximum actuation capability of the actuator and k is a design parameter, which varies with each system, and is calculated by the kinematics and dynamics of the system and serves to act as the proportionality constant.

Figure 33:
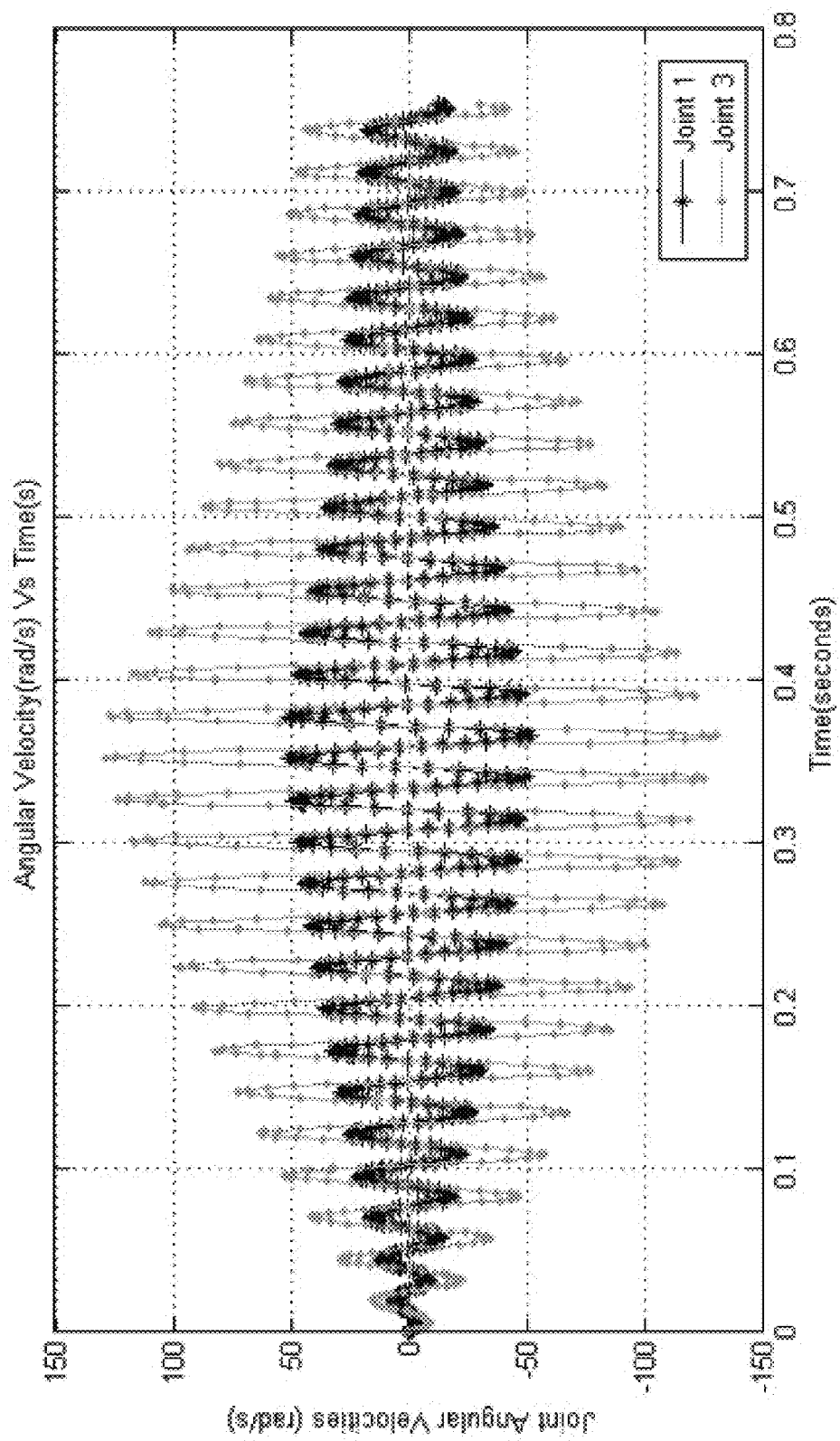
FIG. 33 is a graph depicting energy buildup near resonance for a multi-winged vehicle with independent wing control, in accordance with some embodiments of the present invention.
Figure 34C:
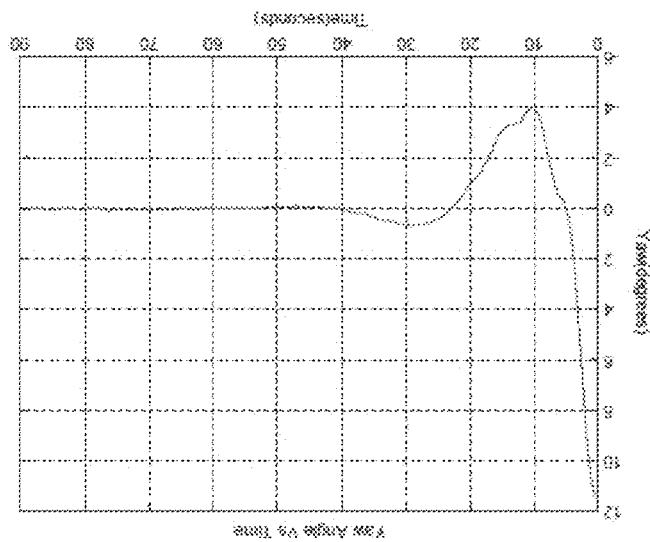
FIGS. 34a-34e depict response times for the PID control system of FIG. 32, in accordance with some embodiments of the present invention.
Figure 34B:
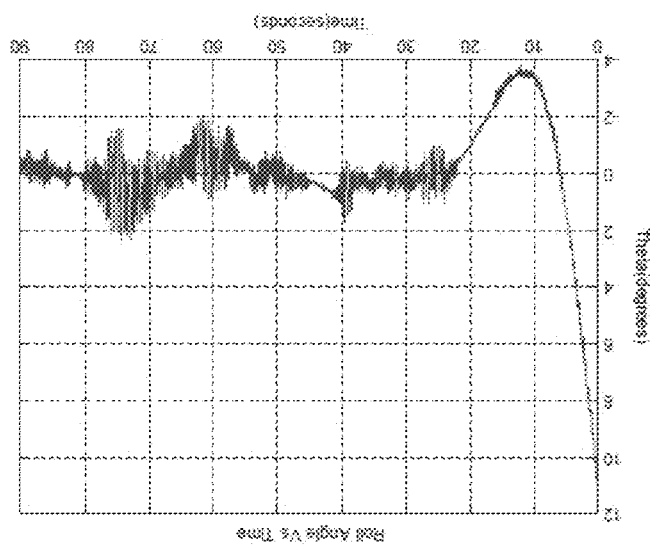
Figure 34A:
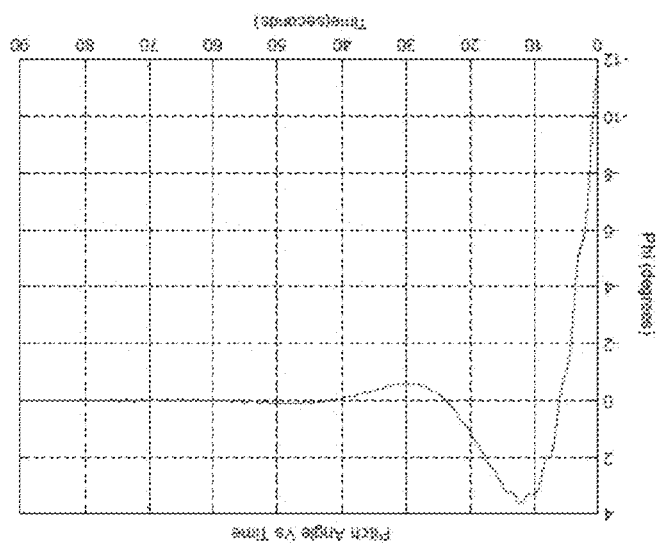
Figure 34D:
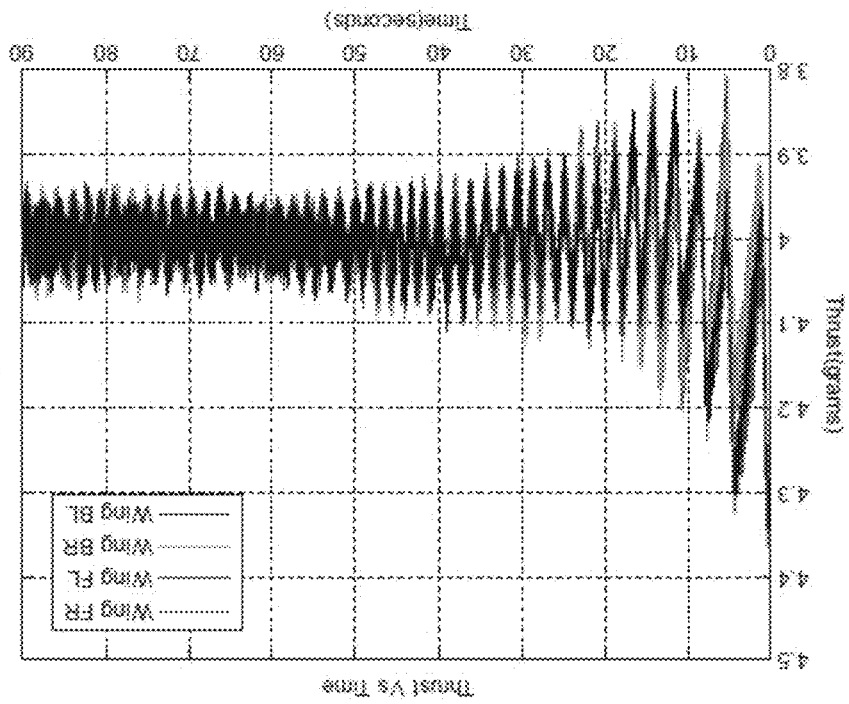
Figure 34E:
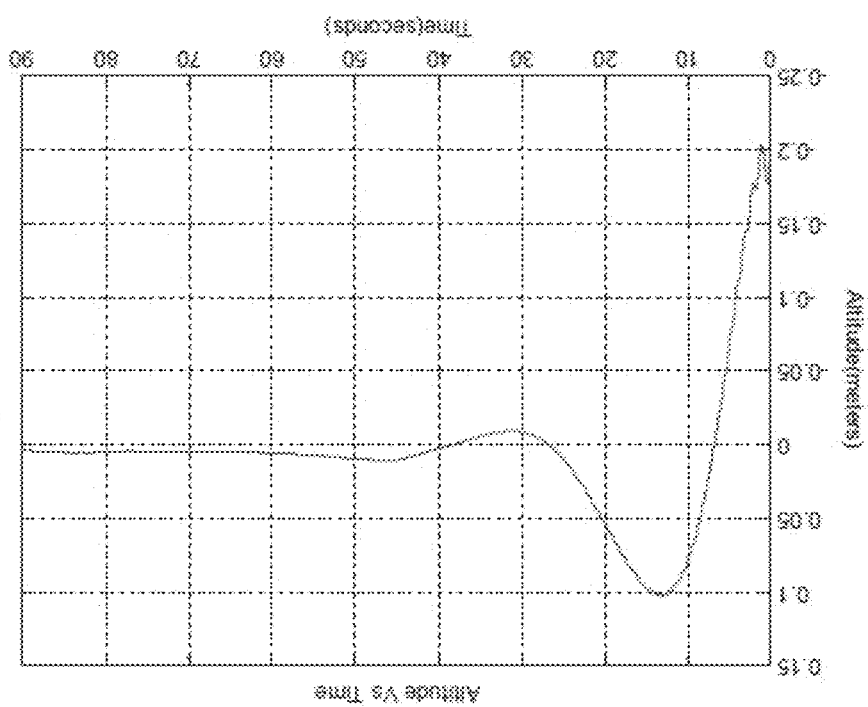

As shown in FIG. 33, the result of the control law implementation on the actuation system is the buildup of potential energy and, in turn, kinetic energy, as seen from the increase of wing angular velocity with time. The actuator is then turned off and damping forces on the wing depreciate the energy, reducing the kinetic energy. This is shown in FIG. 33 first as an increase in peak angular velocity as the actuator is activated and then a decrease in peak angular velocity as the actuator is deactivated.

Example 1

To test the under actuated system step response in simulation, an initial condition of $\phi_{Ref}=-12°$, $\theta_{Ref}=11°$, $\psi_{Ref}=11.5°$ is set and the MAV is commanded to maintain a 20 cm altitude. Initially, the system was tested with a manually selected constant PID gains. The results are shown in the FIGS. 34a-34e. The five graphs show pitch, roll, yaw, altitude and actuator thrust response versus time, respectively. As shown, settling time for manual selection was approximately 50-60 seconds, with an overshoot of approximately 4 degrees. As shown, due to the complexities in the system, manual gain control is less than ideal and requires extensive experimentation to set useful values.

In some embodiments, feedback type controllers can be used for improved performance. A Proportional-Integral-Derivative ("PID") controller, for example, can be used. The three components of the PID controller can be tuned to optimize response time, overshoot, or a combination thereof. As discussed below, in some embodiments, a PI controller can be used, which provides good response and overshoot results with reduced computing over a PID controller. The PI controller can also be advantageous when, as here, noisy data is an issue (i.e., dropping the derivative term steadies response).

Typically, the gains in the PI controller are adjusted by observing characteristic factors such as rising time, settling time, and overshoot until the desired performance metrics are achieved. In this example, however, several factors make this approach undesirable for embodiments of the present invention. These factors include, but are not limited to, the highly non-linear flight dynamics of the system and the under-actuation of the drive mechanism used. In other words, the actuation system used was not strong enough to produce sufficient lift by itself. As a result, a spring was added to save inertial energy waste by the actuator.

With the spring in place, the actuator only has to contribute to air damping and not to inertial damping and restoration. As a result, with the spring, the actuator has sufficient power to produce lift. When the spring is added, however, the system cannot instantaneously flap at maximum amplitude, but incrementally gets to that level over a several cycles. This buildup continually adds to the spring energy reserve, thereby increasing the amplitude over time. Due to the highly experimental and variable nature of the gains necessary for control over the system with the spring, therefore, manual, or stepwise, gain control produces slower response times than is desired.

Figure 35:
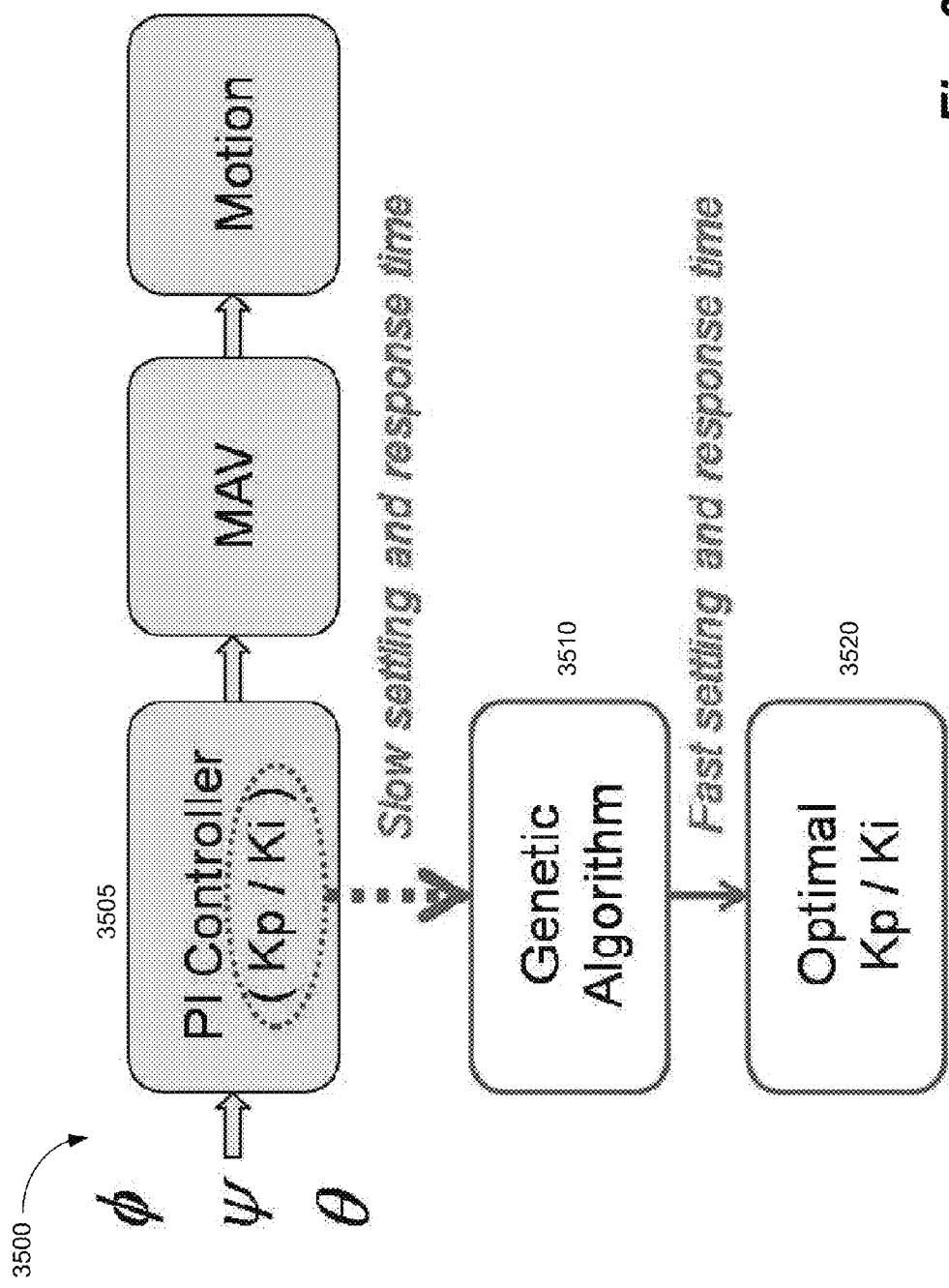
FIG. 35 depicts a PID control system with Genetic Algorithm (GA) gain tuning for a multi-winged vehicle with independent wing control, in accordance with some embodiments of the present invention.

As shown in FIG. 35, embodiments of the present invention, therefore, can comprise a control system 3500 comprising a Proportional-Integral ("PI") controller 3505. In some embodiments, the PI controller 3505 can use a Genetic Algorithm ("GA") 3510 to improve overshoot and response time 3515, among other things by optimally tuning the control system gains 3520. The performance of the proposed system 3500 can be measured, for example, by measuring the system response times to a step input.

Example 2

To measure the effectiveness of the system 3500, the cost function for the GA 3510 can be defined as the cumulative area under the step response graph until the system 3500 settles to the commanded, or desired, value. In other words, the smaller the area under the curve, the faster the response time of the system 3500. Generally, to apply the GA 3510 to a selection problem, the gene structure and evaluation method should be prepared. In this case, for example, the set of PI gains 3520 can be defined as a gene and the fitness function can be defined as the cost metric. The crossover rates and the mutation rates are set as 100% and 10%, respectively. The cost function is the area sum under the response curves.

Figure 36C:
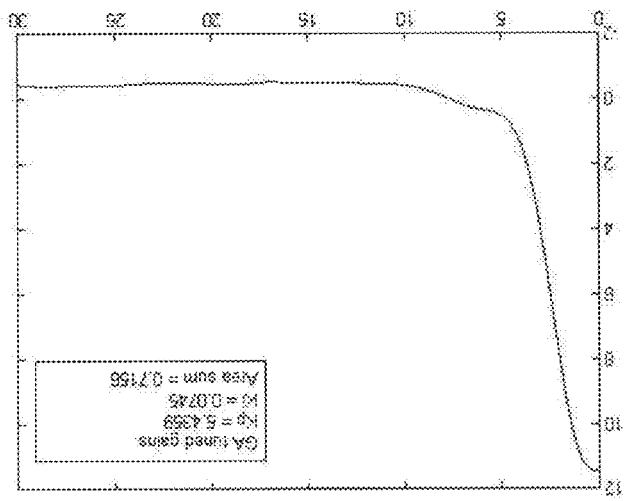
FIGS. 36a-36c depict a graph of response times for the PID control system after GA gain tuning of FIG. 35, in accordance with some embodiments of the present invention.
Figure 36B:
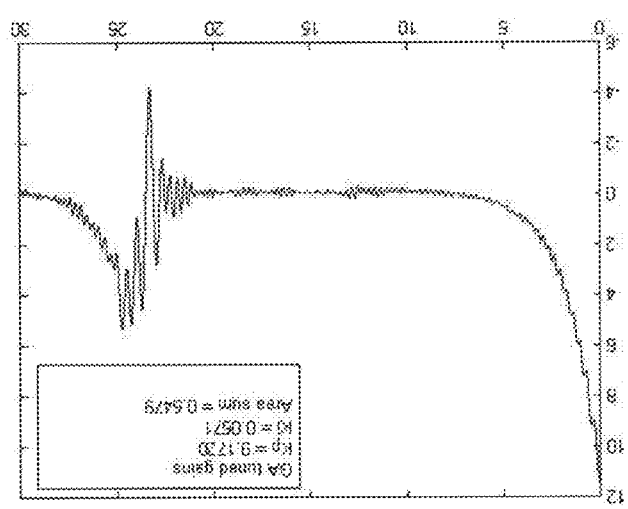
Figure 36A:
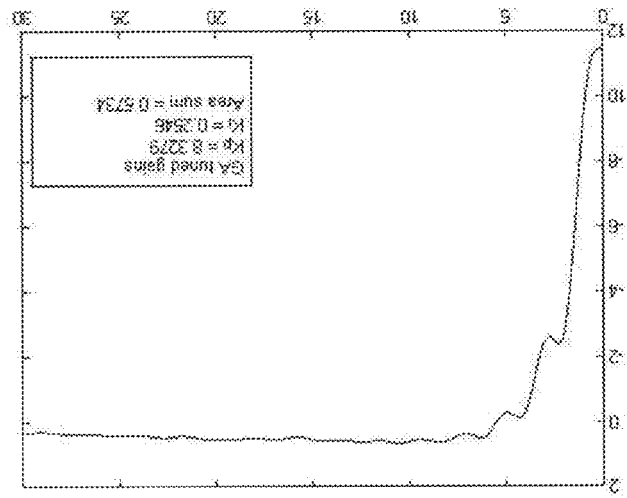

As shown in the Table 2 below and in FIGS. 36a-36c, there is a marked performance improvement using the GA based design tuning 3500 over manual gain selection 2900. The table highlights the results of gain tuning using the devised GA 3510 after 6 generations. As mentioned above, settling time for manual selection was approximately 50-60 seconds, with an overshoot of approximately 4 degrees. The GA based gain tuning 3500, on the other hand, has 0 degrees overshoot and the settling time has been reduced to approximately 5 seconds.

TABLE 2

Gains (Top Down): Manual Selection, GA Tuning
(6 Generations); GA Tuning (96 Generations)

| PI Controller | Kp | Ki | Area Sum |
|---|---|---|---|
| Pitch | 12.5 | 0.05 | .3752 |
| Roll | 14 | 0.02 | .3596 |
| Yaw | 7.3 | 0.05 | 0.5832 |
| PI Controller | Kp | Ki | Area Sum |
| Pitch | 8.3279 | 0.2546 | 0.5061 |
| Roll | 9.1720 | 0.0571 | 0.3506 |
| Yaw | 5.4359 | 0.0745 | 0.6380 |
| PI Controller | Kp | Ki | Area Sum |
| Pitch | 4.3874 | 3.2975 | 1.46E-12 |
| Roll | 6.3704 | 1.2216 | 1.29E-12 |
| Yaw | 2.4128 | 7.1614 | 0.00019 |

Example 3

In some embodiments, a PD controller can be used. By removing the integral component, faster response times are possible, but some accuracy is sacrificed. Thus, while the system tends to settle to the reference position, in some cases it is slightly off. As with all control systems, accuracy, speed, and processor power can be balanced, as required, to meet, for example and not limitation, specific mission, cost, or design parameters.

Figure 36E:
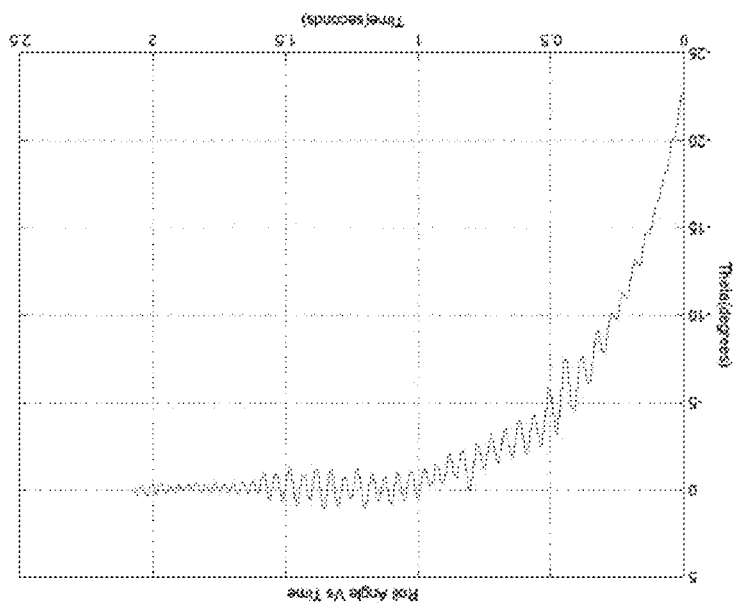
FIGS. 36d-36e depict a Proportional-Derivative ("PD") control system for a multi-winged vehicle with independent wing control, in accordance with some embodiments of the present invention.
Figure 36D:
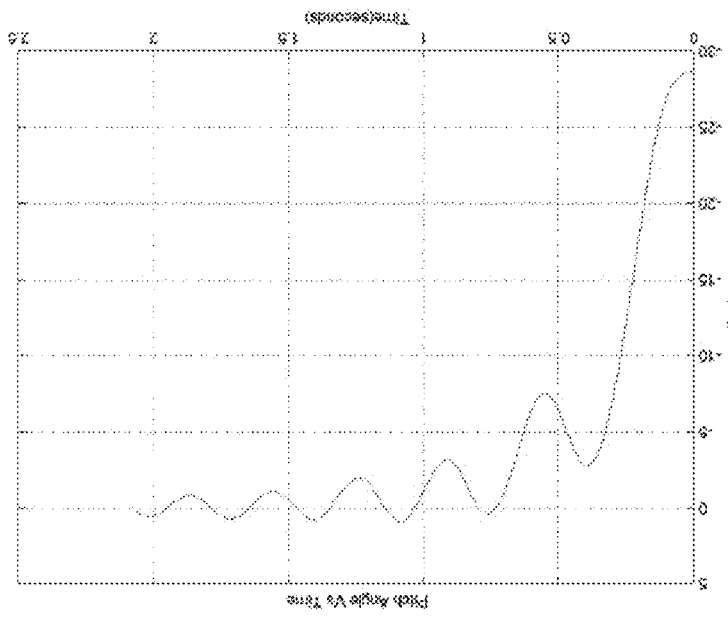

In this example, the system was provided an initial set of gains and an initial deflection of 20-30 degrees with a reference position of zero degrees. As shown in FIGS. 36d and 36e, the output response is much faster than predicted in the simulation model for the PID controller or the PD Controller. As shown, response time for both pitch and roll is 1-1.5 seconds. Of course, these response times are significantly affected by several factors, including but not limited to, under or over actuation, vehicle and/or payload weight, wing span and shape, and electrical component design. Smaller MAVs with the same PD controller are shown to have sub second response times.

Hovering and Gliding

In addition to the basic control system described above, embodiments of the present invention can additionally comprise a system capable of hovering flight, gliding (or fixed-wing) flight, and transition therebetween. Thus, the system can comprise three main modes of flight: (1) powered flight (i.e., wings flapping and causing translation and/or rotation) (2) hovering (i.e., wings flapping with no translation) and (3) gliding (i.e., fixed-wing, translational flight). This can enable the MAV to loiter and perform complex maneuvering, while providing increased payload and/or duration using fixed-wing flight.

With regard to flapping flight, the wings of insects and birds, for example, often move in relatively complex patterns. For convenient modeling, however, the motion can be simplified into two basic motions: flapping and feathering. The flapping portion can comprise the basic downstroke and upstroke of the wing. Feathering, or supination and pronation, can comprise the rotation of the wing about a longitudinal axis. Supination and pronation occur at the top (pronation) and bottom (supination) of each flapping stroke. Pronation can increase lift, for example, by rotating the wing to be substantially flat (i.e., perpendicular) with respect to the direction of the flap (and thus the airflow) as the wing begins its downstroke. Pronation, on the other hand, can reduce drag and negative lift on the upstroke by rotating the wing to a feathered, or substantially parallel, position with respect to the air flow.

During modeling, the wing kinematics can be usefully defined in terms of rotational velocities as functions of time for compatibility with dynamic 6 DoF solvers such as, for example and not limitation, Fluent. In this nomenclature, flapping can be defined as the primary rotation of the wing about a lateral axis of the wing and describes the basic upstroke and downstroke of the wing. Feathering can be defined as the second rotation, or rotation of the wing about the longitudinal axis of the wing, which defines pronation and supination.

Figure 37:
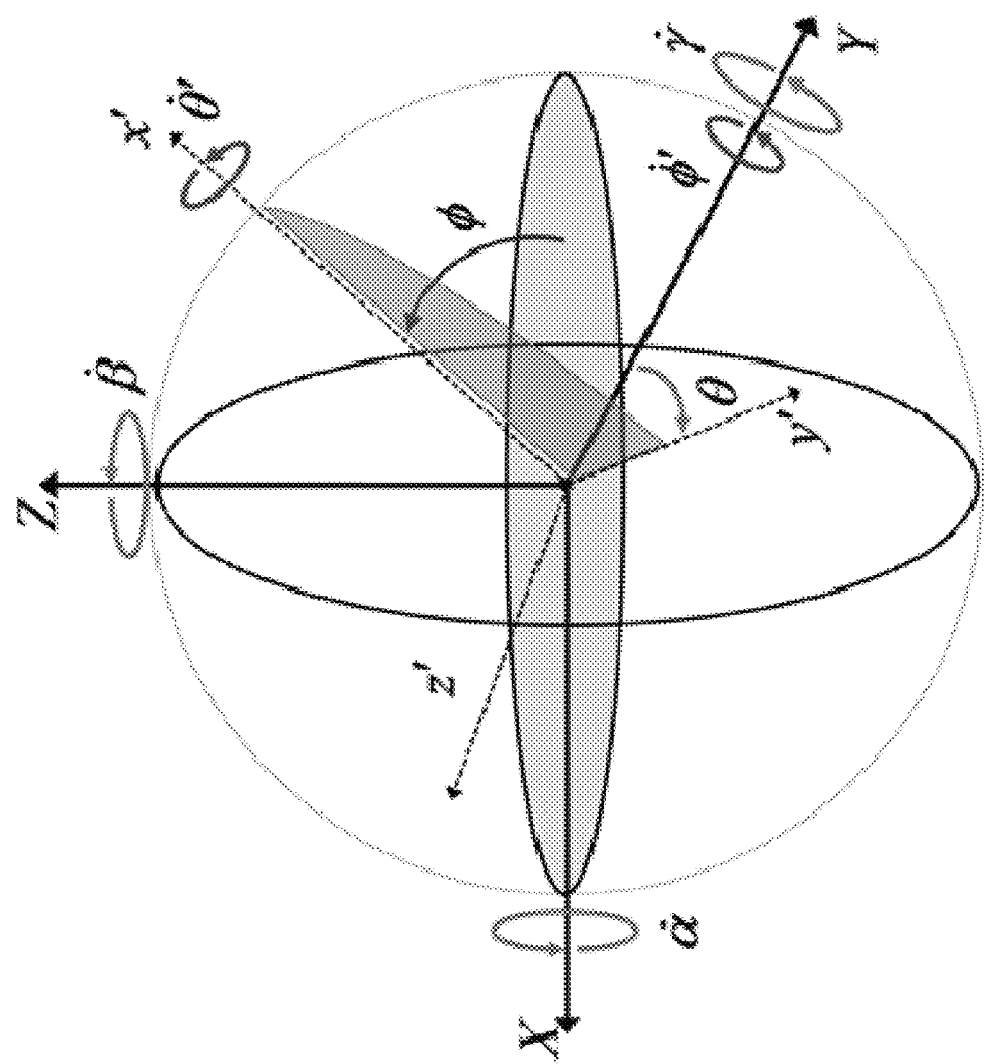
FIG. 37 depicts a coordinate system for a feathering and flapping wing vehicle, in accordance with some embodiments of the present invention.

The 3D representation of the world frame of reference (i.e., the overall MAV frame of reference) and the wing leading edge ("WLE") frame of reference can be represented as shown in FIG. 37. Using this nomenclature, $\dot\alpha$, $\dot\beta$ and $\dot\gamma$ represent the angular rates of the wing in the world frame of reference. Similarly, $\phi'$ can be the angular velocity of the flapping motion about the Y axis and $\theta'$ can be the angular velocity of the feathering motion. Table 2 lists the nomenclature used below.

| Symbol | Description |
| --- | --- |
| $\phi$ | Instantaneous flapping angle |
| $\theta$ | Instantaneous Feathering Angle |
| $A_{flap}$ | Amplitude of Flapping Motion |
| $A_{feat}$ | Amplitude of Feathering Motion |
| $C_L$ | Lift Coefficient |
| $C_D$ | Drag Coefficient |
| t | Time |

Thus, the coordinate transformation from the WLE frame of reference to the world frame of reference can be given by the Eq. 1:

$$\begin{bmatrix} X \\ Y \\ Z \end{bmatrix} = \begin{bmatrix} \cos(\phi) & \sin(\theta)\sin(\phi) & \cos(\theta)\sin(\phi) \\ 0 & \cos(\theta) & \sin(\theta) \\ \sin(\phi) & \sin(\theta)\cos(\phi) & \cos(\theta)\cos(\phi) \end{bmatrix} \begin{bmatrix} x' \\ y' \\ z' \end{bmatrix}$$

And the angular velocity transformation can be given by Eq. 2:

$$\begin{bmatrix} \dot\alpha \\ \dot\beta \\ \dot\gamma \end{bmatrix} = \begin{bmatrix} \cos(\phi) & 0 & 0 \\ 0 & \sin(\phi) & 0 \\ 0 & 0 & 1 \end{bmatrix} \begin{bmatrix} \theta' \\ \theta' \\ \phi' \end{bmatrix}$$

This transformation enables modeling and solution in the 6 DoF solver.

Simple flapping motion of the wing, which would occur if simple linear actuators were used, for example, results in a simple sinusoidal velocity profile as given by Eq. 3:

$$\dot\phi = -A_{flap}\omega\cos(\omega t)$$

As discussed above, however, in some embodiments, the actuator can use suitable mechanisms to introduce the feathering motion into the flapping motion. In some embodiments, cam followers can be used to guide the feathering angle of the wing at a precise angle at along the path of its flapping motion (i.e., both through the upstroke and the downstroke). In other embodiments; active servo control can be provided to magnetically control the feathering motion during the flapping cycle. In this configuration, active feathering can be controlled by, for example, an additional actuator dedicated to this purpose.

Figure 38:
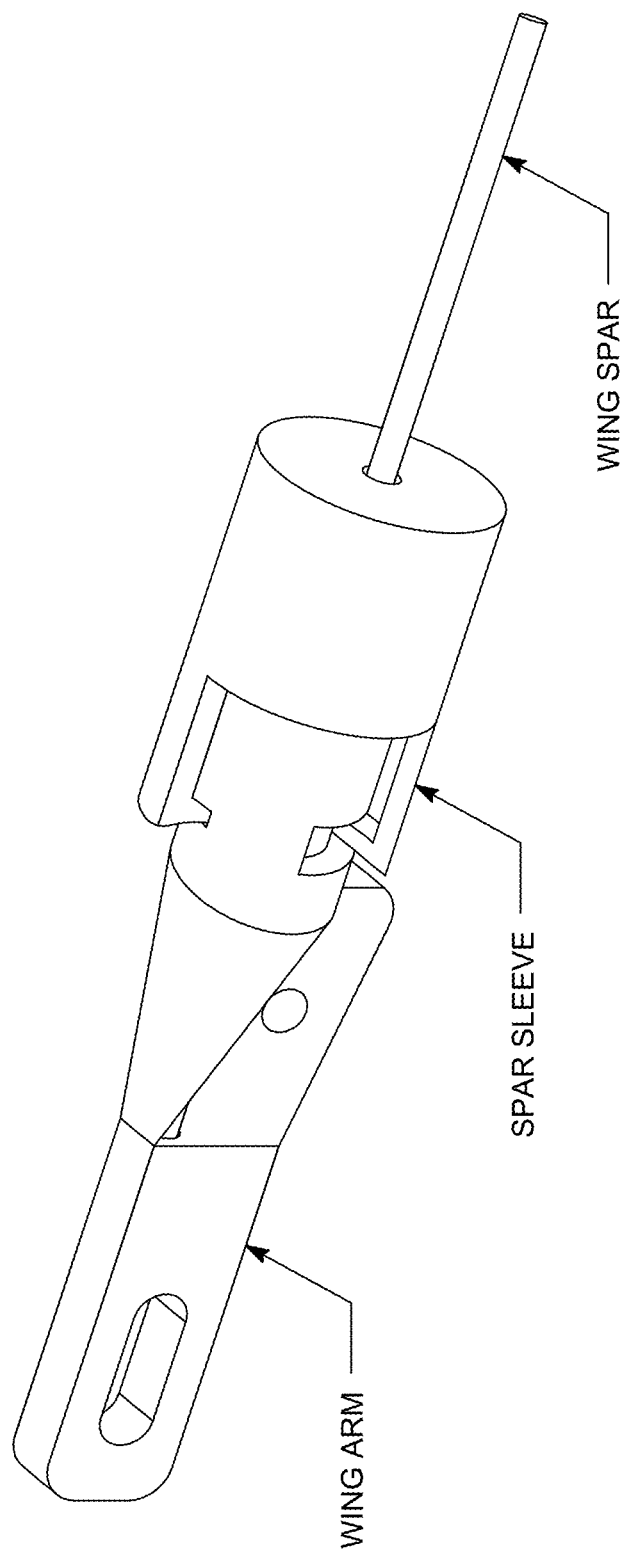
FIG. 38 depicts a spring controlled wing feathering mechanism with hard stops, in accordance with some embodiments of the present invention.

In a preferred embodiment, as shown in FIG. 38, a spring and hard stops are used to feather the wing. This produces a feathering motion which, due to the stops, starts and stops impulsively at the end of the upstroke and downstroke. This motion can be described as:

$$\dot\theta = \begin{cases} 2A_{feat}\omega\sin(2\omega t - \text{shift}), & \text{Upstroke} \\ 0, & \text{Downstroke} \end{cases}$$

Figure 39B:
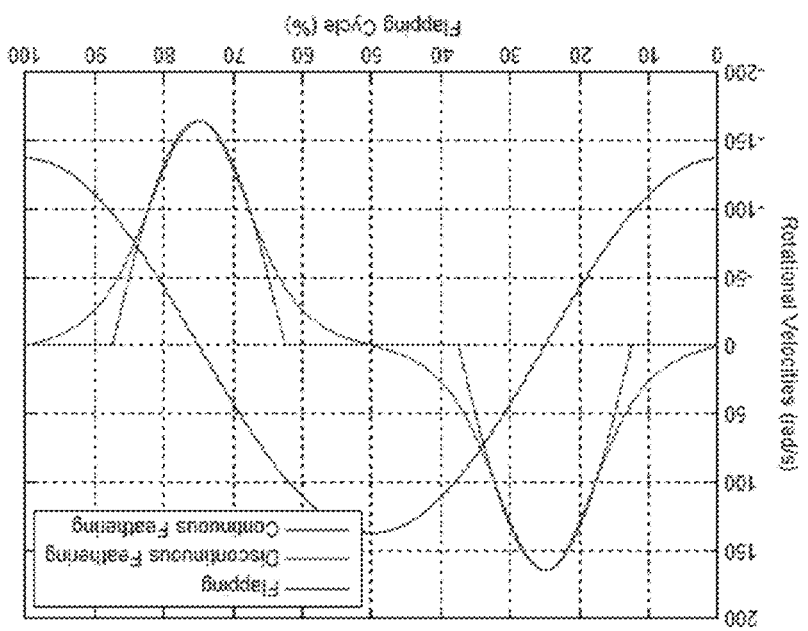
FIGS. 39a-39b depict a graph of the discontinuities in motion caused by the hard stops of the feathering mechanism in FIG. 38, in accordance with some embodiments of the present invention.
Figure 39A:
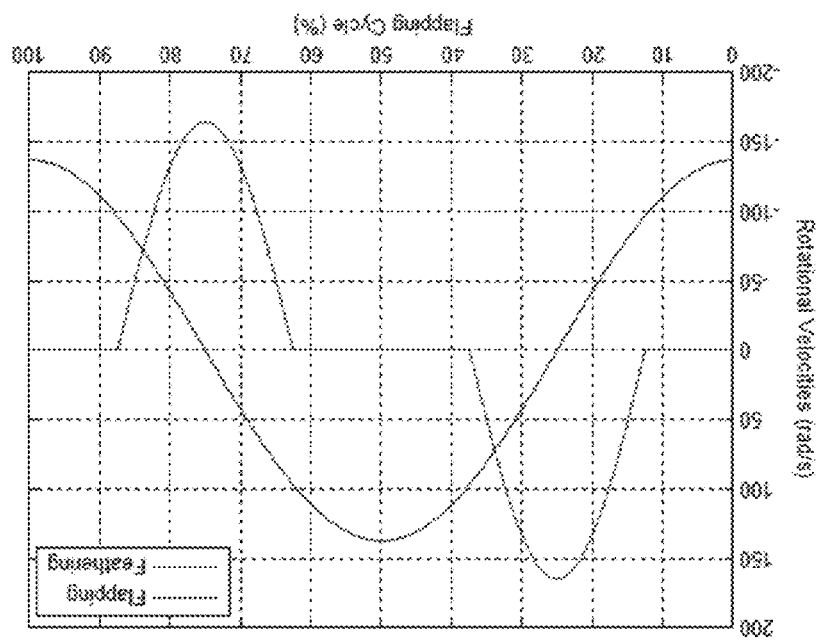
Figure 39D:
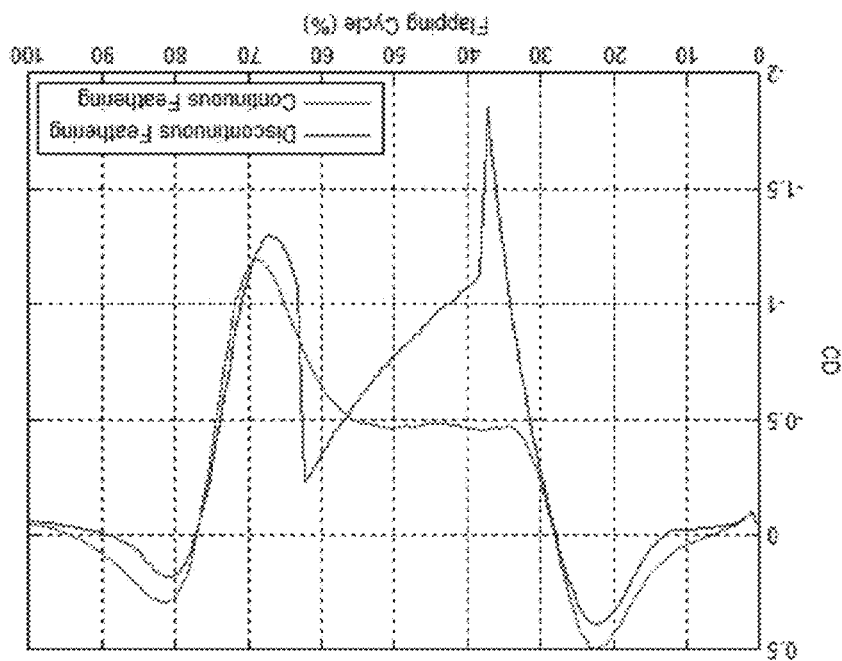
FIGS. 39c-39d depict a graph of a smoothing function used to avoid the discontinuities in motion caused by the hard stops of the feathering mechanism in FIG. 38, in accordance with some embodiments of the present invention.
Figure 39C:
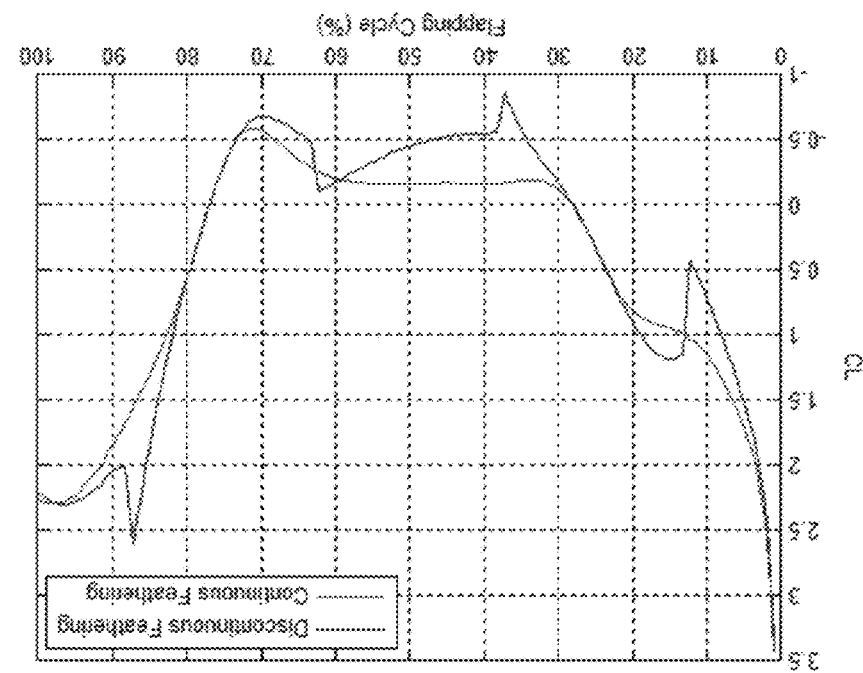

As shown in FIG. 39a, though the velocity function itself for this type of motion is continuous, its time derivative is not. This manifests itself as a number of jumps in the resulting force trace for lift and drag, as shown in FIGS. 39c and 39d, respectively. This on/off velocity profile results in numerical anomalies in the solution. As a result, in a preferred embodiment, a continuous feathering velocity function approximation, as shown in FIG. 39b, is used. The smoothing of the function leads to the sinusoidal function:

$$\dot\theta = A_{feat}\omega\sin(\omega t)e^{(\sin(2\omega t - \pi/2) - 1)}$$

As shown in FIG. 39b, this function approximates the previous feathering velocity function very well. This function also does away with the on/off velocity steps which tend to cause discontinuities in the force traces. As shown, when integrated over time, however, this function increases the maximum feathering angle slightly compared to the discontinuous function. This increase can be easily accounted for in the control system, if desired.

Figure 40:
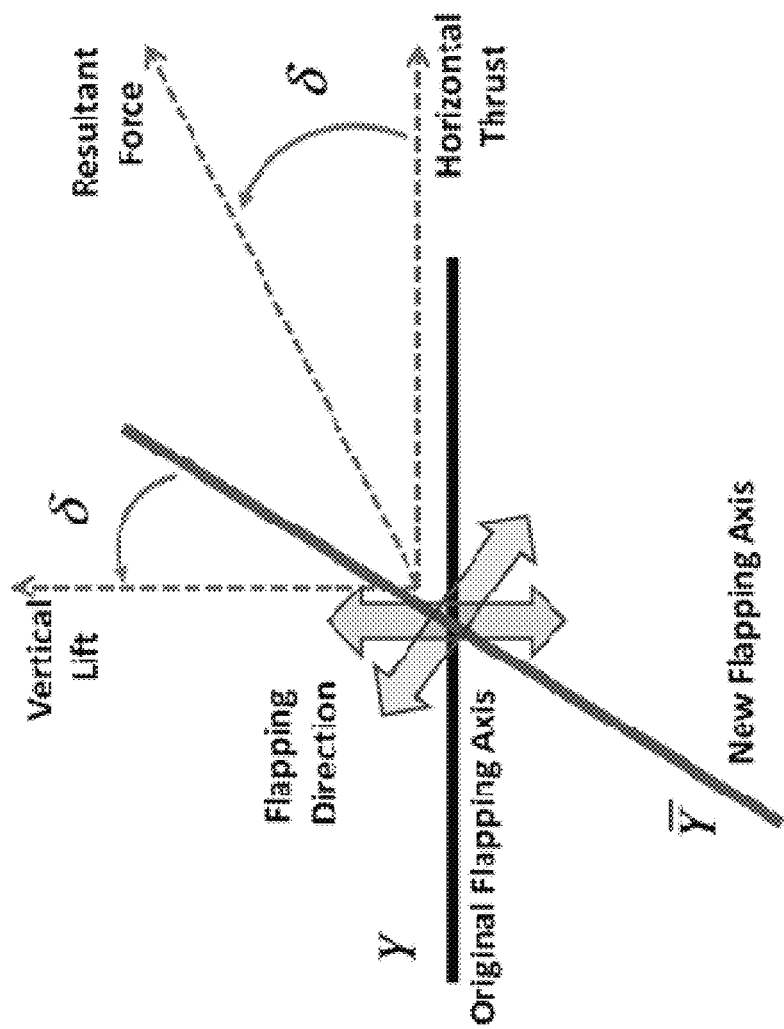
FIG. 40 depicts the resultant force angle caused by a vertical lift and horizontal thrust angles, in accordance with some embodiments of the present invention.

It is important to note that the 4-wing configuration of the MAV can maintain equilibrium in hovering mode even if each wing is producing a negative drag that is equivalent to thrust, which is conventionally important for forward flight. In hovering mode, however, it is desirable to minimize any horizontal force, which would tend to create "creep." As shown in FIG. 40, due to the configuration of the MAV, the lift and thrust components produced by the wing are directed substantially perpendicular to each other. The net resultant force, therefore, is directed at an angle δ. To maintain a stable hover, therefore, the wings' flapping pivot can be re-oriented to the new position, in pitch, roll, or both, such that the resultant force on the MAV is directed vertically upwards.

Figure 41A:
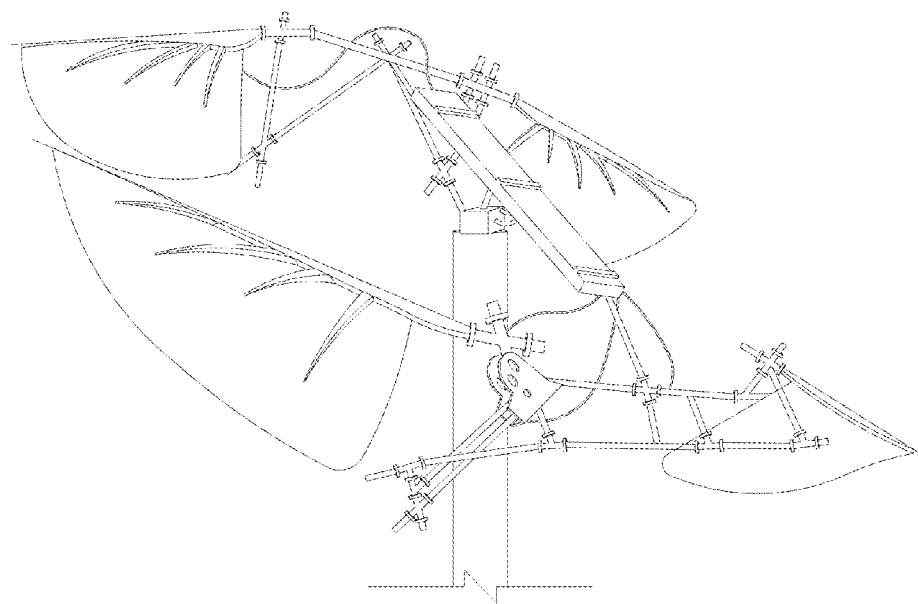
FIGS. 41a and 41b depict a working model of a micro air vehicle ("MAV"), in accordance with some embodiments of the present invention.
Figure 41B:
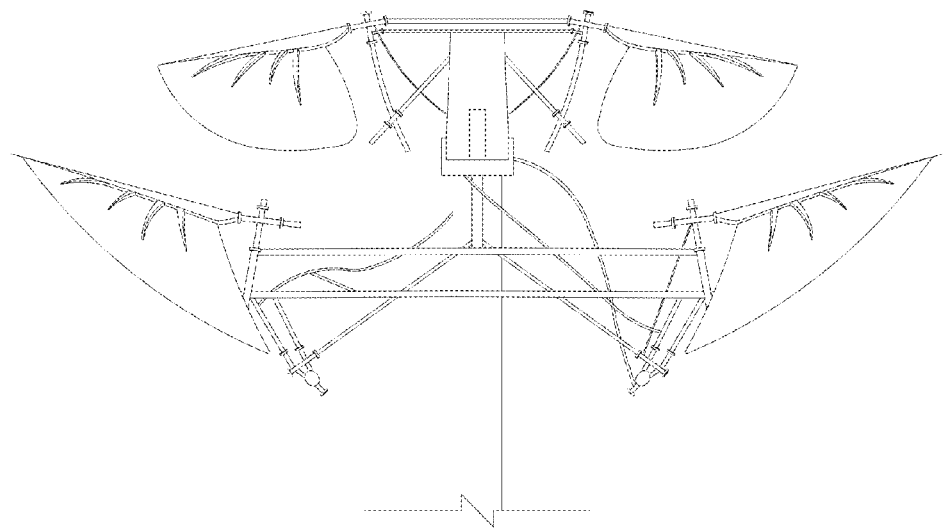

Thus, the MAV can sustain hovering as long the net horizontal force of all wings together is zero. If there is a net horizontal force, the solution is to simply re-orient the wings at an angle so they flap about a new axis between the Y and the Z axis to counteract the side thrust as determined by the vector addition of the thrust and lift force components. By directing the net resultant force, along the negative Z axis, each wing can be made to produce a substantially upward force. This can be seen in the design of the MAV in FIGS. 41a and 41b. This configuration enables the 6DoF control to be achieved with the control law illustrated in FIG. 28.

As described above, a hypocycloidal gear train can be used to control the flapping frequency and amplitude of four or more wings to provide the aforementioned three modes of flight. This arrangement enables amplitude modulation, providing fixed frequency, variable amplitude control over wing flapping. This arrangement also enables variable frequency, variable amplitude control when needed or desired by simply varying the speed of the one or more drive motors. Of course, variable amplitude, variable frequency control is also possible.

As described above, by rotating the ring gear, the spur gear position is changed. This, in turn, changes the position of the drive pin, which leads to a change in the amplitude of the wing flapping. This change in amplitude leads to a change in thrust and lift outputs from the wings of the MAV. In this configuration, each wing of the MAV can be independently controlled while, for example, keeping the frequency the same across the entire vehicle. Changing the amplitude at each wing independently, on the other hand, changes thrust and lift from each wing independently. If the MAV is creeping forward, for example, the system can simply increase thrust on the front pair of wings. This can enable the MAV to pitch up at the nose, for example, until there is no translational motion from the MAV.

Figure 42A:
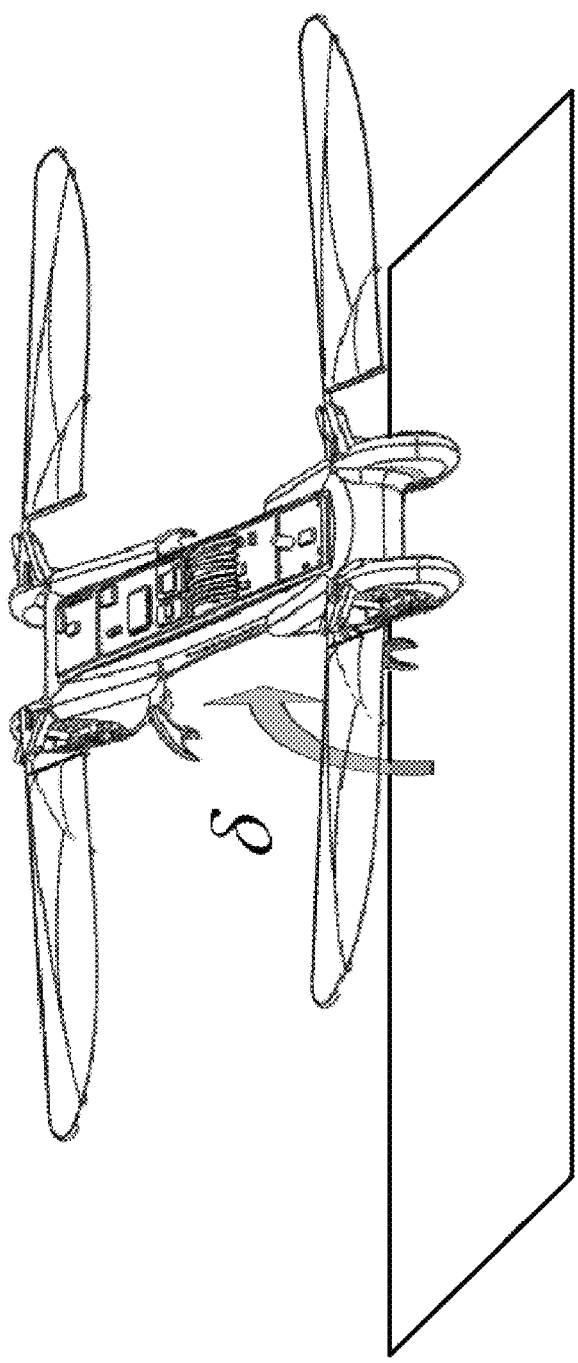
FIGS. 42a and 42b depict angle of hovering for an MAV, in accordance with some embodiments of the present invention.
Figure 42B:
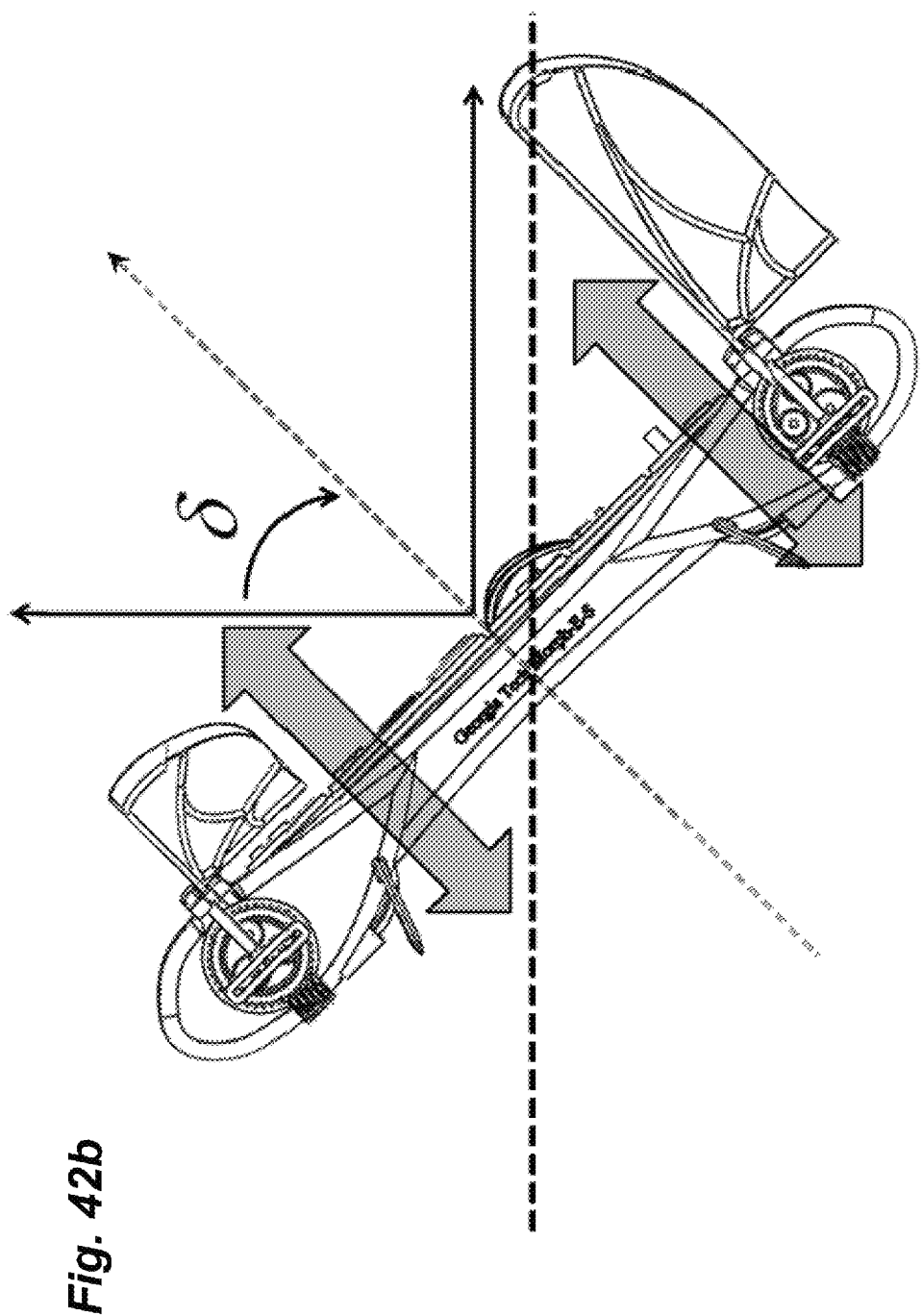

Referring to FIGS. 42a and 42b, the angle of hovering δ is determined primarily by the flapping amplitude, the feathering elasticity, and the flapping frequency of the wings. In hovering mode, absent outside forces (e.g., wind), both the fore and aft wings can flap at substantially equal amplitudes and equal frequencies. The transition to gliding flight or translational flight can then be commanded, as described below.

Embodiments of the present invention can also comprise a control system capable of transition to fixed wing flight. As discussed above, when desired the ring gear can be rotated until the drive pin on the spur gear is substantially centered within the ring gear. In this configuration, the drive system may continue to run to provide gyroscopic stability with significantly reduced power consumption or can be stopped altogether. With all four wings in this zero-amplitude, or fixed-wing, mode, the MAV can assume highly efficient fixed-wing flight.

Fixed-wing flight can reduce power consumption and can be likened to the neutral gear of an automobile. Of course, if fixed-wing flight is engaged from altitude, this recovers the potential energy therefrom, and can increase flight duration and distance. In this configuration, the frequency-controlling motor can continue to spin, if desired, but no power is sent to the wings. In addition, due to their design (i.e., opposing axes of rotation), the worm and worm gear arrangement serve to substantially lock the wings in position. As in all fixed-wing flight, lift is produced almost exclusively by the airfoil shape of the wings and the angle of attack. This configuration, therefore, enables the wings to be fixed in an optimal fixed-wing configuration.

During fixed wing flight, flight control (i.e., roll, pitch, and yaw) can be provided by varying lift on individual wings. This can be accomplished by transitioning back and forth between fixed-wing and flapping flight on individual, or pairs of, wings, as necessary. In this manner, flight control can be provided in substantially the same manner as shown in FIG. 28.

By varying output thrust/lift on individual wings, various Euler angle motions can be achieved. In some embodiments, the gliding mode can be augmented, for example, by producing flapping at a reduced amplitude (i.e., moving the drive pin slightly away from the center of rotation of the ring gear). The reduced amplitude flapping can providing reduced forward thrust, but also incurs minimal power expenditure. In a preferred embodiment, the reduced amplitude flapping can be centered about the ideal fixed-wing configuration to maintain optimal lift.

In some embodiments, for example, conversion from hovering flight to fixed wing flight can be achieved by simply pitching forward and gradually reducing the flapping amplitude of the wings. As the flapping amplitude of the wings approaches zero, the MAV and the control system transition into gliding mode. Due to the configuration of the MAV, the same control law for pitch, roll and yaw still applies in gliding mode and during transition between hovering and gliding modes. In gliding mode, for example, instead of using servo control for elevators, ailerons, and rudders—as with conventional aerial vehicles—the wings are differentially controlled in amplitude. This provides the same, or similar, results, but power consumption can be constrained by keeping the amplitude small. Fixed-wing flight in this manner takes advantage of airfoil lift, like in fixed wing aircraft, but enables the instantaneous switching to hovering or fast maneuvers, as required.

Figure 44A:
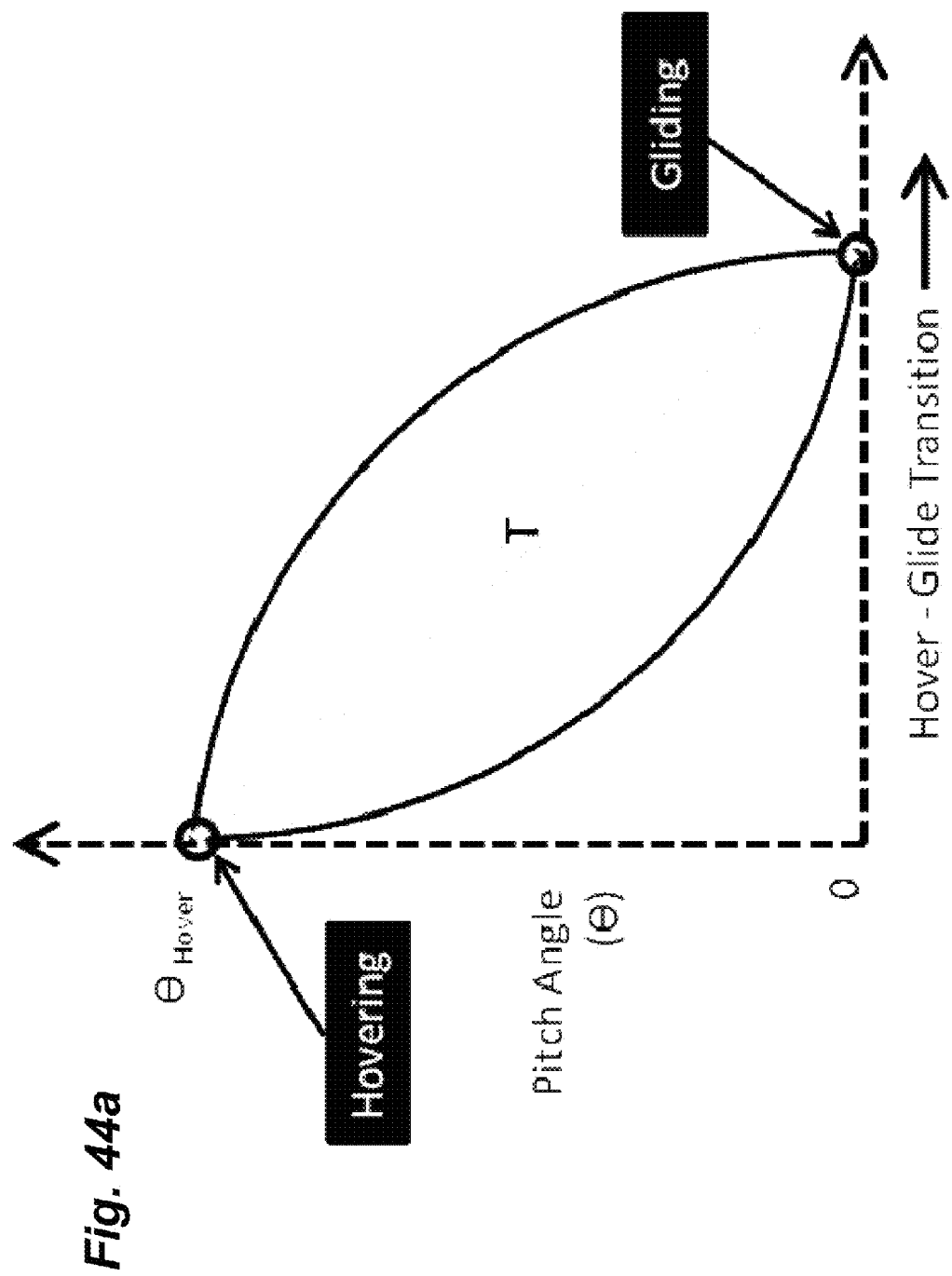
FIG. 44a is a graph depicting the relationship between pitch angle and hovering/gliding, in accordance with some embodiments of the present invention.

As discussed above, using the control laws discussed in FIG. 28, the pitch of the MAV can be changed. By altering the Pitch Angle of the MAV, the MAV can transition from hovering to gliding and back again. As shown in FIG. 44a, when the Pitch Angle is zero or slightly nose down, and the amplitude of the flapping is also zero, or near zero, the MAV is effectively in gliding mode. When hovering, however, due to a rearward thrust vector inherently created by the flapping and feathering of the wings, to maintain a stable hover, a positive pitch angle (i.e., nose up) is required.

T denotes the Transition zone between hovering mode and gliding mode. The shape of the transition zone depends on several factors including, but not limited to, the gains for the MAV, and mechanical, aerodynamic, and electrical system parameters. In other words, the shape of the curve in FIG. 44a is exemplary and not intended to be limiting. In addition, the response time between hovering and flapping is largely defined by the mechanical and/or electrical parameters of the systems and/or the control system implemented. The transition is shown in FIGS. 48a-d.

As with helicopters and other VTOL aircraft, the flight-control gains required for effective hovering require a higher output power from the wings and hence are different from those required whilst gliding. As a result, during transition, the flight gains (e.g., PD, PI, or PID gains) can transition from $Kp_{gliding}$, $Ki_{gliding}$, and $Kd_{gliding}$ to $Kp_{hovering}$, $Ki_{hovering}$, $Kd_{hovering}$ by specifying a gradient/transition parameter, $T_g$, proportional to the Pitch Angle, Θ. Where, $$\text{Gain Transition Parameter}(T_G)=f(\theta)$$

Thus, when the MAV is purely hovering (and/or translating while close to hovering) the one set of gains can be used ($G_{hover}$); while when the MAV is purely gliding forward, another set of gains ($G_{glide}$) can be used. The transition function, $T_g$, can be used to determine intermediate gains in the transition zone (T).

Embodiments of the present invention can further comprise a hybrid, or mode switching, strategy utilizing multiple control loops. In this configuration, in hover mode one or more control loops pertinent to hovering and around-hovering translation can be devised separately. In addition, one or more control loops for gliding can be separately formulated to perform gliding and near-gliding maneuvers, with linear or non-linear controllers. Similarly, one or more transition modes can be devised for different Pitch Angles and/or other parameters.

The number of transition modes can vary depending on, among other things, performance requirements and processor speed. So, for example and not limitation, the transition modes can include a first transition mode for pitch angles between 15 and 30 degrees and a second transition mode for pitch angles between 30 and 45 degrees. Of course, the number of transition modes can be determined to balance the response of the system (more modes) with processing requirements (less modes). As before, this control loop could be a simple PI, PD, or PID controller or another linear or non-linear controller (which may include adaptive and/or learning algorithms or a hybrid between learning/adaptive and linear/non-linear controllers).

Figure 44B:
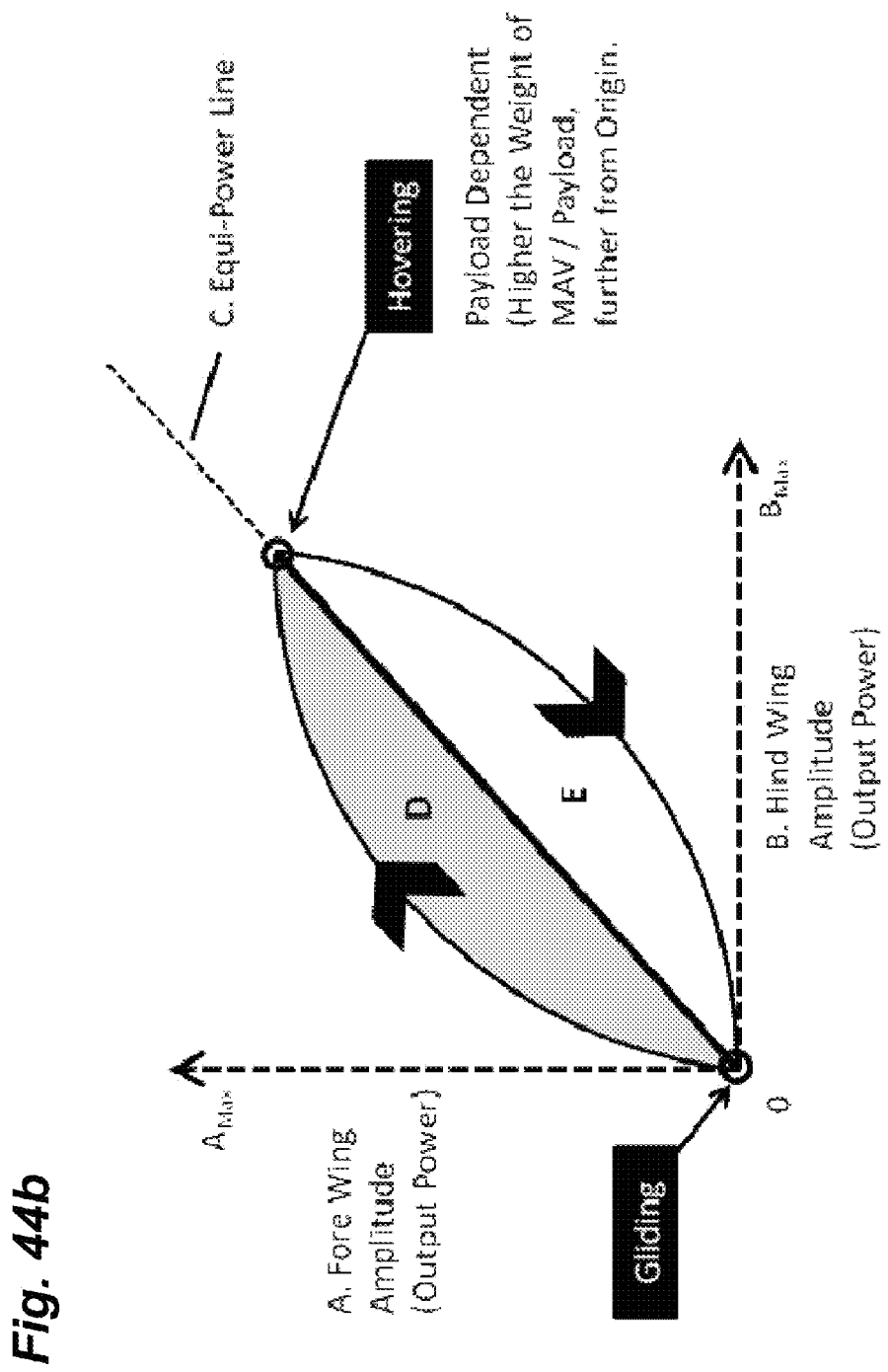
FIG. 44b is a graph depicting the relationship between front wing power output and rear wing power output with regard to hovering/gliding, in accordance with some embodiments of the present invention.

FIG. 44b provides an example of how the wing amplitude (i.e., thrust required) would transition between hovering and gliding. Zone D indicates the zone where the vehicle will transition from gliding motion to hovering motion. Of course, the shape of the curves is dependent on, among other things, vehicle mass, wing shape and size, and phase angle, and can be different for different configurations.

Similarly, Zone E indicates the zone where the vehicle transitions from hovering mode to gliding mode. As can be seen, in this case the front wings have lower amplitudes than the rear wings (assuming both front and rear wings are identical), resulting in lower power output from the front wings than the rear wings. This results in a differential moment about the center of the body, which results in the gradual transition between modes. The response time can depend on, among other things, the difference in power output between the front and rear wings, shape of the wings, and transition gains.

On The equi-power line, Zone C, the MAV performs pure gliding or pure hovering. In other words, if the front and rear wings are producing equal output power for flight, then the MAV will hold its pitch attitude. For moving back and forth between hovering and gliding, therefore, some deviation from the equi-power line is required (absent outside forces). The hovering point for the MAV depends on, among other things, the weight of the MAV and its payload. In other words, the higher the payload/MAV-weight, the further away from the origin the hovering point will be. If the pitch angle goes beyond the hovering pitch angle, then the system can simply translate backwards, which is compensated for by the control system to maintain steady hovering.

Wing Phasing

In some embodiments, wing phasing can be used to improve efficiency. With a flapping wing configuration, the wing creates high pressure under the wing on the downstroke to create lift. On the upstroke, even when feathered, however, the wing tends to create a slight vacuum or "void" beneath the wing as it ascends. As a result, the subsequent downstroke tends to be slightly less efficient than the initial one. To address this issue, and due to the multi-wing configuration, embodiments of the present invention can further comprise a method of phasing the wings such that one wing is "filling the void" for the other.

In some embodiments, both the fore and hind wings can be in the same stroke (e.g., the upstroke or downstroke). In this manner, one wing can follow the other wing's wake to take advantage of the vacuum that forms behind the initial wing. This can be especially helpful in the upstroke, when the forewing can fill in the vacuum (or low pressure area) in the wake of the hind wing, without exerting too much power, and thus saving energy.

It has been shown, for example, that by flapping the front wings and the rear wings out of phase, but at the same frequency, significant flight aerodynamic improvement can be realized. This is particularly useful if the rear wing leads the fore wing, though other configurations are possible. The efficiency is provided, in part, by recovering energy from the wake that is wasted when flapping the wings together (in phase) or co-axially (e.g., as in coaxial helicopters with contra-rotating blades). By carefully adjusting the phasing angle between the fore wing and hind wing, additional energy efficiency can be obtained.

As shown in FIG. 43a, for a flying vehicle with four wings, for example, at the top of the downstroke, the rear wing 4305 can be set to lead the forewing 4310 by between approximately 45 degrees. Of course, this angle is variable and can be optimally determined experimentally and is generally between approximately 15 degrees and 60 degrees. Experimental results have shown this angle to be approximately 22 degrees for a dragonfly, for example, but this angle will vary with each configuration of the MAV.

The determining factors for the separation angle include, but are not limited to, separation between the front wings 4305 and the rear wings 4310, mass of the MAV, angular range of the flapping motion, and size of the wings 4305, 4310. Of course, the wings 4305, 4310 do not feather in the downstroke, as shown, maximizing lift. The arrows indicate the length of the length of the stroke still left in that cycle.

Similarly, as shown in FIG. 43b, on the upstroke, the rear wing 4310 leads the front wing 4305 by approximately 45 degrees. In addition, the feathering angle of the wing can be controlled to optimize phase tuning. The wings will feather during the upstroke, with the instantaneous feathering angle determined by the position of the wing. In a preferred embodiment, the feathering angle is maximum when the wing is at its highest velocity point (generally when it is substantially horizontal with respect to the MAV) and the feathering angles are minimum (e.g., zero) when the wings are substantially at the end of both the upstroke and the downstroke.

As shown in FIGS. 43c-43d, the phasing angle is highly dependent on MAV variables. In this configuration, with, for example, short, wide wings and a heavier overall vehicle, the phasing angle can be adjusted to approximately 25 degrees. In some embodiments, the actuation system (e.g., solenoidal actuation) can enable variable wing phasing to maximize flight efficiency for, for example and not limitation, multiple flight regimes, weather conditions, or payload. In other embodiments, wing phasing can be included in the feedback loop of the control system to enable instantaneous phase angle adjustment. The hypocycloidal gear train can also be hard coupled to an optimum phasing angle between the hind and fore wings. Additionally, individual actuators for fore and hind wings can be used to dynamically change the phasing angle in flight.

While several possible embodiments are disclosed above, embodiments of the present invention are not so limited. For instance, while several possible configurations have been disclosed (e.g., a MAV generally inspired by dragonfly), other suitable designs and configurations can be selected without departing from the spirit of the invention. Other suitable configurations inspired by, for example and not limitation, crickets, damselflies, or other multi-winged animals could also be used. Embodiments of the present invention can also have more or less than four wings, for example, or can have a shape or body that is adapted to carry various types of payloads. In addition, the location and configuration used for various features of embodiments of the present invention can be varied according to a particular design need, a design limitation, or simply user preference. Such changes are intended to be embraced within the scope of the invention.

The specific configurations, choice of materials, and the size and shape of various elements can be varied according to particular design specifications or constraints requiring a device, system, or method constructed according to the principles of the invention. For example, while certain exemplary ranges have been provided for pitch angles and other parameters, other configurations can be used for, for example and not limitation, different environments or flying regimes. Such changes are intended to be embraced within the scope of the invention. The presently disclosed embodiments, therefore, are considered in all respects to be illustrative and not restrictive. The scope of the invention is indicated by the appended claims, rather than the foregoing description, and all changes that come within the meaning and range of equivalents thereof are intended to be embraced therein.

We claim:

1. A flying machine comprising:
   a central chassis section;
   four or more independently controlled wings, pivotally coupled to the central chassis section, for providing lift to the flying machine, each wing of the four or more wings having one degree of freedom or two degrees of freedom; and
   a drive system comprising:
   one or more gear train systems for flapping the four or more wings; and
   one or more drive motors for driving the one or more gear train systems;
   wherein the one or more gear train systems flap each of the four or more wings with variable amplitude;
   wherein a speed of the one or more drive motors can be varied to flap the four or more wings with variable frequency; and
   wherein the drive system comprises a control gear set located at each of the four or more wings, each of the control gear sets comprising:
   a ring gear movable between a first position and a second position; and
   one or more spider gears located inside the ring gear and in geared engagement with the ring gear;
   wherein a first spider gear of the one or more spider gears comprises a drive pin for converting rotary motion to reciprocating motion;
   wherein, when the ring gear is in the first position, the reciprocating motion of the drive pin is substantially vertical, causing maximum thrust/lift output from the wings during flapping and/or hovering flight;
   wherein, when the ring gear is in the second position, the reciprocating motion of the drive pin is substantially horizontal, causing substantially no flapping of the wings, or gliding flight; and
   wherein rotating the ring gear from the first position to the second position causes the reciprocating motion of the drive pin to transition from substantially vertical motion to substantially horizontal motion.

2. The flying machine of claim 1, wherein each control gear set further comprises:
   a flapping actuator pivotally coupled to the central chassis section and in slideable engagement with the drive pin;
   wherein rotating the ring gear in a first direction moves the reciprocation motion of the drive pin on the first spider gear in the horizontal direction, reducing an amplitude of the motion of the flapping actuator; and
   wherein rotating the ring gear in a second direction moves the reciprocation motion of the drive pin on the first spider gear in the vertical direction, increasing the amplitude of the motion of the flapping actuator.

3. The flying machine of claim 2, wherein when the ring gear is in the second position, the motion of the flapping actuator is reduced to approximately zero amplitude to provide fixed-wing flight.

* * * * *